United States Patent [19]

McGrath et al.

[11] Patent Number: 5,841,892
[45] Date of Patent: Nov. 24, 1998

[54] SYSTEM FOR AUTOMATED ANALYSIS OF 3D FIBER ORIENTATION IN SHORT FIBER COMPOSITES

[75] Inventors: John J. McGrath, DeWitt, Mich.; Jeffrey M. Wille, Mission, Tex.

[73] Assignee: Board of Trustees operating Michigan State University, East Lansing, Mich.

[21] Appl. No.: 903,709

[22] Filed: Jul. 13, 1997

Related U.S. Application Data

[63] Continuation of Ser. No. 455,516, May 31, 1995, abandoned.

[51] Int. Cl.$^6$ .............................. G06T 7/60; G06T 9/20; G06T 17/10; G01N 33/44
[52] U.S. Cl. ...................... 382/141; 382/154; 382/173; 382/259; 382/258; 382/291; 382/190; 395/124
[58] Field of Search .................................. 356/429, 239, 356/335, 381, 382; 73/150 R; 382/258, 259, 154, 141, 152, 173, 288, 291, 190; 395/124; 348/86, 92, 128; 364/468.17, 475.09

[56] References Cited

U.S. PATENT DOCUMENTS

| | | | |
|---|---|---|---|
| 3,069,654 | 4/1962 | Hough | 342/176 |
| 4,634,280 | 1/1987 | Paulson, Jr. | 356/385 |
| 4,884,225 | 11/1989 | Fogarty et al. | 382/133 |
| 4,955,720 | 9/1990 | Blecha et al. | 356/429 |
| 4,991,224 | 2/1991 | Takahashi et al. | 382/180 |
| 5,126,569 | 6/1992 | Carlson | 250/341.4 |
| 5,436,980 | 7/1995 | Weeks et al. | 382/141 |

OTHER PUBLICATIONS

Matsuoka et al, Prediction of Fiber Orientation in Injection Molded . . . , Polymer Eng. and Sci. vol. 30, No. 16 pp. 957–966 (1990).

Fischer, G. et al, Measuring Spatial Orientation of Short Fiber . . . , Polymer Composites, vol. 9, No. 4 pp. 297–304 (1988).

Fischer, G. et al, Measuring Spatial Fiber Orientation—A Method for Quality . . . , Adv. in Poly. Tech. vol. 10, No. 2, pp. 135–141 (1990).

Kulik, A. et al, Acoustic Microscopy As A Polyvalent Tool In Material Science, vol. 1, pp. 85–90 (1990).

O'Connell, P.A. et al, Measurements of Fibre Orientation in Short–Fibre–. . . , Composites Sci. and Tech. vol. 42 pp. 329–347 (1991).

(List continued on next page.)

*Primary Examiner*—Leo Boudreau
*Assistant Examiner*—Brian P. Werner
*Attorney, Agent, or Firm*—Ian C. McLeod; Mary M. Moyne

[57] ABSTRACT

An apparatus and method for determining the Fiber Orientation Distribution (FOD) in an injection molded polymer is described. The transparent sample (12) is comprised of a matrix material, reinforcing fibers and opaque tracer fibers (12A) which are analyzed to determine the FOD and the fiber length of all fibers in the sample. The sample is formed in an injection molding apparatus (14) which includes an injection mold (16) and an injection molding unit (34). The sample is constructed and placed in the imaging apparatus (58) in order to be optically sectioned. The imaging apparatus includes an inverted microscope (60), a camera with a controller (62), a motion controller board (64) and a frame grabber (66). The sample is scanned along three (3) axes in x-y plane in the field of view of the microscope at increasing depths in the sample along the z-axis which is the line of sight of the microscope. The 3D images are analyzed to determine the FOD and fiber length of the fibers in the sample. The apparatus and method are controlled by a computer (100) using a series of programs. The programs include the Chop program, the Step program, the Acquire program, the Motion Controller and Frame Grabber (MCFG) program, the Pseudo program, the Thin3D program, the 3D-FODAS program, the DiffFOD program and the Fibor program.

27 Claims, 25 Drawing Sheets

Microfiche Appendix Included
(2 Microfiche, 600 Pages)

OTHER PUBLICATIONS

Toll, S. et al, Microstructural Characterization of Injection Moulded . . . , Composites, vol. 22, No. 4 pp. 298–306 (1991).

Blumentritt, B. et al, The Mechanical Properties of Oriented Discontinuous . . . , Polymer Eng. and Sci. vol. 14, No. 9 pp. 633–640 (1974).

B. Lain et al.; Three Dimensional Fiber Orientation Distributions in Injection–Molded, Short Fiber–Reinforced Thermoplastics; May 5, 1994; pp. 2316–2320; Antel '94.

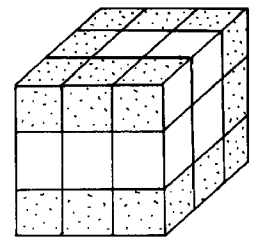
F I G. 9A
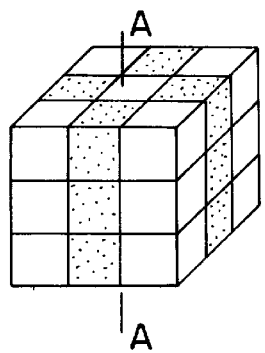
F I G. 9B
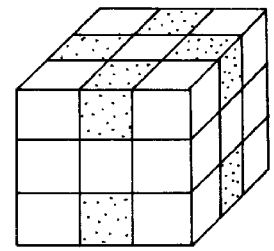
F I G. 9C
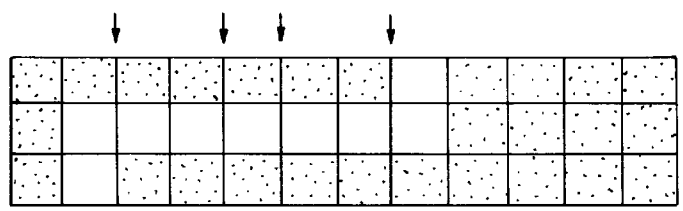
F I G. 9D
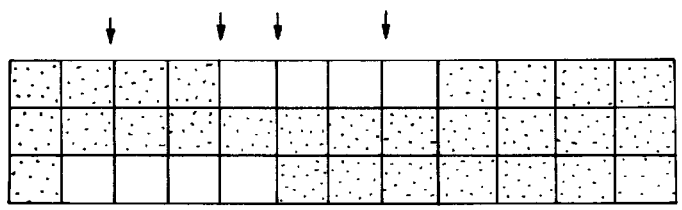
F I G. 9E

SYSTEM FOR AUTOMATED ANALYSIS OF 3D FIBER ORIENTATION IN SHORT FIBER COMPOSITES

This application is a continuation of application Ser. No. 08/455,516 filed on May 31, 1995 now abandoned.

This application has a microfiche appendix having 7 total number of microfiche and 660 total number of frames.

SUMMARY OF THE INVENTION

The present invention relates to an apparatus and method for measuring 3D fiber orientation in an injection molded composite. In particular, the present invention relates to an imaging technique and an analyzing method for measuring the fiber orientation and fiber length of reinforcing fibers in a polymeric composite. The imaging technique includes optically sectioning a transparent composite sample containing opaque tracer fibers using a conventional light microscope and gathering data from the sections. The data consists of a sequence of images captured at equal intervals which represent a 3D image of the composite. The analyzing method uses the image data gathered by the imaging technique to determine and measure the fiber orientation and fiber length of the tracer fibers in the composite in order to determine the fiber orientation distribution (FOD) within the sample.

BACKGROUND OF THE INVENTION

(1) Field of the Invention

The relatively low strength and low stiffness of most polymeric materials (plastics) make them less than ideal for many engineering applications. However, when the polymeric materials are mixed with reinforcing materials to form composites, the material properties of the composite are significantly enhanced compared to the properties of the polymeric materials alone. Other non-mechanical properties such as the thermal, electrical and optical properties of the polymeric material for example can also be modified by the addition of other materials. The reinforcing material may be in the form of fibers, flakes, disks or spheres; fibers being the most common.

Composite materials can be designed to possess desirable properties such as a high strength-to-weight ratio, and high strength and stiffness in the direction of applied loading. The selection of materials naturally has the strongest influence on the material properties of the composite. The orientation of the reinforcing fibers, however, has the second strongest influence on most of the material properties of the composite. In general, the material properties of the composite are a function of the fiber orientation distribution, the fiber length distribution, the fiber volume fraction and the fiber curvature. In a highly aligned material, the properties in the direction of alignment may differ by an order of magnitude from the properties transverse to the alignment. The reinforcing materials used in composites are usually highly anisotropic resulting in bulk anisotropic behavior in the composite.

Fibers are usually classified as continuous or short. Production of continuous fiber composites generally involves relatively slow and expensive processing such as hand layup, filament winding or weaving, whereas short fiber composites lend themselves well to rapid and inexpensive molding processes such as injection molding. Low cost, fast processing, and the ability to form complex shapes has led to injection molding becoming a popular method for producing low cost, moderate strength short fiber composites. It is well-established that fiber orientation is strongly influenced by the injection molding process and that fiber orientation has a strong influence on the bulk material properties. Knowledge of the orientation of the reinforcing fibers is an essential element in predicting material properties. Although, general trends and theories have emerged, precise fiber orientation data and complete documentation of the processing conditions used to obtain the data are needed to develop accurate models of flow induced fiber orientation. The inability to accurately and rapidly measure fiber orientation distributions has contributed significantly to the lack of available data.

(2) Prior Art

The prior art shows various methods and apparatus for using some form of optics to determine the internal characteristics of a material. Illustrative are U.S. Pat. Nos. 4,634,280 to Paulson, Jr.; 4,955,720 to Blecha et al and 5,126,569 to Carlson.

Paulson, Jr. describes a method for determining the average cross-sectional characteristics of a yarn or filament from light scattering analysis. The intensity of detected light scattered from the yarn in the plane of the incident beam which is oriented perpendicularly to the longitudinal axis of the yarn is measured and compared with previously measured standard values for particular yarn geometry in order to determine the average cross-sectional shape parameter.

Blecha et al describes a method and apparatus for the measurement of fiber orientation in a translucent sheet. A laser beam perpendicular to the first surface of the sheet is directed onto the first surface of the sheet. As the beam passes through the sheet, the light is distorted by the fibers in the sheet and a second pattern with an elliptical shape is formed on the second surface. The shape and orientation of the elliptical second pattern is analyzed to determine the fiber orientation of the fibers in the sheet.

Carlson describes an apparatus for measuring an optical property of a sample. The apparatus includes a source of radiation for exposing the sample to radiation of a predetermined wavelength, a detector for detecting the light intensity through the sample as a result of the exposure to generate a transmitted light intensity signal, circuitry for digitizing the transmitted light intensity signal and an analyzer for determining the optical properties of interest from the digitized light intensity signal. The apparatus is mainly used to determine the net free charge carrier distribution of the sample, although the apparatus can also be used for analyzing ion implant and to measure the refractive index of the sample.

Several methods have been used to predict the fiber orientation distribution of a polymeric reinforced material based on the mold filling process. One such is the method described in Matsuoka et al, Prediction of Fiber Orientation in Injection Molded Parts of Short-Fiber Reinforced Thermoplastics, "Polymer Engineering and Science", (1990) 30(16), pp. 957–966. The Matsuoka et al method involves a numerical scheme for predicting fiber orientation in 3D thin-walled molded parts of fiber reinforced thermoplastic. The equation is solved about a distribution function of fiber orientation by using a finite difference method with input of velocity data from a mold filling analysis. The mold filling is assumed to be non-isothermal Hele-Shaw flow of a non-newtonian fluid which is analyzed by using a finite element method.

In the prior art, data about the orientation of single fibers in a sample which is necessary to determine fiber orientation distribution of the sample is gathered using either shadow imaging, surface imaging or cross-section imaging or some combination thereof.

Shadow imaging is used to obtain projections of fibers located throughout the thickness of a material. Images obtained by this technique normally do not provide depth information and, therefore, this technique is generally thought of as a 2D technique. However, under certain circumstances where the fibers have uniform length or a thin cross-section of the material is used, some out-of-plane orientation information can be obtained.

Surface imaging which is usually performed on samples which have been prepared by metallographic polishing techniques, provides information about fibers which intersect the cutting plane. The in-plane orientation component can normally be accurately measured from this type of imaging and by analyzing the shape of the fiber cross-sections, some information about the out-of-plane component can also be obtained.

Cross-section imaging methods also known as surface ellipse methods are capable of providing images of arbitrary planes inside a material. These methods have the advantage of being able to provide a complete 3D description of the morphology of a material by means of a sequence of images through its thickness. Currently, 3D fiber orientation data is obtained by analyzing the shape of the elliptical fiber cross-sections exposed by physical sectioning. The in-plane orientation angle is determined from the direction of the major axis of the exposed ellipse, while the out-of-plane angle is calculated from the ratio of the major to minor axis. This method however is time consuming and a laborious task and the results are sometimes disappointing due to lack of contrast between the fibers and matrix. The poor spatial resolution results in a large angular uncertainty in the calculation of the fiber orientation. Furthermore, the results of the analysis are ambiguous due to the inability to determine the length of the fibers using this method. Therefore, alternate methods have been developed to analyze image data to determine fiber orientation distribution.

Kulik, A., Gremaud, G., and Sathish, S., (1990) Acoustic Microscopy As A Polyvalent Tool In Material Science. Trans. Royal Microscopical Society, Vol. 1, (ed. by H. Y. Elder), pp. 85 to 90, Adam Hilger, Bristol shows the use of acoustic imaging to resolve the direction of the out-of-plane orientation component, noting that at the side of the cut ellipse, where the fiber is diving into the matrix, a banded pattern appears. The distance between the stripes may be used to calculate the angle of inclination of the fiber although the results of measurement are not always accurate.

Fischer et al, Measuring Spatial Orientation of Short Fiber Reinforced Thermoplastics by Image Analysis, "Polymer Composites", (1988) 9(4), pp. 297–304 describe a computer based measuring strategy to determine fiber orientations from single cross-sections. A means of correcting for the inclination-dependent probability of hitting a fiber is shown as well as a correction for fiber-end (non-elliptical) intersections. The analysis method is based on pattern recognition techniques. The fiber orientation distribution is used to approximate thermal expansion as a function of fiber content and orientation and as a means of verifying the orientation measurements.

Fischer et al, Measuring Spatial Fiber Orientation—A Method For Quality Control of Fiber Reinforced Plastics, "Advances in Polymer Technology", (1990) 10(2), pp. 135–141 show the use of automated analysis of surface images to determine fiber orientation distribution. The analysis emphasizes that fiber length and orientation are both important factors in determining material properties and adds a level of automation to the image acquisition process by using a computer controlled scanning table. By moving the sample, the magnification is increased while continuing to allow a global measurement of the fiber orientation distribution field. The field of view is in the range of 0.2×0.2 mm to 0.8×0.8 mm.

O'Connell et al, Measurements of Fibre Orientation in Short-Fibre-Reinforced Thermoplastics, "Composite Science and Technology", (1991) 42, pp. 329–347 describes an advanced ellipse measurement technique which scans high resolution photographs with an advanced image analyzer designed for analysis of astronomical images. The apparatus provides automated measurement of the location, size and orientation of the major axis, and ellipticity of fiber cross-sections. This approach provides much higher information density and accuracy than achieved by more common digitization techniques. A typical negative contains 10,000 fiber images. The negatives are scanned with a spot interval of 0.01 or 0.02 mm, giving an estimated spatial measurement error on the order of $\frac{1}{10}$ of a spot width which gives a maximum uncertainty in the measurement of the out-of-plane orientation angle, $\theta$ of about 9°. If the spatial error is assumed to be on the order of 1 spot width, then the maximum uncertainty is around 30°. Examination of a typical micrograph reveals a fairly high percentage of touching fibers. The image analyzer treats touching fibers as single fibers, which introduces some bias into the measurements.

Toll et al, Microstructural Characterization of Injection Moulded Composites Using Image Analysis, "Composites", (1991) 22(4), pp. 298–306 present a complete procedure for the assessment of the 3D microstructure of discontinuous fiber composites. Image analysis routines are used to analyze scanned images of metallographically polished surfaces and evaluate spatial orientation distributions and volume fractions of the fibers. The algorithm has an enhancement over previous computerized image analysis techniques in that it can isolate individual fibers that are in contact with each other. The orientation angles are calculated from the principal moments of inertia of the fiber cross-sections. The procedure assumes straight circular cylinders and symmetry of the fiber orientation distribution with respect to the imaging plane. The evaluation of the accuracy of the technique identifies the following sources of error: incomplete polishing, finite image resolution, fiber curvature and the presence of fiber ends at the cutting plane. The greatest source of error appears to be the finite imaging resolution. A resolution of one-fifth of a fiber diameter is estimated to produce an uncertainty of up to 35° in the out-of-plane angle for fibers nearly perpendicular to the cutting plane.

The above prior art shows that except for the ultra sonic banding technique, 3D fiber orientation distribution measurement has been performed almost exclusively with variations of the surface ellipse method. However, the limitations of surface methods include poor resolution of the out-of-plane angle, especially when performed on digitized images; ambiguity with regard to the direction of the out-of-plane angle unless special imaging methods are used; non-uniform fiber diameters; the presence of fiber ends at the cutting plane; difficulty of distinguishing between fiber ends and impurities or voids; and fiber-fiber contact which presents the non-trivial problem of distinguishing individual fibers. One of the most serious drawbacks of surface methods is the inability to measure fiber length. Fibers of different lengths may be influenced differently by the injection molding flow. Thus, any measurement technique that does not measure both fiber orientation and length may not yield an accurate description of the orientation distribution, unless there is a monodisperse fiber length distribution.

Therefore, there remains a need for a method and apparatus for accurately and consistently determining fiber orientation distribution using 3D fiber orientation measurement which can measure both fiber orientation and fiber length. The present invention provides a method and apparatus for determining fiber orientation distribution which enables 3D fiber measurement of both the length and orientation of the fiber without damaging the sample.

OBJECTS

Therefore, it is an object of the present invention to provide a method and apparatus for determining the fiber orientation of a polymeric, fiber reinforced composite in order to determine the fiber orientation distribution of the composite. Further, it is an object of the present invention to provide a method and apparatus for determining fiber orientation in an injection molded thermoplastic composite. Still further, it is an object of the present invention to provide a method and apparatus for determining fiber length as well as fiber orientation in a thermoplastic composite. Further, it is an object of the present invention to provide a method and apparatus for determining fiber orientation in a composite which is rapid and easy to use. Still further, it is an object of the present invention to provide a method and apparatus for determining fiber orientation in a polymeric composite which does not involve damaging the sample. Finally, it is an object of the present invention to provide a method and apparatus for determining fiber orientation which is accurate and economical to use. These and other objects will become increasingly apparent by reference to the following description and the drawings.

BRIEF DESCRIPTION OF THE DRAWINGS

FIG. 9A is a 3×3 cube of voxels having a spiral configuration of voxels.

FIG. 9B is a 3×3 cube of voxels having four face columns parallel to the vertical axis A—A.

FIG. 9C is a 3×3 cube of voxels having edge voxels on the axis faces.

FIG. 9D is a 3×3 cube of voxels with the four faces surrounding the axis of the center voxel unwrapped, showing a spiral configuration.

FIG. 9E is a 3×3 cube of voxels with the four faces surrounding the axis of the center voxel unwrapped, showing an incomplete spiral configuration.

DETAILED DESCRIPTION OF THE PREFERRED EMBODIMENTS

Figure 1:
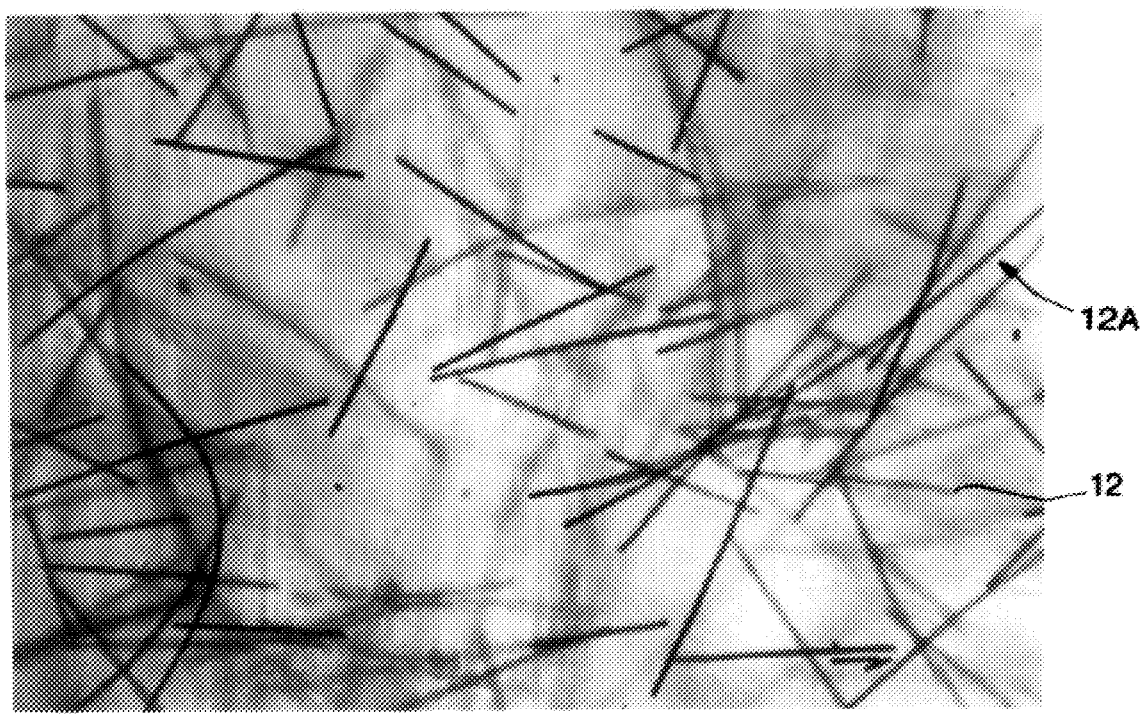
FIG. 1 is a photomicrograph at 100× magnification of an optical cross-section of the preferred transparent sample 12 showing the tracer fibers 12A.

The present invention relates to a method for detecting a three-dimensional fiber orientation in a sample which comprises: providing a transparent sample of a continuous phase of a polymeric material with impregnated fibers at least one of which is optically distinguishable from the polymeric material in the sample; mounting the sample under an optical microscope which is provided with a computer means for recording images at points inside the sample in the field of view along a line of the microscope through the sample; and analyzing the recorded images to determine the orientation of the fibers in the sample.

The method may be performed at several different x-y locations on one sample in order to provide an accurate representation of the fiber orientation of the sample. In addition, the sample can also be rotated such that the method is performed along several different axes of the sample in order to increase the confidence level of the results.

Further, the present invention relates to a method for detecting a three-dimensional fiber orientation in a sample which comprises: providing a transparent sample of a continuous phase of a polymeric material with imbedded fibers at least one of which is optically distinguishable from the polymeric material in the sample; and mounting the sample under an optical microscope which is provided with a computer means for recording images at points inside the sample along a line of sight of the microscope through the sample.

Still further, the present invention relates to an apparatus for detecting a three-dimensional fiber orientation in a sample, which comprises: a light microscope which is provided with means for supporting a sample of a continuous phase of a polymeric material with impregnated fibers at least one of which is optically distinguishable from the polymeric material in the sample; and providing a computer means with a program for recording images from the sample along a line of sight of the microscope and at points inside the sample and to analyze the recorded images to determine the orientation of the fibers in the sample.

The sample is preferably made of polymethylomethacrylate (PMMA), BK-10 glass fibers and carbon fibers. The PMMA matrix material and the glass fibers preferably have the same refractive indices which enables all of the composite except for the carbon fibers to be transparent. The sample is optically sectioned by the microscope to produce 3D images. The computer includes a series of programs for monitoring the production of the sample, optically sectioning the sample, calibrating the apparatus and algorithms, analyzing the images from the optical section and displaying the results. The programs include the Chop program, the Step program, the Acquire program, the MCFG program, the Thin3D program, the 3D-FODAS program, the DiffFOD program and the Fibor program.

The method and apparatus of fiber orientation measurement of the present invention includes an imaging apparatus controlled by a computer having imaging software for gathering data and 3D image analysis software for analyzing the data gathered by the imaging apparatus. The method includes supplying a sample of a composite material created by an injection molding apparatus and using 3D optical sectioning to create image data which is then analyzed by the imaging analysis software to determine the length and orientation of the fibers in the sample. That information is then used to determine the fiber orientation distribution (FOD) of the sample.

Referring to FIG. 1, the sample 12 is preferably a transparent composite material having a transparent matrix and reinforcing fiber material along with opaque tracer fibers 12A. The matrix is the component of the composite which surrounds the reinforcing fiber material and the tracer fibers 12A. The transparent matrix and the reinforcing fiber material preferably have similar refractive indices. A good match between the materials' refractive indices and a good interface between the glass fibers and the matrix enable the composite to exhibit a high degree of transparency which allows composites having a high fiber content to be optically sectioned to greater depths without physical cutting. The refractive index of a material is temperature and wavelength dependent and the change of refractive index with temperature and wavelength is usually different for each of the constituent materials of a composite. Therefore, a perfect match between materials is achieved only at a specific temperature and wavelength. A simple method to determine where the best match occurs consists of using a photospectrometer (not shown) to focus a beam of light on one side of the sample 12 while measuring the amount of light transmitted to the other side. As the mismatch of the refractive indices decreases, less light will be scattered as it passes through the sample 12 and more light will reach the detector. By applying this procedure for different temperatures over a range of wavelengths, the ideal match is determined. The degree to which the refractive indices of the matrix and the fibers 12A must be matched depends on the fiber volume fraction, the fiber diameter, the desired penetration depth and the characteristics of the imaging system. Experimentation shows that a mismatch of 0.07 yields a material that is practically impenetrable, whereas a mismatch of 0.007 yields a material through which 10 $\mu$m fibers 12A are clearly resolved at a depth of 3 mm.

Figure 8A:
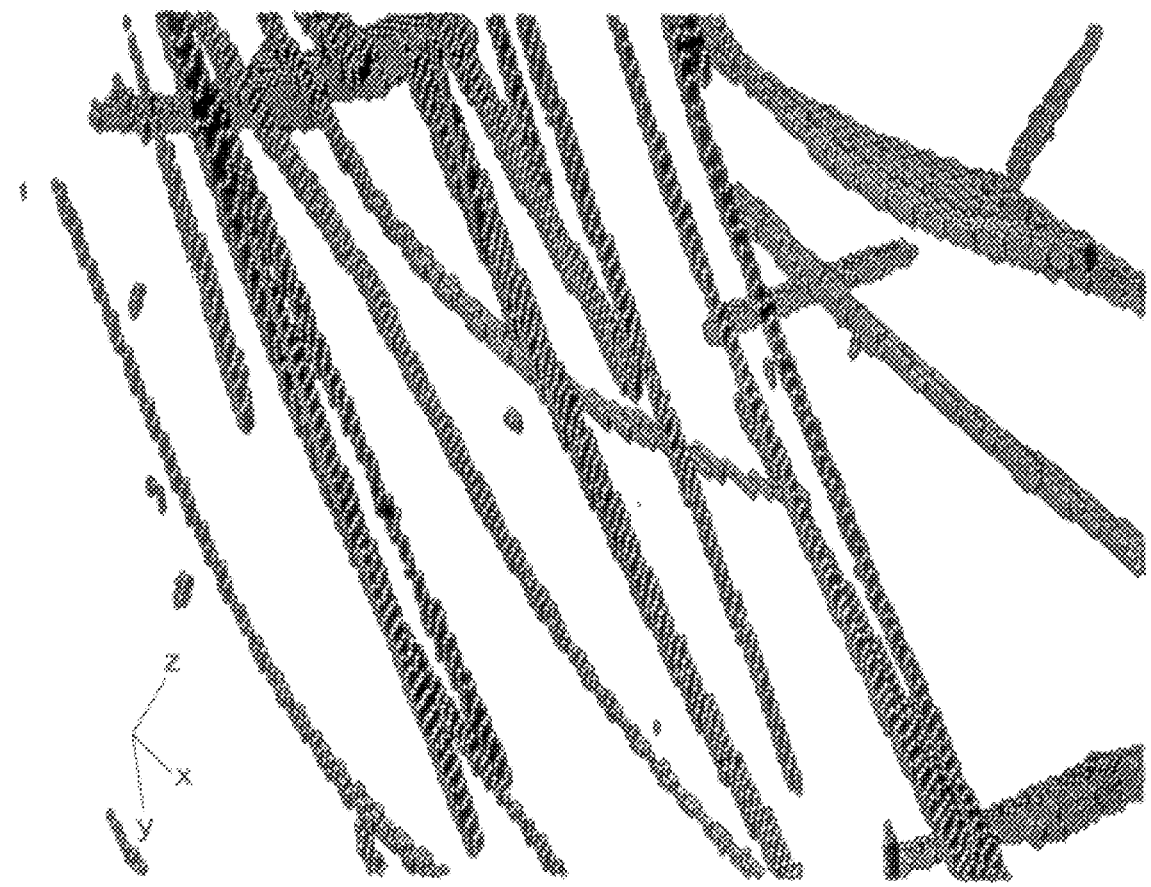
FIG. 8A is a magnified orthogonal view of an image before thinning.
Figure 8B:
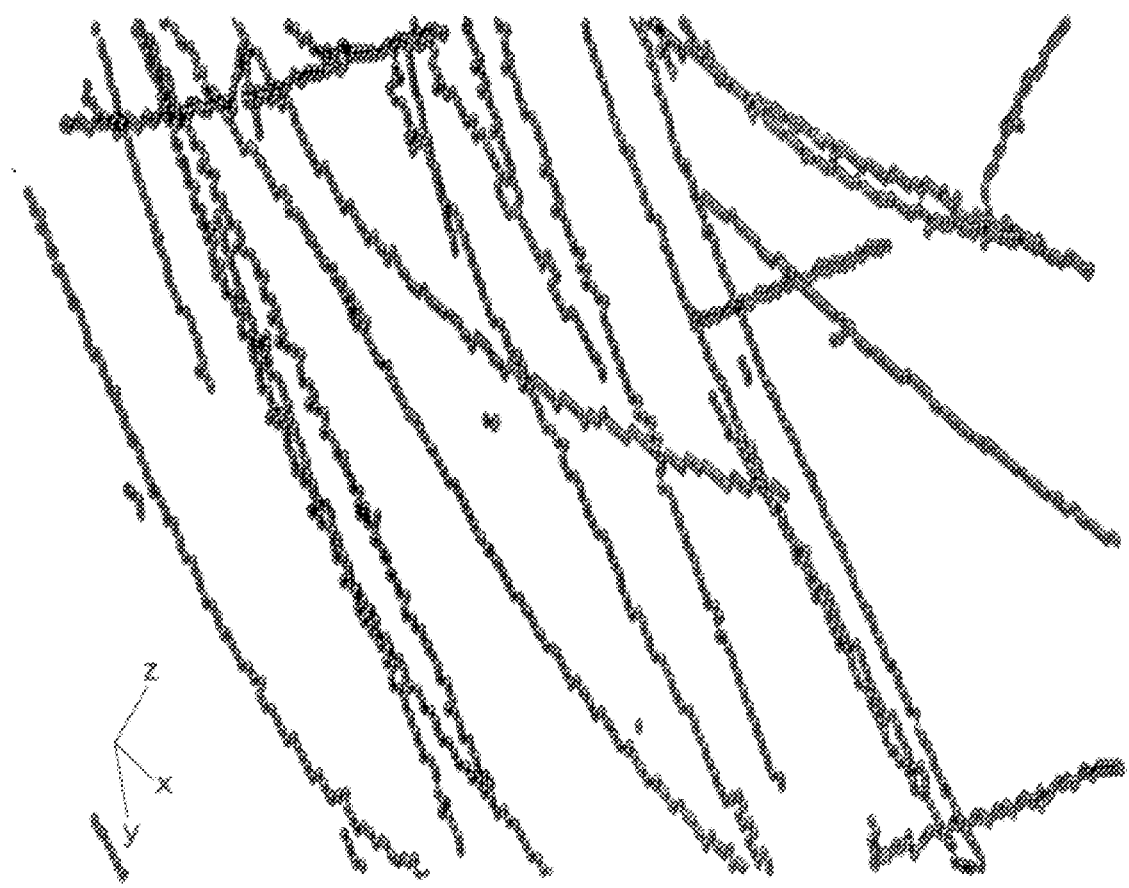
FIG. 8B is a magnified orthogonal view of an image after thinning.

In one embodiment, the composite material which is used is constructed of polymethylmethacrylate (PMMA) for the matrix material and BK-10 glass fibers as the reinforcing fiber material with carbon fibers used as the opaque tracer fibers 12A. The sample 12 is 3.2 mm thick and constructed of PMMA with 30 wt % (17 vol %) glass fiber content and 0.1 wt % tracer fibers 12A. The best refractive indices match for this sample 12 occurs near 10° C. and 400 nm. However, the sample 12 shows no significant difference in image quality at 10° C. versus room temperature. In addition, the introduction of a low-pass optical filter did not cause any significant change. Therefore, in this embodiment, there is no need for special filters or temperature control. The glass fibers have a diameter of 13 $\mu$m and the tracer fibers 12A have a diameter of 10 $\mu$m. The tracer fibers 12A are the fibers actually analyzed in the method (FIGS. 8A and 8B). The tracer fibers 12A preferably give a good representation of the FOD and fiber length of the reinforcing fibers in the sample 12.

Figure 2:
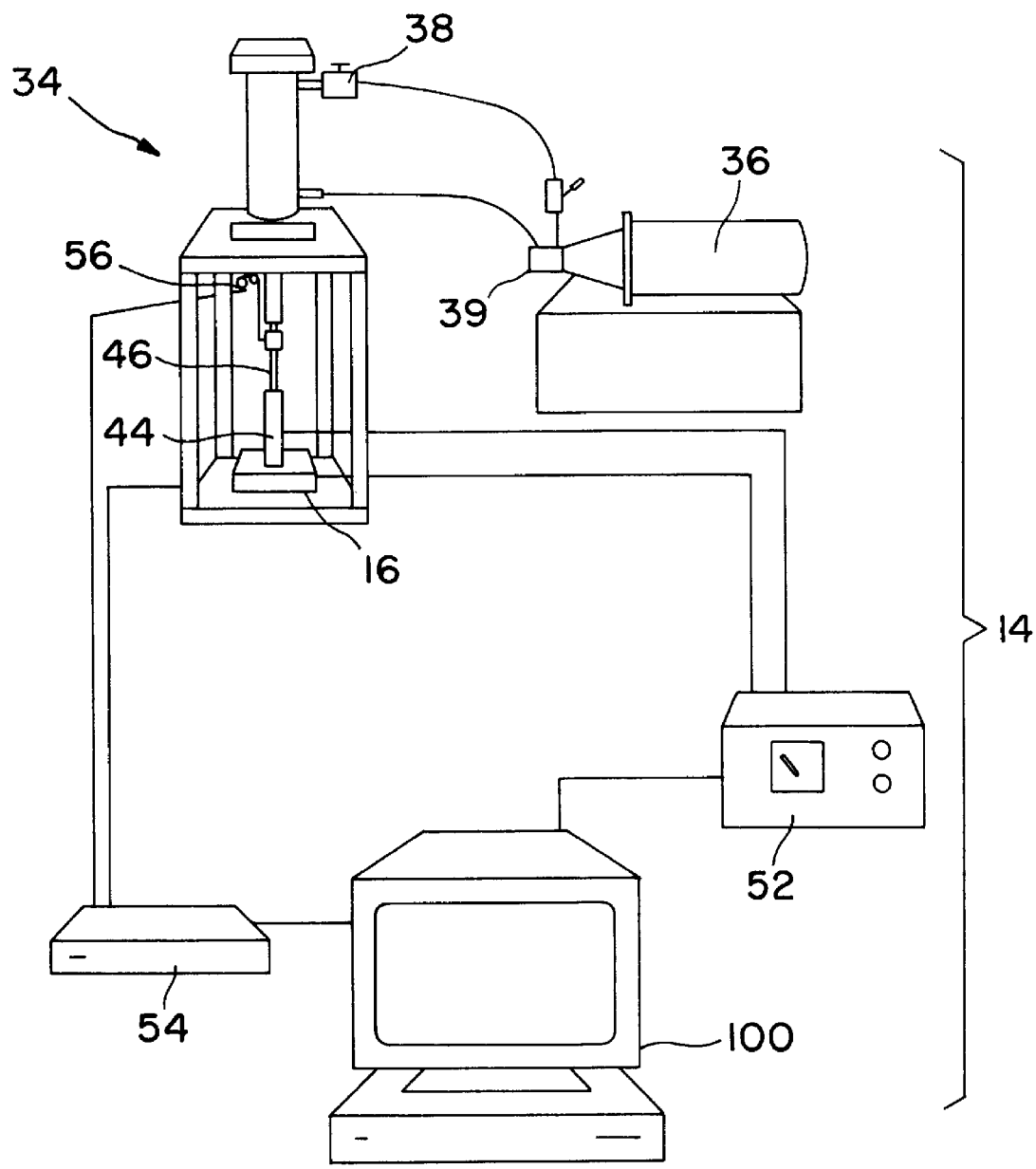
FIG. 2 is a schematic view of the injection molding apparatus 14 with the computer 100.

As shown in FIG. 2, the sample 12 in this embodiment is produced in an injection molding apparatus 14 which consists of a fiber chopper (not shown), a modular injection mold 16, an injection molding unit 34 and data acquisition equipment 54 all of which are controlled by the computer 100. Alternately, the sample 12 to be used could be produced using different types of molding such as compression molding, rim molding or S-molding. The fiber chopper consists of a reciprocating blade which slides across a single hole in a die. A pinch-roller driven by a stepper motor (not shown) advances a tow of fibers 12A through the die by a specified amount during each cycle of the blade. The stepper motor is controlled by a computer program (to be described in detail hereinafter) which senses the closure of a microswitch activated by the chopper blade. The fiber chopper cuts continuous fibers 12A to desired lengths which allows the sample 12 to be prepared with fiber lengths typical of those associated with industrial injection molding machines taking into account breakage in the injection screw. The chopper is able to cut the fibers 12A to any length provided the length is a multiple of the step size of the motor. This allows samples 12 having defined fiber length distributions to be produced. The rate at which fibers 12A are chopped depends on the cut length and the number of fibers 12A in the tow.

Figure 3:
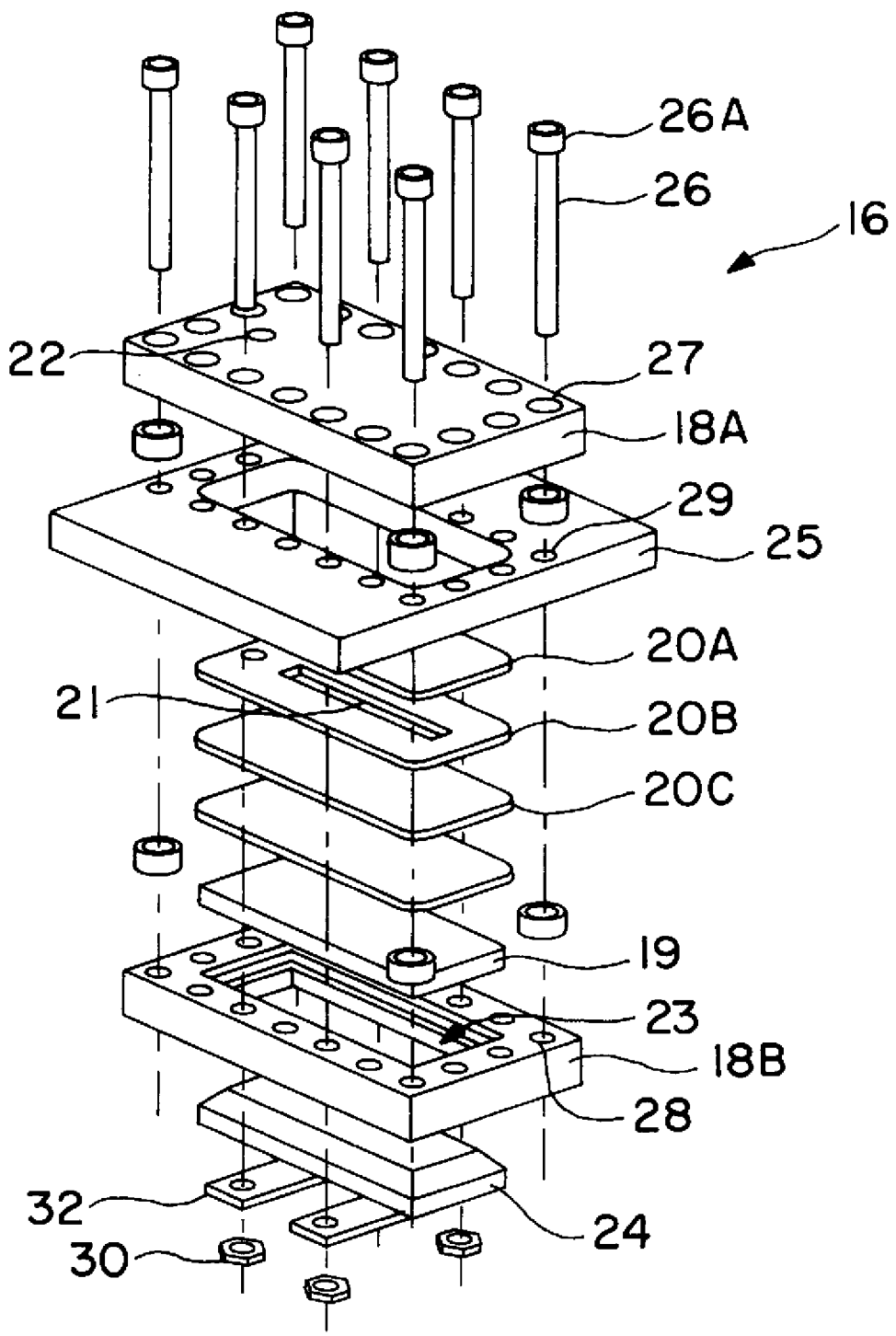
FIG. 3 is an exploded view of the injection mold 16 showing the upper plate 18A, lower plate 18B and the top, middle and bottom cavity layers 20A, 20B and 20C.
Figure 4:
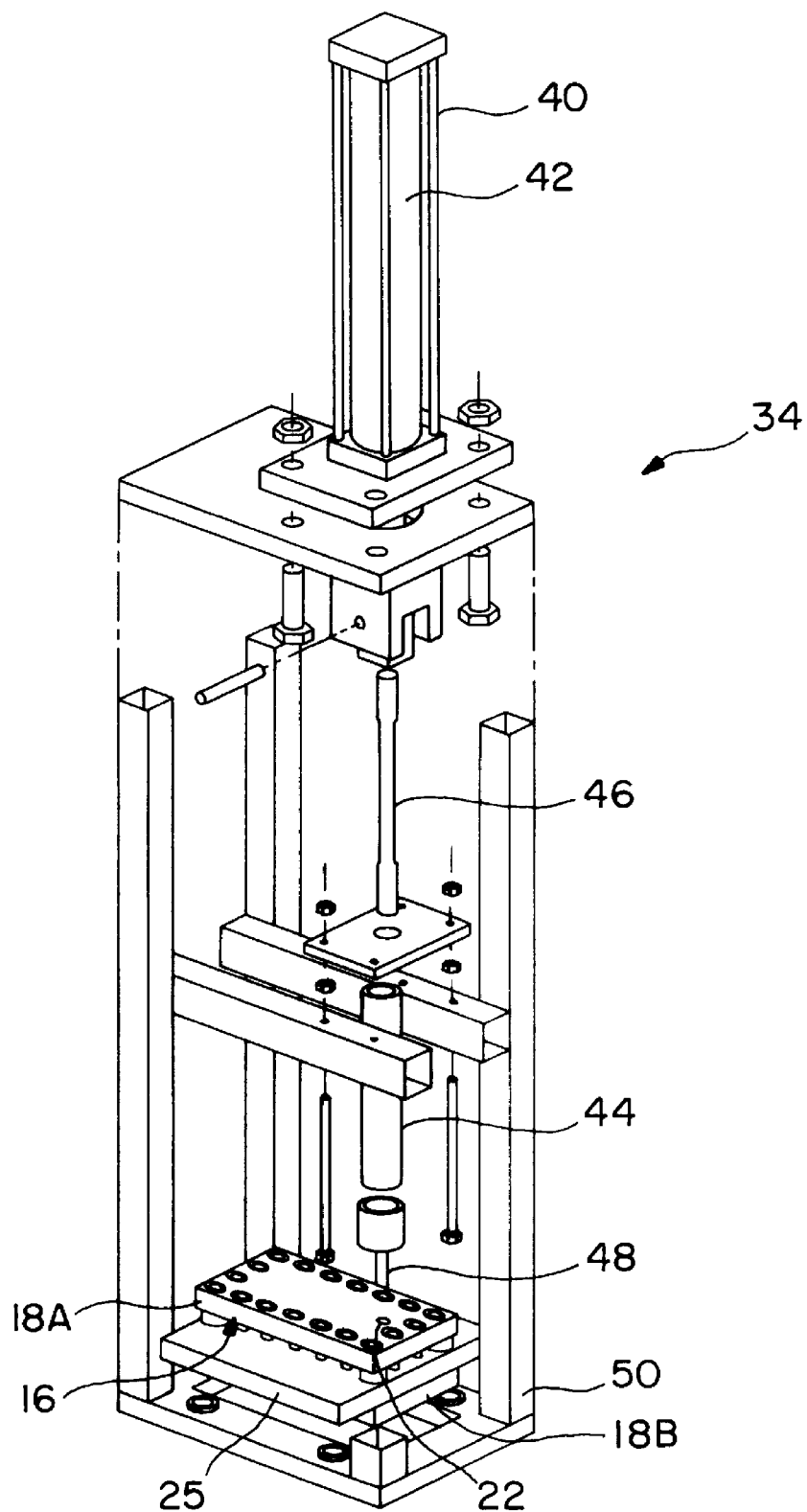
FIG. 4 is an exploded view of the injection mold unit 34 showing the hydraulic cylinder 42, injection barrel 44, the piston 46 and the nozzle 48.

As shown in FIG. 3, the modular injection mold 16 has a sandwich construction having an upper plate 18A and a lower plate 18B which bolt together to hold top, middle and bottom cavity layers 20A, 20B and 20C which determine the shape of the gate (not shown) and cavity 21 of the mold 16. The upper plate 18A houses thermocouples (not shown) and an injection port 22. The lower plate 18B has an open center 23 to accommodate either a metal supporting plate 19 or a transparent window (not shown). The upper and lower plates 18A and 18B of the mold 16 are preferably made of low carbon steel and serve to provide rigidity and clamping force. The cavity layers 20A, 20B and 20C form the cavity 21 and gate of the mold 16. The top, middle and bottom cavity layers 20A, 20B and 20C form the top, sides and bottom, respectively, of the cavity 21. The gate may be incorporated in either the top or middle cavity layer 20A or 20B. The cavity layers 20A, 20B and 20C are preferably made of polished stainless steel. The mold 16 is heated either by foil heaters (not shown) sandwiched between layers 20A, 20B and 20C of the mold 16 or by a heater 24 located in the open center 23 of the lower plate 18B. A containment frame plate 25 surrounds the interior cavity layers 20A, 20B and 20C of the mold 16 to maintain alignment and to prevent lateral displacement of the cavity 21 by the injection pressure (FIG. 4). The plates 18A, 18B and 25 and the layers 20A, 20B and 20C of the mold 16 are mounted together and secured in place by hex bolts 26. The hex bolts 26 are preferably inserted through apertures 27, 28 and 29 in the plates 18A, 18B and 25, respectively. The hex bolts 26 are mounted such that the heads 26A of the hex bolts 26 are adjacent to the top plate 18A and the nuts 30 are adjacent to the bottom plate 18B. In the preferred embodiment, heater clamps 32 are mounted adjacent to the heater 24 opposite the bottom plate 18B and are held in place by some of the hex bolts 26 which extend beyond the bottom plate 18B such that the nuts 30 are mounted onto the hex bolts 26 adjacent the heater clamps 32 opposite the heater 24. The heater clamps 32 are to hold the heater 24 in place in the open center 23 of the bottom plate 18B when the mold 16 is fully assembled. The overall length of the mold 16 is 15.2 cm (6 in). The modular construction of the mold 16 allows samples to be produced rapidly and at very low cost using a wide variety of cavity 21 and gate geometries.

As shown in FIGS. 2 and 4, the injection molding unit 34 includes a hydraulic power unit 36 with a pressure regulator 39 and needle valve 38, a metal frame 40 which houses a hydraulic cylinder 42, a zone heated injection barrel 44, a piston 46, a heated nozzle 48 and a fixture 50 for holding the mold 16. The temperatures of the barrel 44 and nozzle 48 are preferably maintained by thermostatically controlled cylinder heaters (not shown) which are controlled by a temperature controller 52. The temperature, injection speed and injection pressure of the injection molding unit 34 are preferably able to be measured by a computer program (to be described in detail hereinafter). In the corresponding embodiment, the hydraulic cylinder 42 is capable of producing 2200 bar (32,000 psi) inside the injection barrel 44 and flow rates of at least 15 cm$^3$/s (0.9 in$^3$/s).

The data acquisition equipment for the injection apparatus 14 consists of a data acquisition board 54, thermocouples (not shown), potentiometer position transducer 56, and a piezoelectric force transducer (not shown). The data acquisition equipment 54 collects external data from the thermocouples, the position transducer 56 and the force transducer of the injection molding unit 34. The data acquisition board 54 has eight (8) differential analog input channels (not shown), 12-bit resolution and maximum sampling rate of 2.5 kHz at a gain of 500. In one embodiment, the data acquisition board 54 is the Data Translation DT2805, manufactured by Data Translation, Boston, Mass. and the position transducer 56 is preferably a conventional potentiometer attached to a toothed wheel. The force transducer is preferably a PCB 208-A03 such as that built by PCB Piezotronics, Inc., Depew, N.Y. 14043.

Figure 5:
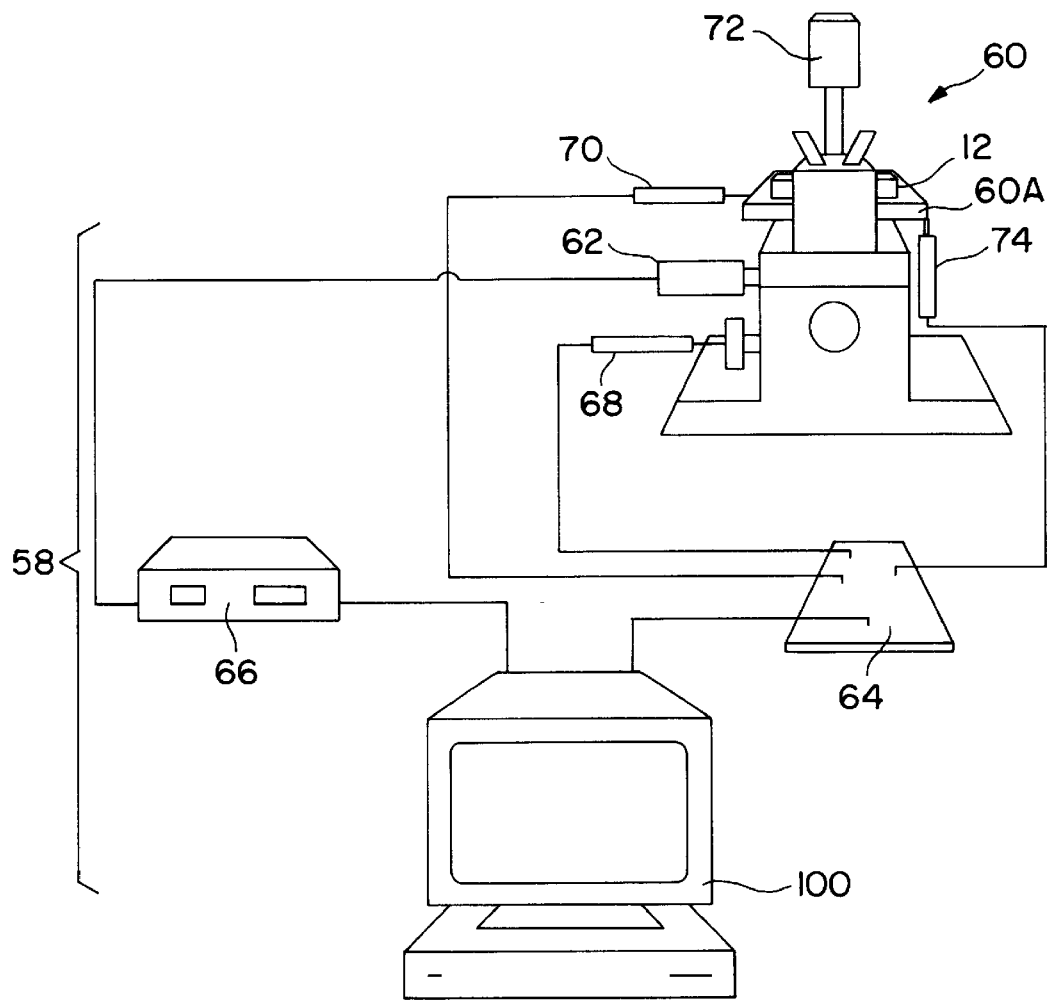
FIG. 5 is a schematic view of the imaging apparatus 58 with the computer 100 showing the frame grabber 66, the motion controller board 64 and the microscope 60.

As shown in FIG. 5, the imaging apparatus 58 of this embodiment consists of an inverted microscope 60, a video camera and controller 62, a motion controller board 64, a pair of motorized micrometer drives 68 and 70, a stepper motor 74 and a frame grabber 66 all of which are controlled by the computer 100. The microscope 60 is preferably an inverted microscope 60 with a condenser (not shown) and diffusers (not shown). In the preferred embodiment, the microscope 60 is a Nikon Diaphot-TMD and the condenser is an Achromat condenser, both manufactured by Nikon, Japan. The condenser provides precise focusing of a light source 72 and helps eliminate out-of-plane information. Diffusers located at the light source 72 and at the entrance to the condenser provide diffuse illumination. Two axis control of the microscope 60 for remote control of the focus and stage position is achieved by the two encoder mike drives 68 and 70 which are driven by the axis motion controller board 64. In the one embodiment, the mike drives 68 and 70 are Oriel mike drives manufactured by Oriel Corporation, Stratford, Conn. Each mike drive 68 and 70 consists of a small servo motor with a planetary gear system which drives a drive screw (not shown), with a 0.48 mm pitch. In the one embodiment, the mike drives 68 and 70 have an angular resolution of 0.019° (19,400 quadrature pulses per revolution), a linear resolution of 0.025 $\mu$m, a maximum angular speed of 0.67 revolution per second and a maximum linear speed of 322 $\mu$m per second. The linear motion of one mike drive 68 is used directly to position the microscope stage 60A in the x direction. Thus, the preferred x axis resolution is 0.025 $\mu$m, and the maximum linear speed is 322 $\mu$m per second. Elasticity of the servo motor mounting reduces the accuracy of the stage positioning to approximately 1 $\mu$m. A third axis of motion is added by using a stepper motor driver (not shown) and a stepper motor 74 in conjunction with the digital I/O port (not shown) of the data acquisition board 54. In another embodiment (not shown), a third encoder mike drive having a third servo motor is used instead of the stepper motor 74 and driver. This allows the stepper motor 74 and driver to be used to provide a fourth axis of motion which will allow for additional motion such as rotating the sample 12 or moving a series of samples 12 onto the stage 60A one at a time to further automate the scanning process. In the one embodiment, the 3-axis motion controller board 64 is a Galil DMC-430-10 PC, manufactured by Galil, San Francisco, Calif. and the frame grabber 66 is preferably a Frame Grabber 256, manufactured by Progressive Peripherals, Denver, Colo.

The entire fiber orientation distribution method and apparatus is controlled by computer software having several separate computer programs which run on a computer system (Appendix I). The programs include a Chop program, an Acquire program, a Motion Controller and Frame Grabber (MCFG) program, a Step program, a Pseudo program, a Thin3D program, a 3D-FODAS program, a DiffFOD program and a Fibor program. The Thin3D program, the 3D-FODAS program, the DiffFOD program and the Fibor program form the 3D image analysis software of the method. The software controls all aspects of the method and apparatus from monitoring the formation of the sample 12 in the injection molding apparatus 14 to the acquisition, analysis and display of the FOD data of the sample 12.

The programs are preferably written in the "C" programming language and are run on an AMIGADOS™ operating system manufactured by AMIGADOS™, Commadore, USA. The AMIGADOS™ is a preemptive multi-tasking operating system with extensive support for interprocess communication. Multi-tasking allows several programs to run simultaneously and the preemptive feature allows a program to take control of the CPU immediately when needed. Furthermore, the interprocess communication ability of the system allows separate programs to communicate with each other to coordinate events and share information. The AMIGADOS™ also has a graphical user interface which supports multiple screens, multiple windows and icons. The graphical user interface is important in monitoring the parameters of the process and allows for quick and easy modification of any of the parameters of the program and any portion of the process when necessary. Due to the multi-tasking feature of the operating system, the programs do not need to be run in any specific order.

The Chop program controls the fiber chopper of the injection molding apparatus 14 by controlling the digital I/O ports of the data acquisition board 54. Through a first port, the program detects the state of the microswitch which is activated by the motion of the chopper blade and through a second port the program provides signals to the stepper motor controller circuit which energizes the specified windings of the stepper motor 74 to drive the pinch-roller. The speed and direction of the stepper motor 74 are determined by the sequence and rate of the signals sent to the stepper motor controller by the program.

Initially, the Chop program checks to determine whether the data acquisition board 54 is already being used so as not to interfere with data acquisition or motion control being performed by other programs. If the board is not in use, the Chop program opens a window or graphical user interface containing a slider and status information. The user moves the slider to select the desired fiber length. The status information consists of the total number of cuts made and the current length setting. The program continuously monitors the state of the microswitch and advances the fibers 12A by the selected amount each time the microswitch opens or closes. The program reads the default values from its icon and sets the initial values of the corresponding variables. The default values which can be stored include a motor calibration value which specifies the distance the fibers 12A advance for each step of the stepper motor (not shown), and the phase of the fiber motion: that is, whether the fibers 12A should be advanced when the microswitch opens or when it closes.

The Acquire program obtains external data from thermocouples, position transducers 56, and force transducers directly from the data acquisition board 54 of the injection molding apparatus 14. The Acquire program includes two separate tasks: an acquisition task and a display task. The acquisition task acquires temperature, speed, and force data during the injection molding process. The display task simultaneously provides real-time graphic and numeric displays of eight channels of information. Preferably, the acquisition task runs at the highest system priority and is responsible for gathering data from the data acquisition board 54 and placing the data in a circular buffer. By running at top priority, the acquisition task is able to instantly take control of the CPU whenever it needs to read data which allows for high speed, precisely-timed data acquisition, independent of system load and independent of the graphical display speed. This ensures that no data will be lost even at very high sample rates or high system loads. The acquisition task is solely responsible for all communication with the data acquisition board 54. The display task has the capability of logging data to a file, and is also responsible for receiving input from the user.

The Acquire program also has a stopwatch which displays the elapsed time of the process and an event timer which measures the rate at which certain events occur. The event timer measures the rate of specific events during the injection process. In particular, the timer measures the amount of time for a given parameter to change from one threshold value to another. For example, the event timer can be programmed to measure the amount of time that it takes for the injection barrel 44 to heat from one temperature to another or the length of time it takes for the injection piston 46 to move from one position to another. The event timer is primarily used to measure piston speed during injection. The Acquire program sets the gain, sampling rate, and sampling mode of the data acquisition board 54. The program controls one of the computer's hardware timers to provide a precision time stamp for each data sample 12. A second precision hardware timer is used to provide interrupts for the acquisition task and to signal the task to read data from the data acquisition board 54 at the proper intervals. Changes in sampling rate, channel selection gain and other changes in the parameters of the data acquisition board 54 requested by the user are handled by interprocess communication with the acquisition task. Each of the eight (8) channels of the program is easily configured for different types and ranges of data. The modular design of the program allows each channel to have a separate calibration curve in the form of either an interpolated look-up table or a calibration function. The user is able to set the following default values for the range of channels to be acquired using the program's icon; the cold-junction temperature compensation for the thermocouples, the gain of the data acquisition board 54, the default directory for data storage, the channels which are disabled, the type of data in each channel (temperature, position, or force) the maximum and minimum display values for each data type, the initial event timer parameters (channel number, start threshold, stop threshold, and whether it is initially enabled or disabled) and the initial dimensions of the display window.

The graphical user interface for the Acquire program preferably consists of a variable-sized window which is occupied by an oscilloscope-like display of the eight channel traces. The interface also contains a panel for displaying the current numeric values of the data. The channels are preferably able to be individually turned on and off. Below the numeric display panel is a group of buttons which allow the user to select the sampling rate, enable data logging, select the filename for logging, pause the display, select the range of channels to be sampled, and enable the event timer. The stopwatch display which shows elapsed time is located at the top of the window.

The Motion Controller and Frame Grabber (MCFG) program controls the focus and stage position of the microscope 60 of the imaging apparatus 58. The MCFG program controls the microscope 60 through the motion controller board 64 which allows automated scanning in three-dimensions. The term scan refers to a sequence of images taken at progressive depths along the optical axis (z) at one horizontal (x-y) location. A scan cell refers to a portion of a scan that is treated as a unit during analysis. Often the entire scan is treated as a cell. Preferably, the software has the capability of dividing a scan into as many cells as desired. In addition, the MCFG program also captures images from the microscope's CCD video camera 62, performs initial image thresholding and other preprocessing, and stores image sequences in the form of animation files.

The MCFG program is able to apply various convolutions to an image but preferably, only a simple thresholding operation is performed on the images. A downloaded image consists of individual pixel values ranging from 0–255.

Captured images in the one embodiment consist of 8-bit pixels representing 256 levels of gray, or 24 bit color pixels with 8 bits for each of the primary colors red, green and blue (RGB). Since each image is part of a sequence of images representing a 3D object, the pixels possess a depth dimension equal to the spacing between images. In the one embodiment, the thickness of each sample 12 is 17 microns. Pixels possessing a depth dimension are referred to as voxels, or volume elements. The storage requirements and computational load for handling 3D images is significantly reduced by converting grayscale or color images to binary images. The simplest method of doing this is a simple thresholding process. Thus, voxels with intensities greater than a given value are assigned a value of 1 and voxels with equal or less intensities are assigned a value of 0. In the case of color images, the pixel intensity is generally calculated by a weighted sum of the red, green and blue (RGB) components. The National Television System Committee (NTSC) formula for computing intensity is $$\text{Intensity} = 0.299 \cdot R + 0.587 \cdot G + 0.114 \cdot B$$

Two or three dimensional filters may be applied prior to thresholding to reduce noise effects, remove low-frequency variations in intensity due to uneven illumination, enhance edges, or perform other image enhancement functions as required by the quality of the image. The thresholding function is specified as:

$$t(x,y) = \begin{cases} 0, & \text{if pixel } (x,y) \leq 128; \\ 1, & \text{otherwise.} \end{cases}$$

The MCFG program is able to communicate with the other programs in the system for efficient processing of data. As each sequence of images is stored to the disk, the MCFG program sends a message which contains the name and location of the file to the Thin3D program which is next in the analysis sequence. This allows the recipient program to immediately begin work on the image. Since the MCFG program spends most of the time waiting for motors 68, 70 or 74 to complete their motion and for images to be transferred from the frame grabber 66, the analysis programs are able to take advantage of this available CPU time to process the image, which greatly reduces the time required for analyzing a data set. The MCFG program also communicates with the separate stepper motor controller program to provide the fourth axis of motion.

The MCFG program operates by communicating with the motion controller board 64 and the frame grabber 66. The MCFG program controls the acceleration, speed and step size of each axis of the motion controller board 64 and interrogates the board 64 to report current servo motor positions. The MCFG program also controls the resolution of the frame grabber 66 and instructs the frame grabber 66 when to capture and download images. The MCFG program has a powerful, built-in scripting language for programming complex scan patterns and image processing functions. Most of the functions of the program are controlled from within a script.

The graphical interface for the MCFG program, preferably consists of a window containing a series of controls through which the user sets the motor step size, speed, acceleration and calibration factor for each axis. Additional push button controls allow the user to step the servo motors 68 or 70 and zero the motor positions, as well as select the video source, grab, process and save images, select the video output and edit and execute scripts. The current values of motor position, speed and acceleration are displayed in the controls that are used for user input. Many of the controls serve a dual purpose of receiving and displaying information. Other controls display the current filename, current frame number and the current status of the program and provide only output. The MCFG program's icon is used to store the default values for speed, acceleration, step size, etc. for each servo motor 68 or 70, as well as the frame grabber type, voxel size, refractive index, default storage directory, default filename and text editor of choice for editing scripts.

The MCFG program stores image sequences in Interchange File Format (ANIM Delta 5). IFF is the format used for CEL animations produced by Sparta Inc. Animation format allows the images to be viewed in rapid sequence, up to 60 frames per second, which is useful for human evaluation. Animation format also provides data compression. In the preferred embodiment, the voxel size is approximately 3.367×1.993×14.900 $\mu$m, or a volume of 100.0 $\mu$m$^3$ which is about as large as practical for resolving 10 $\mu$m fibers in a 1 mm$^2$ 2D image. A 1 mm$^3$ scan of the sample 12 material contains 10 million voxels and requires 1.19 megabytes of storage, if each voxel is stored as a single bit. Likewise, a cubic centimeter contains 10 billion voxels and requires 1.19 gigabytes of storage. Storing in animation format gives an average 22:1 compression ratio which reduces storage requirements to about 54 megabytes/cm$^3$. Animation files are preferably further compressed by at least another fifty percent (50%) by standard archival methods, further reducing storage requirements to about 27 megabytes/cm$^3$. The high compression ratio in the animation format is achieved in two ways. First, the first frame is compressed by run length compression, which means that series of identical bytes are stored as a single byte and a repeat count. Second, the subsequent images are stored as deltas from the first image. That is, only the portions of the image that change from one frame to the next are stored. The changes are also compressed by run length compression. When each file is stored, the voxel dimensions, refractive index of the material, and a title are stored in the file note for use by the 3D-FODAS analysis program (to be described in detail hereinafter).

The Step program is a stepper motor controller which functions either as a stand-alone program that receives user input directly, or which is controlled by interprocess communication from another program through its public message port. The Step program controls the stepper motor 74 which is used either to provide the third axis motion of the microscope 60 or to provide a fourth axis of motion for the imaging apparatus 58. All functions of the Step program are accessible through the program's communication port which enables the Step program to act as a server.

The Step program's user interface preferably contains controls for setting the step size, calibration factor, and target position for the stepper motor 74. Push buttons are used for moving the stepper motor 74 forward and backwards, in continuous mode or by discrete steps. The program's icon is used to set the calibration factor for the stepper motor 74, default step size, step rate and default window position.

The Pseudo program generates artificial fiber data for calibration purposes which is stored in the same animation format as the data generated by the MCFG program. The artificial fiber data allows the analysis software to be tested independently of the imaging. By creating fiber data for a known FOD and comparing the results of the analysis of that data by the analysis software with the actual FOD, the accuracy of the analysis software is evaluated.

Through the user interface, or by retrieving a previously created data file, the user is able to set the voxel size, the refractive index of the simulated sample and the image dimensions, as well as the number, orientations, lengths and diameters of the simulated fibers in the simulated sample. The Pseudo program places the simulated fibers at random locations inside the simulated sample volume. Generating known FODs allows the problems of imaging and analysis to be uncoupled.

The user interface for the Pseudo program preferably consists of a scrollable display area in which the fiber orientation, length and count are entered. The scrollable display area is surrounded by a series of controls for entering the image dimensions and voxel size, and the dimensions of the sample volume. There are also controls for setting the refractive index and fiber diameter, and for loading, saving and editing data. Once the pseudo data have been generated, the data are viewed immediately or stored on disk. The Pseudo program's icon is used to store the default direction, refractive index, voxel size, image dimensions and fiber diameter.

The Thin3D program determines the location of fiber ends and intersections for use in measuring fiber length and orientation. The program also serves to reduce the amount of data in the image while preserving the information necessary for determining fiber length and orientation, thus, significantly reducing the computational burden later on. The Thin3D program data reads from a 3D image (animation) file created by the MCFG or Pseudo program (FIG. 8A). The Thin3D program automatically detects whether fiber voxels are represented by 1's or 0's in the 3D image by comparing the relative amounts of each that are present in the image with the assumption that there are always fewer fiber voxels than matrix voxels. The output of the Thin3D program is a thinned 3D image which is stored in animation format (FIG. 8B).

Figure 6:
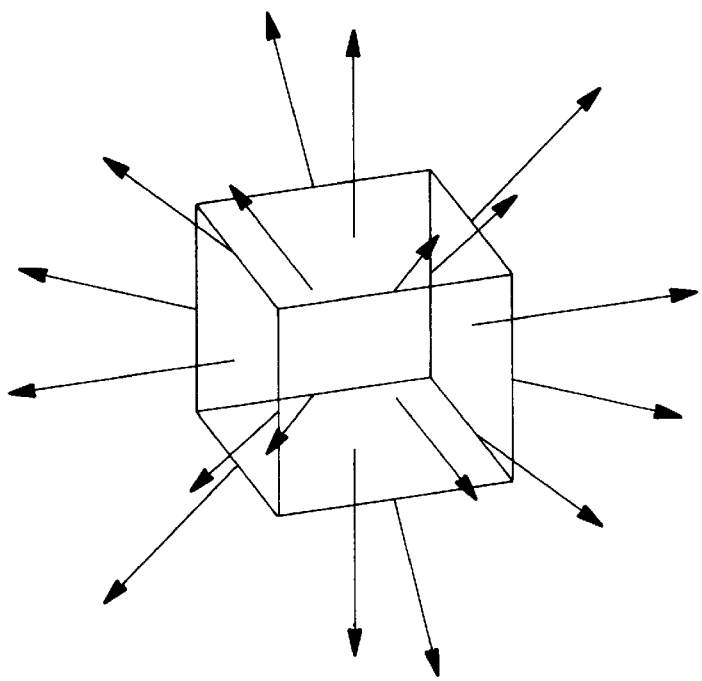
FIG. 6 is a perspective view of a cube showing the scan directions used in the Thin3D program.

A 3D image containing a sufficient number of fibers 12A to provide a statistical measure of the FOD has a high likelihood of fiber-fiber contact which makes it difficult to determine which voxels belong to a given fiber 12A. In fact, dozens of fibers 12A may be represented in a single contiguous group of voxels. The major challenge in fiber orientation measurement from 3D images is determining which voxels belong to each fiber 12A. The Thin3D program provides a straightforward way of locating fiber endpoints and determining which voxels belong to each fiber segment by thinning or skeletonizing the structures in the image using 3D thinning. Skeletonization refers to reducing a group of pixels or voxels down to a chain of single pixels or voxels. A fiber image is reduced by uniform removal of the exterior voxels until the midline is reached. The Thin3D program ensures uniform removal of voxels by an appropriate scan direction sequence and by removing a single layer at a time. The program removes exterior voxels from a cluster in a uniform manner until the centerline of the cluster is reached. In the case of fibers 12A, voxels are removed until only those lying along the medial axis of the fiber 12A remain. In order for a voxel to be considered for removal during a given scan, the voxel must lie on the appropriate face of the structure. In 3D thinning, scanning is made from eighteen (18) directions: the six (6) axis directions ±x, ±y, ±z, and the twelve (12) diagonal directions ±xy, ∓xy, ±yz, ∓yz, ±zx, and ∓zx. The eighteen (18) directions correspond to the six (6) faces and twelve (12) edges of a cube as shown in FIG. 6.

A 3D image preferably consists of about fifty (50) two-dimensional images of about 320×400 pixels each. Thus, during a single pass in which the voxels are examined from all eighteen (18) directions, 6,400,000 voxel locations must be tested to determine whether or not the locations are occupied. Preferably, five to six (5–6) passes are made to completely thin an image. During each pass, the voxels are subjected to complex connectivity tests before they are removed. In order to determine how the removal of a voxel will affect the connectivity of the image, the neighboring twenty-six (26) voxels must be considered. Those twenty-six (26) neighbors may exist in $2^{26}$=67,108,864 different combinations. In the preferred embodiment, the computation times for the 3D thinning range from about three to five (3 to 5) minutes on a microcomputer equipped with a 25 MHz, 80386 microprocessor. The computation time could be reduced by further optimization and by using a faster microprocessor.

To keep the thinning from progressing past a single layer of voxels on a given scan, two copies of the image are kept in memory. The original is used to locate surface voxels while the copy is used for recording removed voxels. When a scan has been completed, the copy is duplicated and the next scan is executed. If this precaution were not taken, entire structures could be obliterated on a single pass by continuously thinning newly exposed surfaces. This procedure, however, does not prevent planar images that are a single voxel thick from being obliterated by scans perpendicular to the plane. To avoid this problem an image is required to be at least two voxels thick in the scanning direction in order to permit voxel removal.

An undesirable tunneling effect may occur during scanning of the image in the diagonal directions. A voxel located inside the structure may have an edge that is exposed to the surface and thus, appear to be a surface voxel. To avoid this tunneling effect in the preferred embodiment, only outside corners are allowed to be removed during diagonal searches. This is implemented by requiring that the two faces of the voxel adjoining the exposed edge be free surfaces.

The requirements for considering a voxel for removal during each scan direction are compiled in Table 1. The notation $n_{[i,j,k]}$ represents a location adjacent to a reference voxel, where i, j, and k are offsets from the reference voxel position. The entries in the table indicate whether specific neighboring locations must be occupied or vacant in order for a voxel to be considered for removal. For example, during scan number 2, in order for a voxel at location [i,j,k] to be considered for removal, location [i,j,k−1] must be vacant and location [i,j,k+1] must be occupied.

TABLE 1

| Dir | Face (vacant) | Back (occup) | Side 1 (vacant) | Side 2 (vacant) |
|---|---|---|---|---|
| 1 | $n_{[0, 0, 1]}$ | $n_{[0, 0, -1]}$ | n/a | n/a |
| 2 | $n_{[0, 0, -1]}$ | $n_{[0, 0, 1]}$ | n/a | n/a |
| 3 | $n_{[0, 1, 0]}$ | $n_{[0, -1, 0]}$ | n/a | n/a |
| 4 | $n_{[0, -1, 0]}$ | $n_{[0, 1, 0]}$ | n/a | n/a |
| 5 | $n_{[1, 0, 0]}$ | $n_{[-1, 0, 0]}$ | n/a | n/a |
| 6 | $n_{[-1, 0, 0]}$ | $n_{[1, 0, 0]}$ | n/a | n/a |
| 7 | $n_{[0, 1, 1]}$ | $n_{[0, -1, -1]}$ | $n_{[0, 0, 1]}$ | $n_{[0, 1, 0]}$ |
| 8 | $n_{[0, -1, -1]}$ | $n_{[0, 0, 1]}$ | $n_{[0, 0, -1]}$ | $n_{[0, -1, 0]}$ |
| 9 | $n_{[0, -1, 1]}$ | $n_{[0, 1, -1]}$ | $n_{[0, 0, 1]}$ | $n_{[0, -1, 0]}$ |
| 10 | $n_{[0, 1, -1]}$ | $n_{[0, -1, 1]}$ | $n_{[0, 0, -1]}$ | $n_{[0, 1, 0]}$ |
| 11 | $n_{[1, 0, 1]}$ | $n_{[-1, 0, -1]}$ | $n_{[0, 0, 1]}$ | $n_{[1, 0, 0]}$ |
| 12 | $n_{[-1, 0, -1]}$ | $n_{[1, 0, 1]}$ | $n_{[0, 0, -1]}$ | $n_{[-1, 0, 0]}$ |
| 13 | $n_{[-1, 0, 1]}$ | $n_{[1, 0, -1]}$ | $n_{[0, 0, 1]}$ | $n_{[-1, 0, 0]}$ |
| 14 | $n_{[1, 0, -1]}$ | $n_{[-1, 0, 1]}$ | $n_{[0, 0, -1]}$ | $n_{[1, 0, 0]}$ |
| 15 | $n_{[1, 1, 0]}$ | $n_{[-1, -1, 0]}$ | $n_{[0, 1, 0]}$ | $n_{[1, 0, 0]}$ |
| 16 | $n_{[-1, -1, 0]}$ | $n_{[1, 1, 0]}$ | $n_{[0, -1, 0]}$ | $n_{[-1, 0, 0]}$ |
| 17 | $n_{[-1, 1, 0]}$ | $n_{[1, -1, 0]}$ | $n_{[0, 1, 0]}$ | $n_{[-1, 0, 0]}$ |
| 18 | $n_{[1, -1, 0]}$ | $n_{[-1, 1, 0]}$ | $n_{[0, -1, 0]}$ | $n_{[1, 0, 0]}$ |

Once a voxel has been selected for possible removal, a test is made to determine if the voxel is an endpoint. The test involves a simple count of the occupied neighboring locations. If only one neighboring location is occupied, then the voxel is an endpoint and cannot be removed. This requirement is necessary in order to avoid shortening all lines to single voxels.

A final sequence of tests are performed on the images to preserve the connectivity of the image structure. In particular, the final tests guarantee that no images become discontinuous and that no holes are created.

There are at least three possible definitions for continuity of voxels. Two voxels can be considered to be contiguous if: (1) they share a common face; (2) they share a common edge or face; or (3) they share a common face, edge or corner. In the one embodiment, the third definition is used in the program since in this embodiment the fibers 12A are small compared to the voxel size, and fiber voxel images are often connected only by edges or corners. The removal of a voxel alters the connectivity of an image when the number of contiguous voxel groups increases, or when a loop exists in the final thinned image that would not have existed had the voxel not been removed.

Figures 7A, 7B:
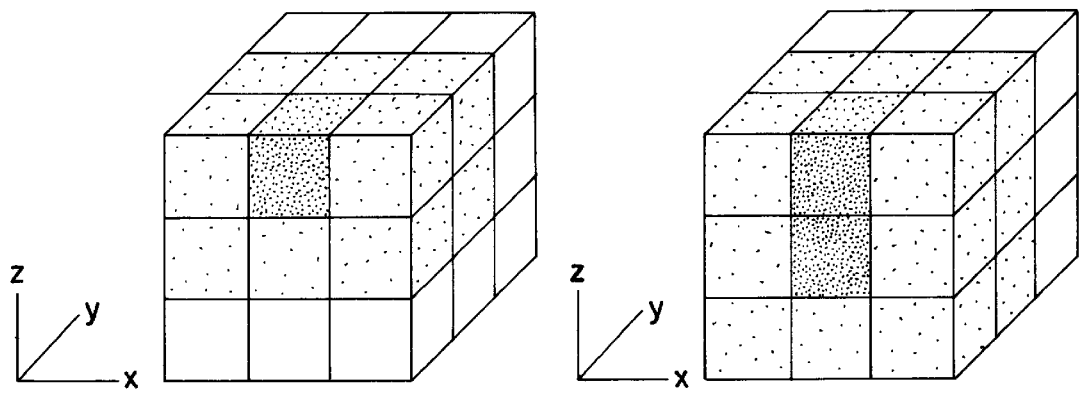
FIG. 7A is a perspective view of a cube showing the adjacency relationships for voxel $n_{[0,-1,1]}$.
FIG. 7B is a perspective view of a cube showing the adjacency relationship for a pair of voxels $n_{[0,-1,1]}$ and $n_{[0,-1,1]}$.

Testing for the fragmentation of a voxel group is performed by examining the twenty-six (26) neighbors of the voxel. With the center voxel in place, all twenty-seven (27) voxels in the 3×3 cube are, by definition, contiguous. If the surrounding twenty-six (26) voxels are part of one contiguous group, removing the center voxel will not cause a discontinuity. If more than one contiguous group exists in the absence of the center voxel, then removal of the center voxel will cause a discontinuity. To test for the fragmentation of a voxel group, each voxel location in the 3×3 cube is assigned a number which corresponds to a single bit of a 32 bit integer. A 32 bit integer constant is created for each voxel location, in which each bit that is set represents a voxel location that is immediately adjacent to it. The adjacency relationships are shown in Table 2. This table shows, for example, that neighbor $n_{[0,-1,1]}$ is adjacent to neighbors $n_{[1,0,0]}$, $n_{[1,-1,0]}$, $n_{[0,-1,0]}$, $n_{[-1,-1,0]}$, $n_{[-1,0,0]}$, $n_{[0,0,1]}$, $n_{[1,0,1]}$, $n_{[1,-1,1]}$, $n_{[-1,-1,1]}$, and $n_{[-1,0,1]}$ (FIG. 7A). A list of the neighbors of a group of voxels is obtained by combining the rows corresponding to each voxel. For instance, combining the rows for neighbors $n_{[0,-1,0]}$ and $n_{[0,-1,1]}$ shows that $n_{[1,0,0]}$, $n_{[1,-1,0]}$, $n_{[0,-1,0]}$, $n_{[-1,-1,0]}$, $n_{[-1,0,0]}$, $n_{[0,0,1]}$, $n_{[1,0,1]}$, $n_{[1,-1,1]}$, $n_{[0,-1,1]}$, $n_{[-1,-1,1]}$, $n_{[-1,0,1]}$, $n_{[0,0,-1]}$, $n_{[1,0,-1]}$, $n_{[1,-1,-1]}$, $n_{[-1,-1,-1]}$, and $n_{[-1,0,-1]}$ are adjacent to this pair (FIG. 7B). Thus, a single 32 bit integer variable is used to store all the voxel locations that are adjacent to any group of voxels within the cube. By using this technique, a single machine language instruction is required to determine if a given voxel is adjacent to any one of the possible twenty-six (26) voxels in the cube and adding all of the adjacent voxel locations of a newly identified voxel requires only a single machine language instruction.

TABLE 2

[Table 2 is a 26×26 voxel adjacency matrix, split into two halves. Row labels (26 total): $n_{[1,0,0]}$, $n_{[1,-1,0]}$, $n_{[0,-1,0]}$, $n_{[-1,-1,0]}$, $n_{[-1,0,0]}$, $n_{[-1,1,0]}$, $n_{[0,1,0]}$, $n_{[1,1,0]}$, $n_{[0,0,1]}$, $n_{[1,0,1]}$, $n_{[1,-1,1]}$, $n_{[0,-1,1]}$, $n_{[-1,-1,1]}$, $n_{[-1,0,1]}$, $n_{[-1,1,1]}$, $n_{[0,1,1]}$, $n_{[1,1,1]}$, $n_{[0,0,-1]}$, $n_{[1,0,-1]}$, $n_{[1,-1,-1]}$, $n_{[0,-1,-1]}$, $n_{[-1,-1,-1]}$, $n_{[-1,0,-1]}$, $n_{[-1,1,-1]}$, $n_{[0,1,-1]}$, $n_{[1,1,-1]}$. First half column headers: $n_{[1,0,0]}$, $n_{[1,-1,0]}$, $n_{[0,-1,0]}$, $n_{[-1,-1,0]}$, $n_{[-1,0,0]}$, $n_{[-1,1,0]}$, $n_{[0,1,0]}$, $n_{[1,1,0]}$, $n_{[0,0,1]}$, $n_{[1,0,1]}$, $n_{[1,-1,1]}$, $n_{[0,-1,1]}$, $n_{[-1,-1,-1]}$. Second half column headers: $n_{[-1,0,1]}$, $n_{[-1,1,1]}$, $n_{[0,1,1]}$, $n_{[1,1,1]}$, $n_{[0,0,-1]}$, $n_{[1,0,-1]}$, $n_{[1,-1,-1]}$, $n_{[0,-1,-1]}$, $n_{[-1,-1,-1]}$, $n_{[-1,0,-1]}$, $n_{[-1,1,-1]}$, $n_{[0,1,-1]}$, $n_{[1,1,-1]}$. The matrix cells indicate adjacency relationships (marked with filled dots) between each pair of voxel neighbors in the 3×3×3 cube.]

TABLE 2-continued

| | | | | | | | | | | | | |
|---|---|---|---|---|---|---|---|---|---|---|---|---|
| $n_{[-1,0,1]}$ | • | • | | | | | | | | | | |
| $n_{[-1,1,1]}$ | • | | • | | | | | | | | | |
| $n_{[0,1,1]}$ | • | • | • | | | | | | | | | |
| $n_{[1,1,1]}$ | | | • | | | | | | | | | |
| $n_{[0,0,-1]}$ | | | | | • | • | • | • | • | • | • | • |
| $n_{[1,0,-1]}$ | | | | • | • | • | | | | | • | • |
| $n_{[1,-1,-1]}$ | | | | • | • | • | | | | | | |
| $n_{[0,-1,-1]}$ | | | | • | • | | | | | | | |
| $n_{[-1,0,-1]}$ | | | | • | | | • | • | | | | |
| $n_{[-1,1,-1]}$ | | | | • | | | • | | | | | |
| $n_{[-1,1,-1]}$ | | | | • | | | | | • | • | • | |
| $n_{[0,1,-1]}$ | | | | • | • | | | | • | • | | • |
| $n_{[1,0,-1]}$ | | | | • | • | | | | | | | • |

The first step of the fragmentation test is to place the adjacencies of the first voxel encountered into an integer variable which serves as an accumulator. Next, each of the remaining voxels is tested to see if it is adjacent to any of the voxels in the accumulator. If it is, the adjacencies of the new voxel are combined with the accumulated adjacencies by a bitwise boolean OR operation and the process continues until no more voxels can be placed, or alternately, there are no more voxels.

If all of the voxels are placed, then all of the voxels are contiguous. Otherwise, there are two or more groups.

The remaining tests are those which determine whether a hole will be created. There are two kinds of holes: straight and bent. Detection of straight holes is relatively straightforward. First, the 3×3 cube is tested to see if there exists a straight passage through the center of the cube in the x,y, or z directions. For each passage found, tests are performed to see if at least one voxel exists on each of the four sides of the passage. If any side does not have at least one voxel, a straight hole will not be created. In the other case, a straight hole will probably be created. If the voxels surrounding the passage are arranged in a spiral or helical configuration, this test will give a false positive result (i.e. the test will indicate that a hole exists when there is none). This false positive result can be avoided by applying additional tests (to be described in detail hereinafter). However, since a helical configuration is very unlikely in images consisting of straight line elements and the voxel may be removed later when surrounding voxels have been removed, and due to the fact that the existence of an occasional extra voxel has very little effect on the final analysis, the above single test is adequate for detecting straight holes.

The straight hole test is described concisely using boolean expressions. In the following expressions, the symbol G represents a group of voxel locations and the function A(G) is true if any of the locations in group G is occupied, and false if all are vacant. The expression $n_{[i,j,k]}$ is true if that neighbor location is occupied and false if vacant. An overbar indicates negation. Thus, $\bar{A}(G)$ is true only if all locations in group G are vacant. The symbol V is used to represent logical OR, and Λ for logical AND.

The following neighbor groups are assigned for the straight hole tests. Groups with a single subscript are composed of two voxel locations on opposing faces of the reference voxel oriented along the axis named by the subscript. Groups with two subscripts are composed of three voxel locations aligned parallel to the axis named by the first subscript and offset in the direction indicated by the second subscript.

$G_x = n_{[1,0,0]}, n_{[-1,0,0]}$
$G_{x,-y} = n_{[-1,-1,0]}, n_{[0,-1,0]}, n_{[1,-1,0]}$
$G_{x,+y} = n_{[-1,1,0]}, n_{[0,1,0]}, n_{[1,1,0]}$
$G_{x,-z} = n_{[-1,0,-1]}, n_{[0,0,-1]}, n_{[1,0,-1]}$
$G_{x,+z} = n_{[-1,0,1]}, n_{[0,0,1]}, n_{[1,0,1]}$
$G_y = n_{[0,1,0]}, n_{[0,-1,0]}$
$G_{y,-x} = n_{[-1,-1,0]}, n_{[-1,0,0]}, n_{[-1,1,0]}$
$G_{y,+x} = n_{[1,-1,0]}, n_{[1,0,0]}, n_{[1,1,0]}$
$G_{y,-z} = n_{[0,-1,-1]}, n_{[0,0,-1]}, n_{[0,1,-1]}$
$G_{y,+z} = n_{[0,-1,1]}, n_{[0,0,1]}, n_{[0,1,1]}$
$G_z = n_{[0,0,1]}, n_{[0,0,-1]}$
$G_{z,-x} = n_{[-1,0,-1]}, n_{[-1,0,0]}, n_{[-1,0,1]}$
$G_{z,+x} = n_{[1,0,-1]}, n_{[1,0,0]}, n_{[1,0,1]}$
$G_{z,-y} = n_{[0,-1,-1]}, n_{[0,-1,0]}, n_{[0,-1,1]}$
$G_{z,+y} = n_{[0,1,-1]}, n_{[0,1,0]}, n_{[0,1,1]}$

The following three expressions are the tests for the existence of a straight hole in the x, y, and z directions, respectively.

$$H_x = \bar{A}(G_x) \wedge A(G_{x,-y}) \wedge A(G_{x,+y}) \wedge A(G_{x,-z}) \wedge A(G_{x,+z})$$

$$H_y = \bar{A}(G_y) \wedge A(G_{y,-x}) \wedge A(G_{y,+x}) \wedge A(G_{y,-z}) \wedge A(G_{y,+z})$$

$$H_z = \bar{A}(G_z) \wedge A(G_{z,-y}) \wedge A(G_{z,+y}) \wedge A(G_{z,-y}) \wedge A(G_{z,+y})$$

A straight hole or helical structure will be created if $$H_x V H_y V H_z$$

is true.

If the straight hole test indicates that a hole will likely be created, an additional test can be applied to determine if a straight hole would indeed be created, or to the contrary, if a spiral configuration (FIG. 9A) exists.

In this example, the straight hole test indicates that a hole may be created surrounding the vertical axis A—A (FIG. 9B). As shown in FIGS. 9B and 9C the face columns and edge voxels of axis faces are useful notations in describing a spiral configuration. A spiral configuration is characterized by the following characteristics: (1) the presence of at least one voxel in each of the four face columns parallel to the axis being tested (a positive straight hole test); (2) at least one empty edge voxel on each of the two axis faces; and (3) a path of empty voxels joining any empty edge voxel on one axis face with any empty edge voxel on the other axis face in a clockwise or counterclockwise direction around the axis.

The most complex part of the spiral test is detecting a path from an edge voxel on one face to an edge voxel on the other face. The problem can be visualized more easily by unwrapping the four faces surrounding the axis and laying them flat (FIG. 9D).

A path exists from one face edge to another if at each junction (as shown by arrows in FIG. 9D) between vertical columns of voxels there is at least one pair of horizontally adjacent empty voxels beginning with the column containing the first face edge and ending with the column containing the second face edge, and there must be a vertical path of empty voxels joining one pair to the next. Without the vertical path requirement, the hole configuration shown in FIG. 9E would be categorized as a spiral configuration.

Bent holes are defined as those entering one face of the 3×3 cube and exiting another which is not directly opposite the first. There are twelve (12) possible orientations for bent holes. For a bent hole to exist, there must be empty voxel locations on any two, non-opposing faces of the cube. In addition, the voxel location between the two empty locations must be filled, and there must be at least one voxel on each side of the hole perpendicular to its plane of symmetry.

The tests for bent holes are $$H_{-x,-y} = n_{[-1,0,0]} \wedge n_{[0,-1,0]} \wedge \overline{(n_{[1,0,0]} \vee n_{[0,1,0]})} \wedge n_{[1,1,0]} \wedge$$

$$(n_{[0,0,1]} \vee n_{[1,0,1]} \vee n_{[0,1,1]}) \wedge (n_{[0,0,-1]} \vee n_{[1,0,-1]} \vee n_{[0,1,-1]})$$

$$H_{-x,+y} = n_{[-1,0,0]} \wedge n_{[0,1,0]} \wedge \overline{(n_{[1,0,0]} \vee n_{[0,-1,0]})} \wedge n_{[1,-1,0]} \wedge$$

$$(n_{[0,0,1]} \vee n_{[1,0,1]} \vee n_{[0,-1,1]}) \wedge (n_{[0,0,-1]} \vee n_{[1,0,-1]} \vee n_{[0,-1,-1]})$$

$$H_{-z,-x} = n_{[0,0,-1]} \wedge n_{[-1,0,0]} \wedge \overline{(n_{[0,0,1]} \vee n_{[1,0,0]})} \wedge n_{[1,0,1]} \wedge$$

$$(n_{[1,-1,0]} \vee n_{[0,-1,0]} \vee n_{[0,-1,1]}) \wedge (n_{[0,1,0]} \vee n_{[1,1,0]} \vee n_{[0,1,1]})$$

$$H_{+z,-x} = n_{[0,0,1]} \wedge n_{[-1,0,0]} \wedge \overline{(n_{[0,0,-1]} \vee n_{[1,0,0]})} \wedge n_{[1,0,-1]} \wedge$$

$$(n_{[1,-1,0]} \vee n_{[0,-1,0]} \vee n_{[0,-1,-1]}) \wedge (n_{[0,1,0]} \vee n_{[1,1,0]} \vee n_{[0,1,-1]})$$

$$H_{+x,-y} = n_{[1,0,0]} \wedge n_{[0,-1,0]} \wedge \overline{(n_{[-1,0,0]} \vee n_{[0,1,0]})} \wedge n_{[-1,1,0]} \wedge$$

$$(n_{[0,0,1]} \vee n_{[-1,0,1]} \vee n_{[0,1,1]}) \wedge (n_{[0,0,-1]} \vee n_{[-1,0,-1]} \vee n_{[0,1,-1]})$$

$$H_{+x,+y} = n_{[1,0,0]} \wedge n_{[0,1,0]} \wedge \overline{(n_{[-1,0,0]} \vee n_{[0,-1,0]})} \wedge n_{[-1,-1,0]} \wedge$$

$$(n_{[0,0,1]} \vee n_{[0,-1,1]} \vee n_{[-1,0,1]}) \wedge (n_{[0,0,-1]} \vee n_{[0,-1,-1]} \vee n_{[-1,0,-1]})$$

$$H_{+x,-z} = n_{[1,0,0]} \wedge n_{[0,0,-1]} \wedge \overline{(n_{[0,0,1]} \vee n_{[-1,0,0]})} \wedge n_{[-1,0,1]} \wedge$$

$$(n_{[-1,1,0]} \vee n_{[0,1,0]} \vee n_{[0,1,1]}) \wedge (n_{[0,-1,0]} \vee n_{[-1,-1,0]} \vee n_{[0,-1,1]})$$

$$H_{+z,+x} = n_{[0,0,1]} \wedge n_{[1,0,0]} \wedge \overline{(n_{[0,0,-1]} \vee n_{[-1,0,0]})} \wedge n_{[-1,0,-1]} \wedge$$

$$(n_{[-1,1,0]} \vee n_{[0,1,0]} \vee n_{[0,1,-1]}) \wedge (n_{[0,-1,0]} \vee n_{[-1,-1,0]} \vee n_{[0,-1,-1]})$$

$$H_{-y,-z} = n_{[0,-1,0]} \wedge n_{[0,0,-1]} \wedge \overline{(n_{[0,0,1]} \vee n_{[0,1,0]})} \wedge n_{[0,1,1]} \wedge$$

$$(n_{[1,0,0]} \vee n_{[1,1,0]} \vee n_{[1,0,1]}) \wedge (n_{[-1,0,0]} \vee n_{[-1,1,0]} \vee n_{[-1,0,1]})$$

$$H_{-y,+z} = n_{[0,-1,0]} \wedge n_{[0,0,1]} \wedge \overline{(n_{[0,0,-1]} \vee n_{[0,1,0]})} \wedge n_{[0,1,-1]} \wedge$$

$$(n_{[1,0,0]} \vee n_{[1,1,0]} \vee n_{[1,0,-1]}) \wedge (n_{[-1,0,0]} \vee n_{[-1,1,0]} \vee n_{[-1,0,-1]})$$

$$H_{+y,-z} = n_{[0,1,0]} \wedge n_{[0,0,-1]} \wedge \overline{(n_{[0,0,1]} \vee n_{[0,-1,0]})} \wedge n_{[0,-1,1]} \wedge$$

$$(n_{[-1,-1,0]} \vee n_{[-1,0,0]} \vee n_{[-1,0,1]}) \wedge (n_{[1,0,0]} \vee n_{[1,-1,0]} \vee n_{[1,0,1]})$$

$$H_{+y,+z} = n_{[0,1,0]} \wedge n_{[0,0,1]} \wedge \overline{(n_{[0,0,-1]} \vee n_{[0,-1,0]})} \wedge n_{[0,-1,-1]} \wedge$$

$$(n_{[-1,-1,0]} \vee n_{[-1,0,0]} \vee n_{[-1,0,-1]}) \wedge (n_{[1,0,0]} \vee n_{[1,-1,0]} \vee n_{[1,0,-1]})$$

A bent hole will be created if $H_{+x,-z} \vee H_{+z,+x} \vee H_{-y,-z} \vee H_{-y,+z} \vee H_{+y,-z} \vee H_{+y,+z}$ is true. A voxel that passes all of these tests is removed.

Once an image has been thinned (FIG. 8B), the intersections and endpoints of the fibers 12A are easily identified. Voxels with only one neighbor are endpoints and voxels with more than two neighbors are intersections.

Several problems complicate the thinning process when non-ideal images are analyzed. These include the presence of enclosed cavities, the presence of very thick (non fiber-like) structures and the presence of endpoints that are not fiber ends. Enclosed cavities occur infrequently in clean, sharp images and do not present a problem in the one embodiment. However, if large blobs appear due to dirt, shadows, or non-uniform lighting, an enclosed empty voxel location can expand during thinning to form a large, unthinnable bubble since the algorithm does not allow holes to be created in surfaces. This is not a problem with thin image structures since an enclosed empty voxel has no room to expand. To deal with the problem of bubble formation, a prescan is performed prior to thinning during which cavities are filled. A selected threshold value determines the maximum cavity size that will be filled. The larger this parameter, the longer the filling process. The presence of blobs also greatly increases the total thinning time since the blobs must be eliminated layer by layer. To speed up the thinning of thick image structures, the program preferably switches to a faster, non-uniform scanning pattern after a selected number of passes have been made. In this mode, all surface voxels that are removable are removed, regardless of their surface orientation.

The problem of endpoints that do not represent fiber ends is caused by image noise or fuzziness that can cause bumps to appear on the surface of fibers 12A which are not removed due to the non-shortening requirement of the thinning program. As the thinning progresses, these bumps become spurs protruding from the fiber surface. Elimination of these spurs is accomplished by recognizing that the spurs will preferably be as short as the radius of the fiber 12A. After thinning is completed, a final pass is made in which voxel chains of a length less than a selected threshold length are pruned off. Of course, if thick structures are present in the image, spurs may be created which are significantly longer than the fiber radius. These spurs are difficult to distinguish from true fibers 12A and can be a serious source of error.

The Thin3D program has a batch mode for processing lists of files and also has a public message port through which to serve as a "daemon", for thinning the files as requested by messages from MCFG or other programs in the system. A daemon is a process that runs in the background and performs specific services or tasks when it detects that the services or tasks need to be done. If messages are received faster than they can be processed, the Thin3D program creates a dynamically allocated list of messages and processes them in the order in which they were received.

The Thin3D program is able to display images as a 3D solid (FIGS. 8A and 8B). Voxels are represented as parallelepipeds having the same relative dimensions of the voxels, or preferably as cubes. The solid model can be rotated, translated and magnified by the user and printed to a PostScript™ printer or to a disk file.

The user interface for the Thin3D program, preferably consists of a small window with push buttons for loading, viewing, thinning, saving and printing animations as well as buttons for processing batches of files, aborting and requesting help. There are three integer controls for setting the cavity fill (fill), fast thinning (crush) and pruning (prune) thresholds. During thinning, the total number of voxels removed and the number removed during the previous pass are displayed along with the elapsed time. There are two checkmark controls for enabling and disabling the "daemon" mode and for controlling the voxel display mode. The program's icon is used to save the default directory, threshold values, daemon mode and isometric mode.

The 3D-FODAS program is the main analysis program which calculates the FOD from the thinned 3D images. The inputs to the program are the thinned 3D image, the voxel size and the refractive index of the sample 12. The program allows any subvolume of the image to be selected for analysis, and allows reversing of the coordinate axes to accommodate any imaging convention. The 3D-FODAS program has a built-in scripting language, a convenient batch mode for easy handling of large sets of images and a previewer for viewing animation files before analysis.

To begin the analysis, the 3D-FODAS program searches an image until the program finds a voxel that is set. Starting at this voxel, the program recursively follows all of the voxel chains that are contiguous with that voxel. As the program traverses each chain, the coordinates of each voxel located are stored. Upon reaching another junction or endpoint, the program takes the list of voxels and, treating them as point masses belonging to a rigid body, calculates the inertia tensor about the center of mass of the rigid body. The inertia tensor is reduced to tridiagonal form by Householder Reduction. The QL algorithm is then employed to solve the eigenvalue problem and to determine the principal moments of inertia. The smallest principal moment of inertia coincides with the axis of the fiber.

The length of the fiber is calculated from the number of voxels in the chain, the measured orientation and the voxel size. The length determination is simplified by the continuity definition used in the thinning process. Under this definition, a voxel is guaranteed to have no more than two neighbors, except at a junction. This means that one component of the fiber length is obtained by simply multiplying the number of voxels in the chain by the voxel size in the direction of that component. This is true only for the main voxel direction, which is defined as the axis direction which has the greatest voxel density in the direction of the fiber axis. That is, when traveling in the direction of the fiber, voxel boundaries in the main voxel direction will pass by most frequently. The main voxel direction is defined as:

$$\text{Main voxel direction } (d) = \begin{cases} x & \text{if } p_x/v_x \text{ is largest} \\ y & \text{if } p_y/v_y \text{ is largest} \\ z & \text{if } p_z/v_z \text{ is largest} \end{cases}$$

where $p_n$ is the component of the orientation vector in the direction of axis n, and $v_n$ is the voxel size in the direction of axis n.

Once the unit direction vector, and one length component are known, the fiber segment length is simply:

$$L = nv_d/|p_d|$$

where n is the number of voxels in the chain and d is the main voxel direction.

Due to the non-equal dimensions in x, y, and z, the orientation of very short fiber segments is strongly biased by the largest voxel dimension. To avoid this bias, voxel chains that are shorter than a selected threshold value are discarded. Additional measurements such as location of the midpoint and curvature can be made on a chain of voxels. This information is useful for investigating such things as fiber movement and bending during consolidation.

Figure 10:
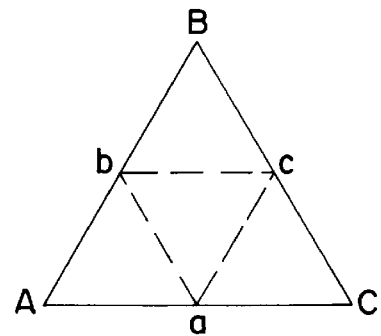
FIG. 10 is a front view of one face of the icosahedron showing the face divided into four triangles.

The 3D-FODAS program displays the fiber orientation data in a spherical histogram also known as a FOD plot (FIGS. 11, 13A to 13D, 14A to 14D and 15A to 15D). To form the spherical histogram of the fiber orientation data, the fibers 12A are binned according to their orientation. Each bin is incremented according to the true length of fiber material found oriented in the bin direction. The bins are defined by dividing the 3D orientation space defined by the faces of a subdivided unit icosahedron. An icosahedron is a polyhedron composed of twenty (20) equilateral triangles. Subdivision of the icosahedron is accomplished by dividing each triangle into four triangles (FIG. 10). The triangle (A,B,C) represents one face of the icosahedron. The points a, b, and c are created by finding the midpoints of line segments AB, BC and CA and normalizing them to unit length. The number of times the icosahedron is subdivided is referred to as the tessellation order and is selected by the user. The quantization error is made arbitrarily small by increasing the tessellation order. A tessellation order of four (4) is more than sufficient for most applications. Table 3 presents statistics about the subdivided icosahedron. The area values are given as a percentage of the total surface area.

TABLE 3

| | Icosahedron Statistics | | | | |
|---|---|---|---|---|---|
| Tessellation Order | 0 | 1 | 2 | 3 | 4 |
| Max. Quantization Error | 37.83° | 20.91° | 10.68° | 5.38° | 2.70° |
| Number of faces | 20 | 80 | 320 | 1280 | 5120 |
| Number of vertices | 12 | 42 | 162 | 642 | 2562 |
| Area per face | 5.00% | 1.25% | 0.31% | 0.08% | 0.02% |

Figure 11:
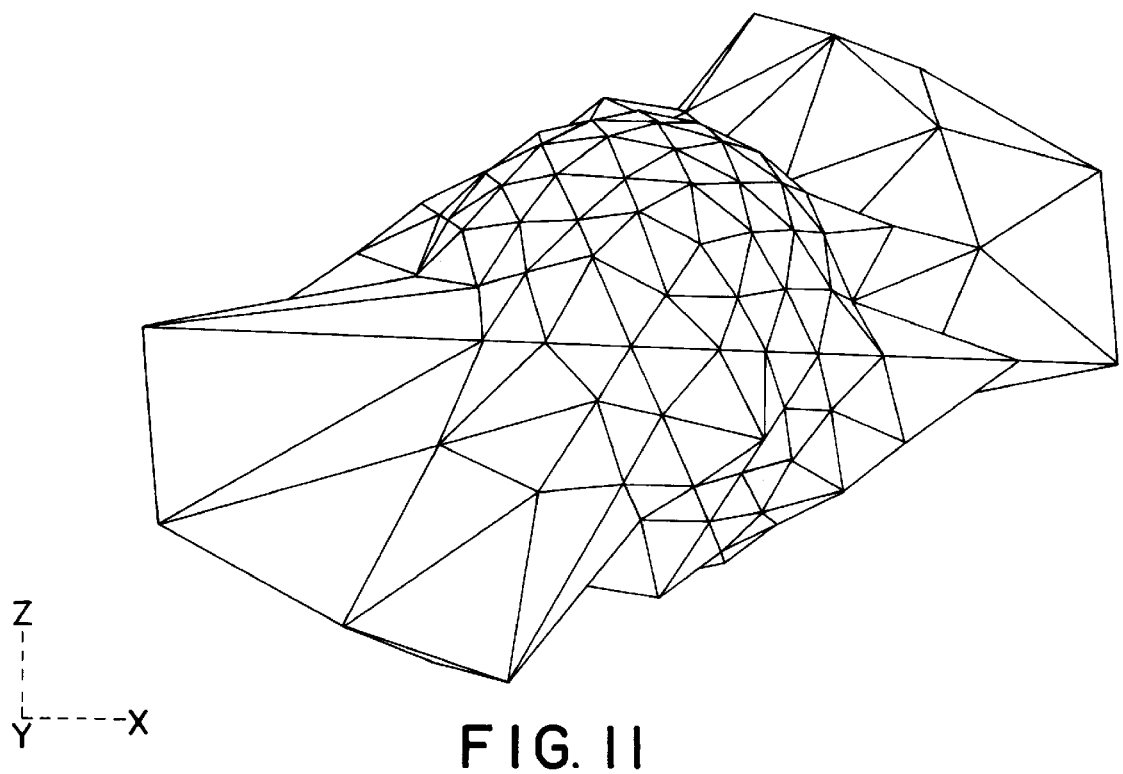
FIG. 11 is a spherical histogram showing the fiber orientation data created with a tessellation order of 2.

In a spherical histogram created with a tessellation order of 2, as shown in FIG. 11, the spherical core (sea level) represents zero fiber material. The elevations of the peaks extending from this level represent the total length of fiber material oriented in the directions of the peaks.

Once the orientation and length of the fiber segment have been determined these data are stored in a Hough transform coordinate system. This has the potential advantage of enhancing the analysis of fragmented images. The Hough transform is a widely used, patented 2D line detection algorithm (Hough, U.S. Pat. No. 3,069,654). The transform consists of mapping pixel coordinates into a domain in which pixels belonging to single line share the same coordinates. All of the points lying on a line have the same perpendicular distance, r, to the origin for a specific value of 0. This means that each pixel contributes evidence of the existence of a line independent of the other pixels belonging to that line. The Hough transform is able to detect discontinuous lines and is used in conjunction with the 3D thinning program to handle highly discontinuous lines. The Hough transform enhances the identification of individual fibers with a concomitant degradation in the accuracy of fiber length measurement and is included as an option in the 3D thinning program for use with poor quality images. The 2D Hough transform requires two parameters to define a line. The two parameters are divided into intervals defining a 2D accumulator array in which lines appear as peaks. In the case of 3D images, four parameters rather than two are required to define a line, (e.g., two components of a normalized direction vector and two intercept coordinates). One of these four parameters is eliminated by taking advantage of the discretized nature of the orientation storage space; in this case, the subdivided icosahedron. By numbering each vertex of the icosahedron, all directions are represented by a single number. Thus, a three-dimensional line is fully specified by an orientation index number and two intercept coordinates. To minimize errors due to the quantization of orientations, the intercept coordinates are chosen to be those of the coordinate plane that is most perpendicular to the fiber. For example, if the fiber were parallel to the z-axis, its x, y intercept coordinates would be used in the transformation. The 3D Hough transform can be represented as H(i,j,k) where i is the index of the icosahedron vertex and j, k is the intercept of the plane most perpendicular to direction i. Thus, by detecting maxima in the i, j, k space, the location of fiber segments are obtained, even if the fiber voxels are discontinuous.

Once all of the fiber structures in the image have been traversed, the orientation data consists of a collection of orientation vectors corresponding to the vertices of the subdivided icosahedron whose lengths are proportional to the amount of fiber material found in each orientation. This is the FOD. The FOD is displayed by the 3D-FODAS program as a spherical plot which can be rotated in three-dimensions. The plot is sent directly to a PostScript™ printer for a high quality hard copy or to a plot file. Several different types of data files are saved to disk including a FOD file listing all orientations and the corresponding amount of fiber material, and the accumulators of the Hough transform. The data are also reduced to tensor form for direct application in tensor based models of material property. A display of the fiber segment length distribution is also available. A fiber 12A which is intersected by several other fibers 12A appears to the 3D-FODAS program as a series of fiber segments whose lengths add up to the total fiber length. Thus, the weighing of the FOD is correct, but the fiber length distribution is not. It gives only the fiber segment length distribution. The length data are provided only as an indication of the amount of fiber crossings and discontinuities in the image. Of course, the length distribution data will be correct if there are no fiber intersections or discontinuities in the image.

The user interface for the 3D-FODAS program, preferably consists of a window containing controls for selecting the file(s) to be analyzed, reversing axes, displaying and setting the dimensions of the scan volume, the refractive index, the threshold for discarding short voxel chains, the tessellation order and the Hough transform parameters, and for previewing animations, analyzing images, batch processing, script processing, aborting, and obtaining help. The status line displays the current status of the program at all times. The program's icon is used to set the default directory, and the default values for the parameters listed above.

Figure 12:
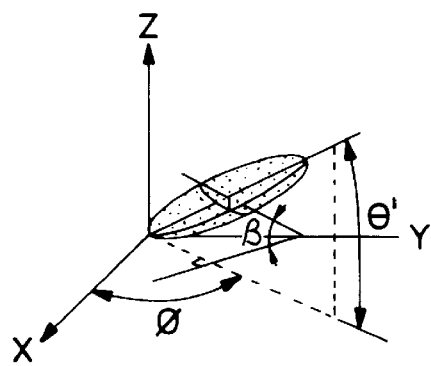
FIG. 12 is a 3D coordinate system showing the ellipsoid angles θ (the rotation angle) of the major axis in the x-y plane. θ' (the elevation angle of the major axis from the x-y plane) and β (the rotation angle of the intermediate axis about the major axis).
Figure 13A:
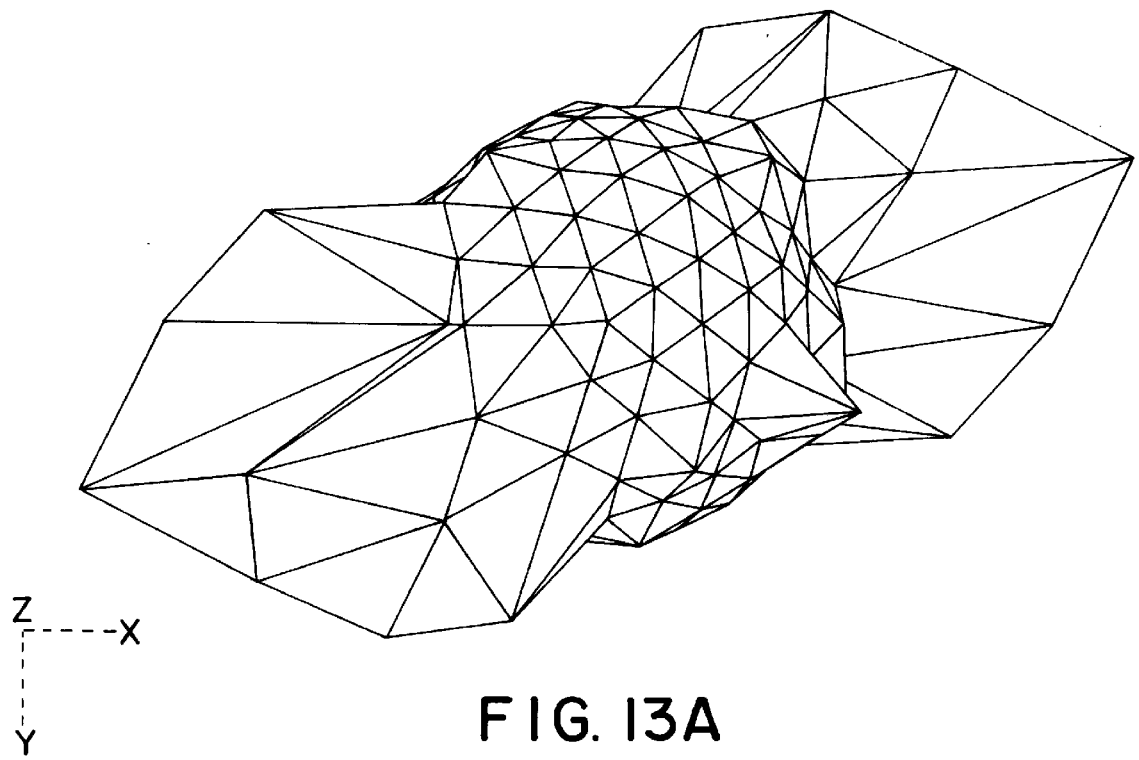
FIGS. 13A to 13D show the FOD of the orthogonal sample of Example 4 viewed from the negative z axis.
Figure 13B:
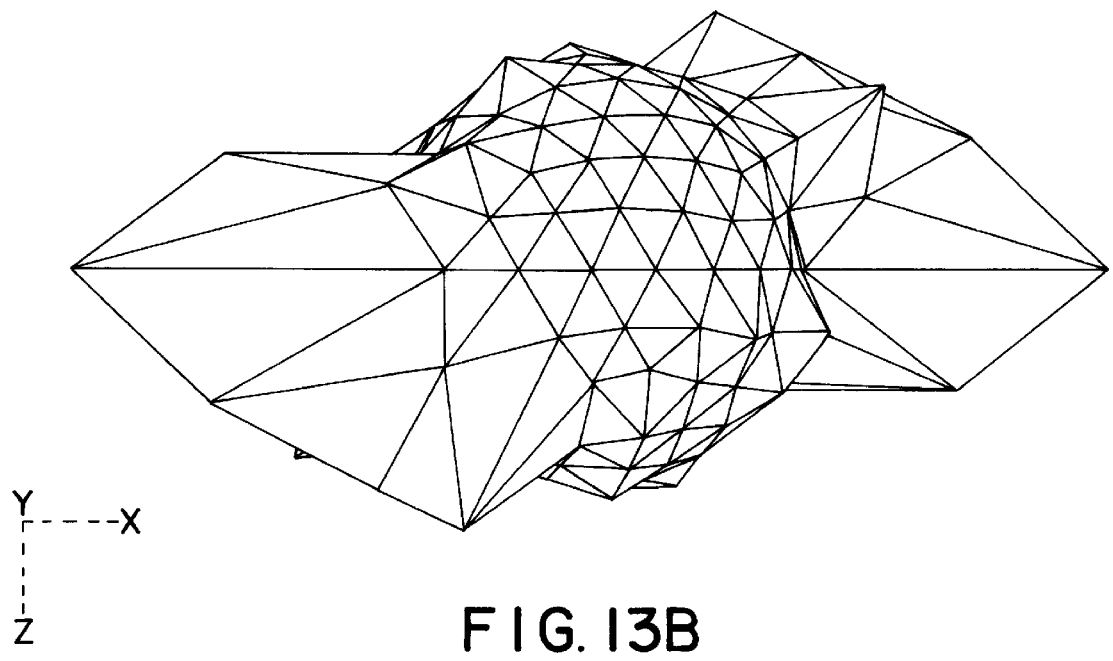
Figure 13C:
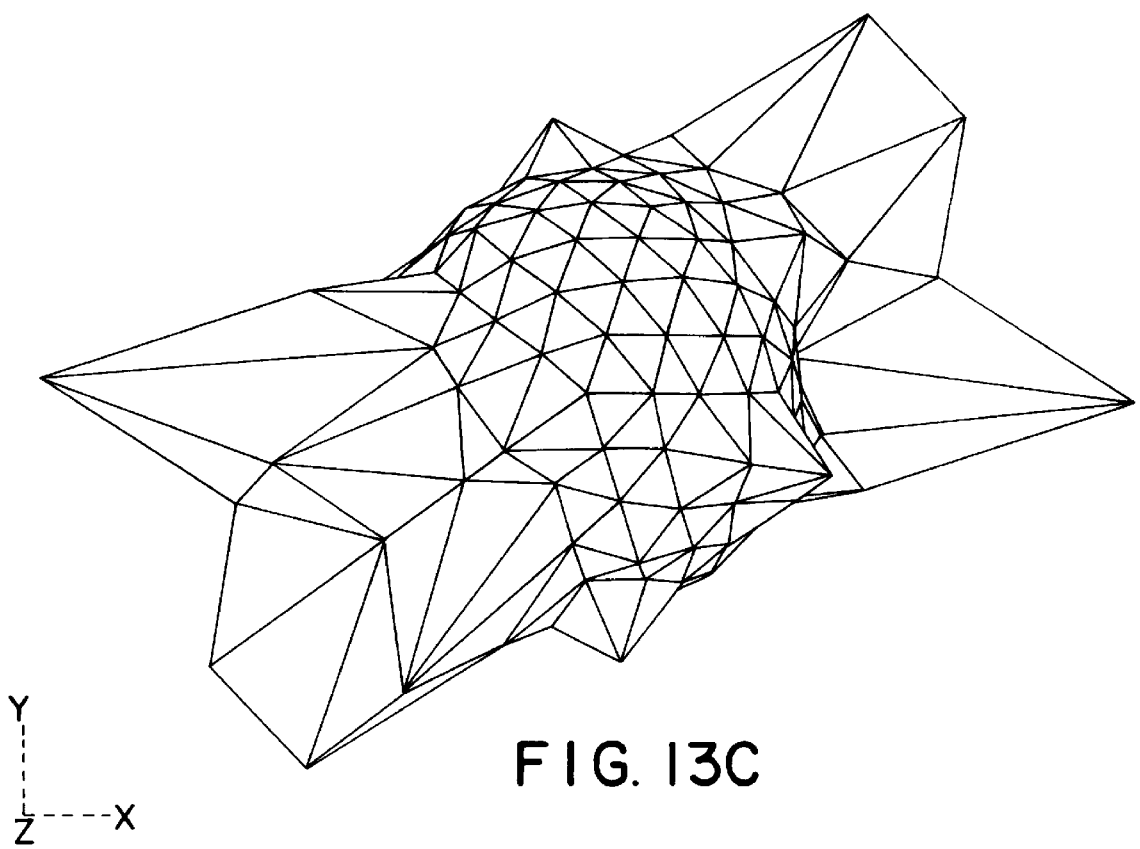
Figure 13D:
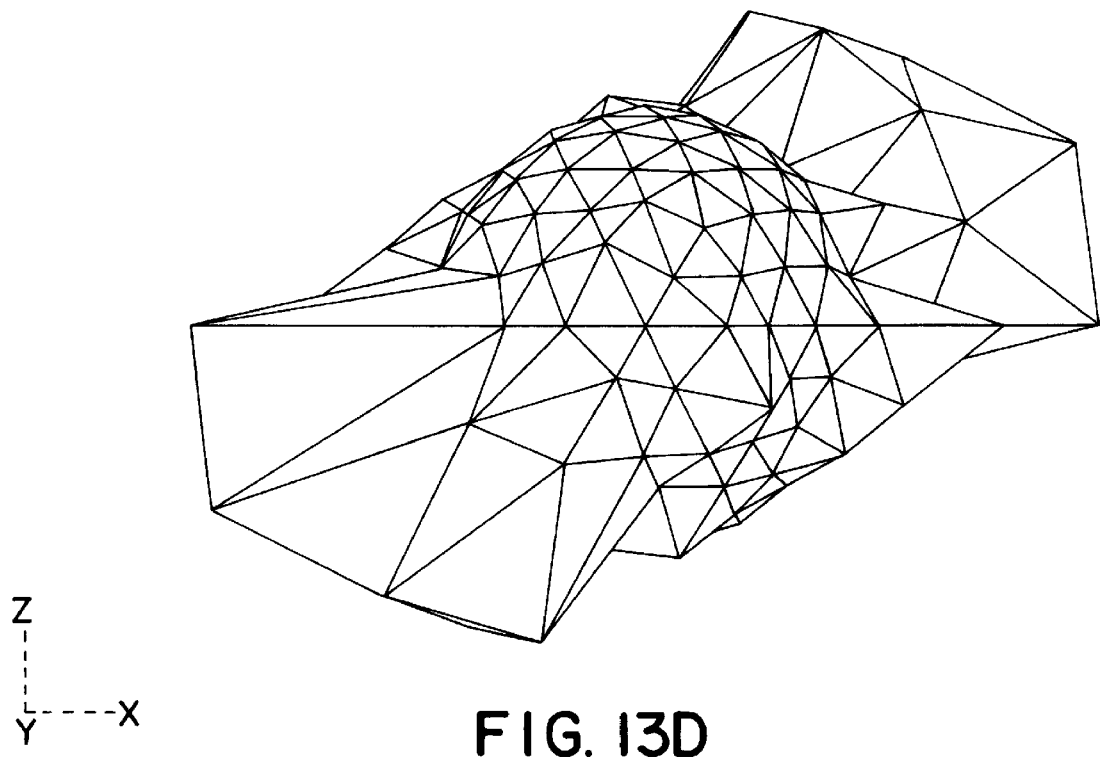
Figure 14A:
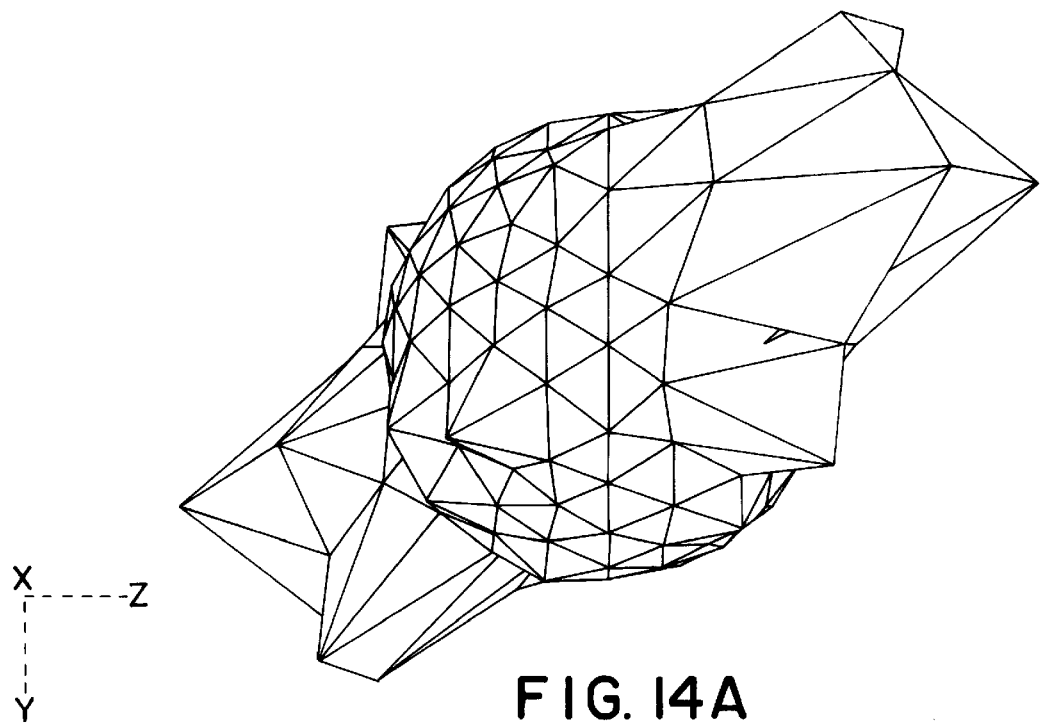
FIGS. 14A to 14D show the FOD of the orthogonal sample of Example 4 viewed from the positive x axis.
Figure 14B:
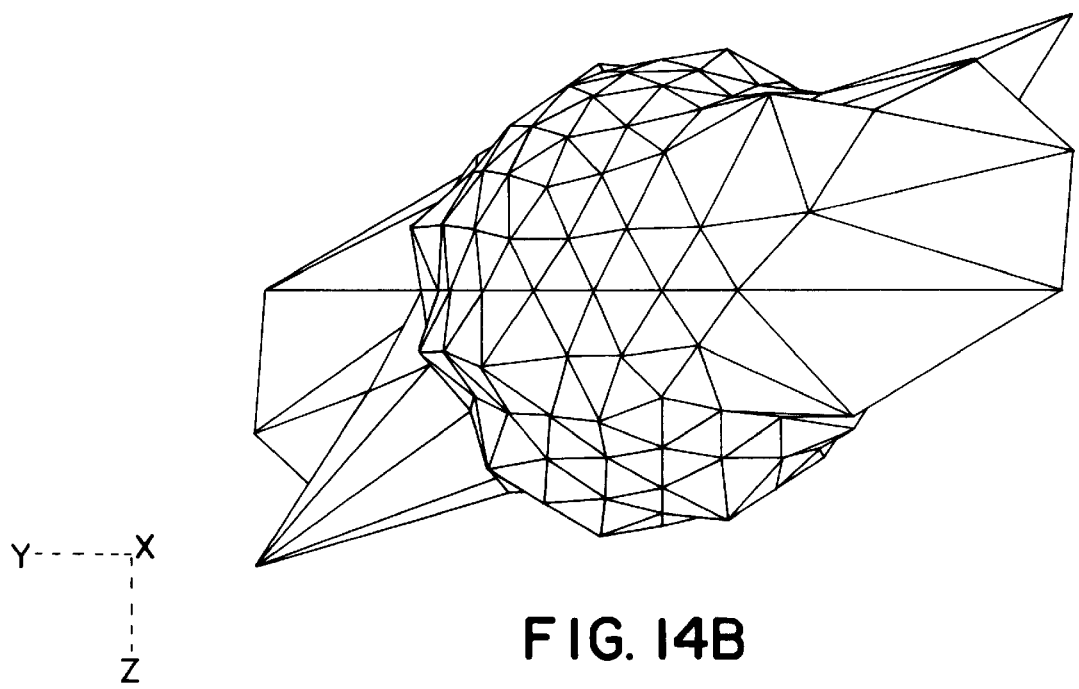
Figure 14C:
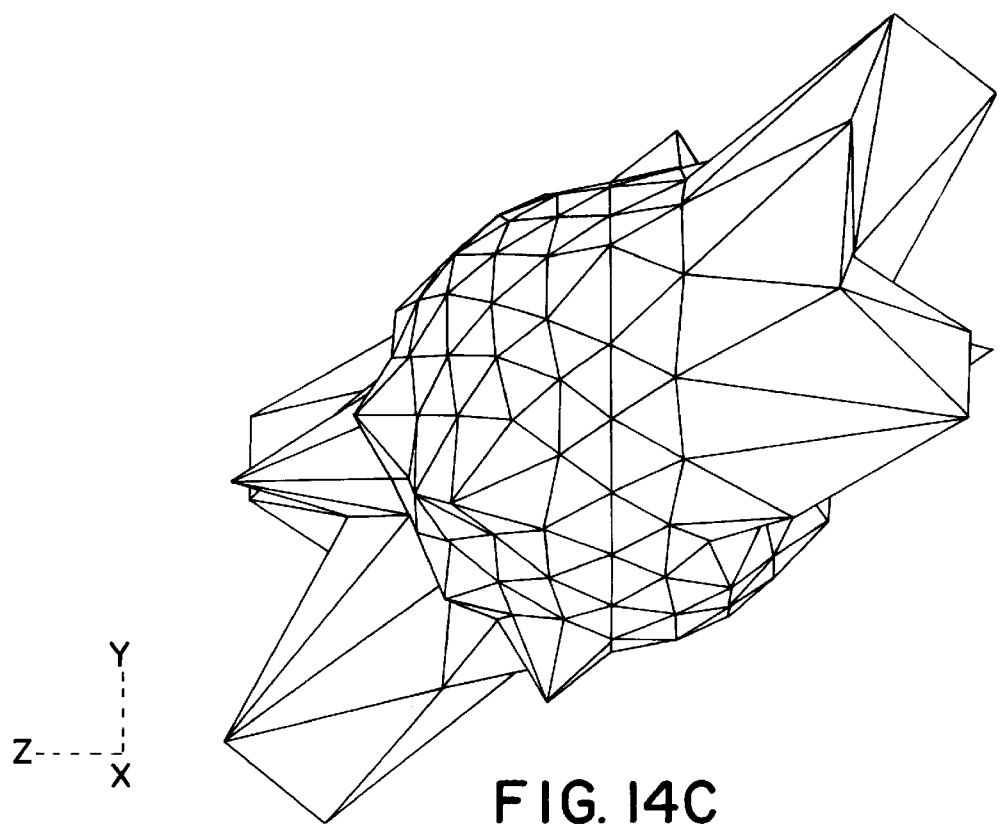
Figure 14D:
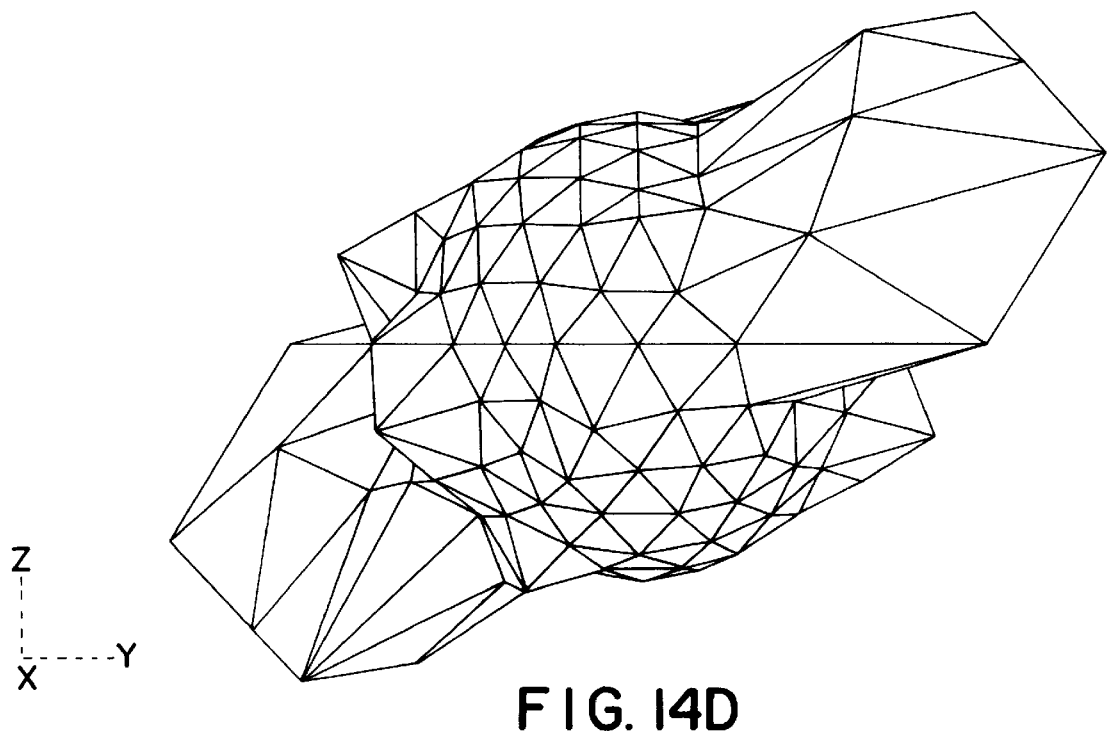
Figure 15A:
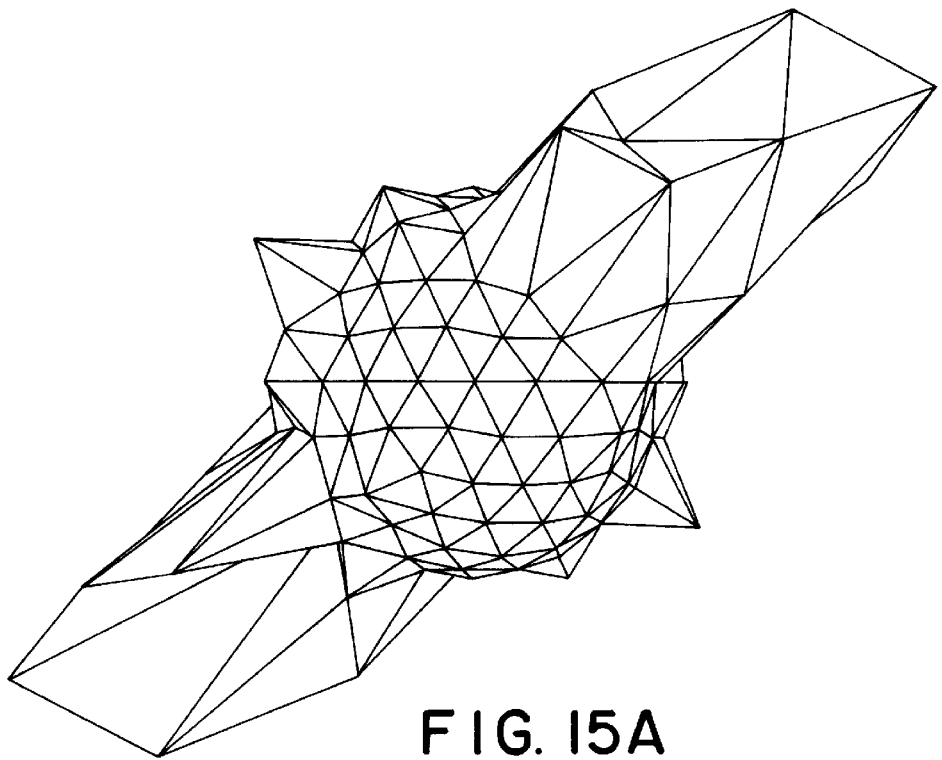
FIGS. 15A to 15D show the FOD of the orthogonal sample of Example 4 viewed from the negative y axis.
Figure 15B:
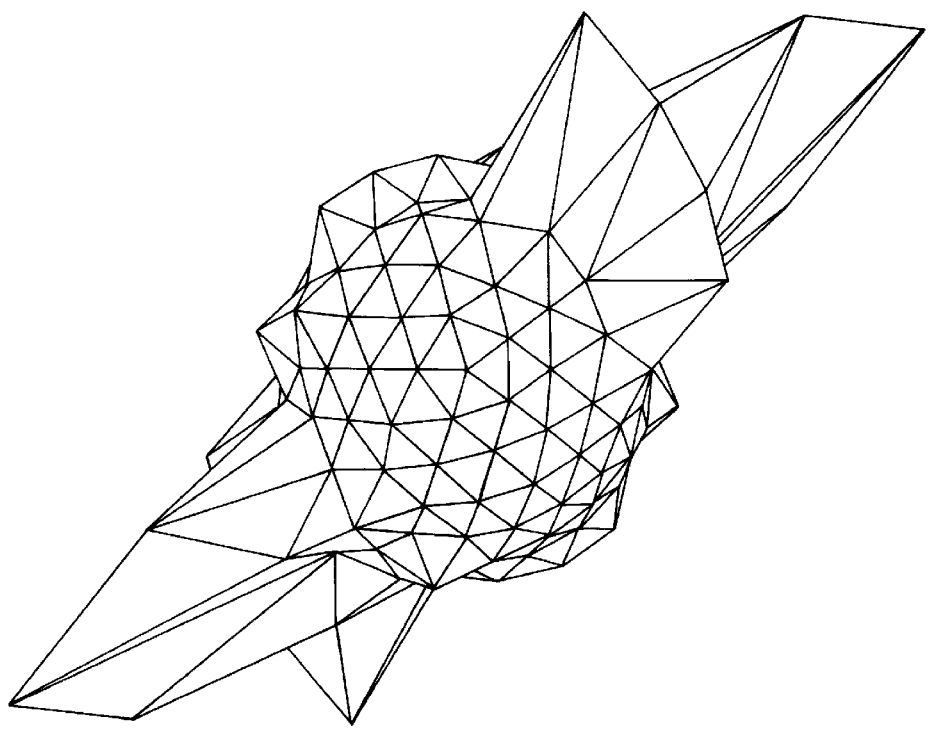
Figure 15C:
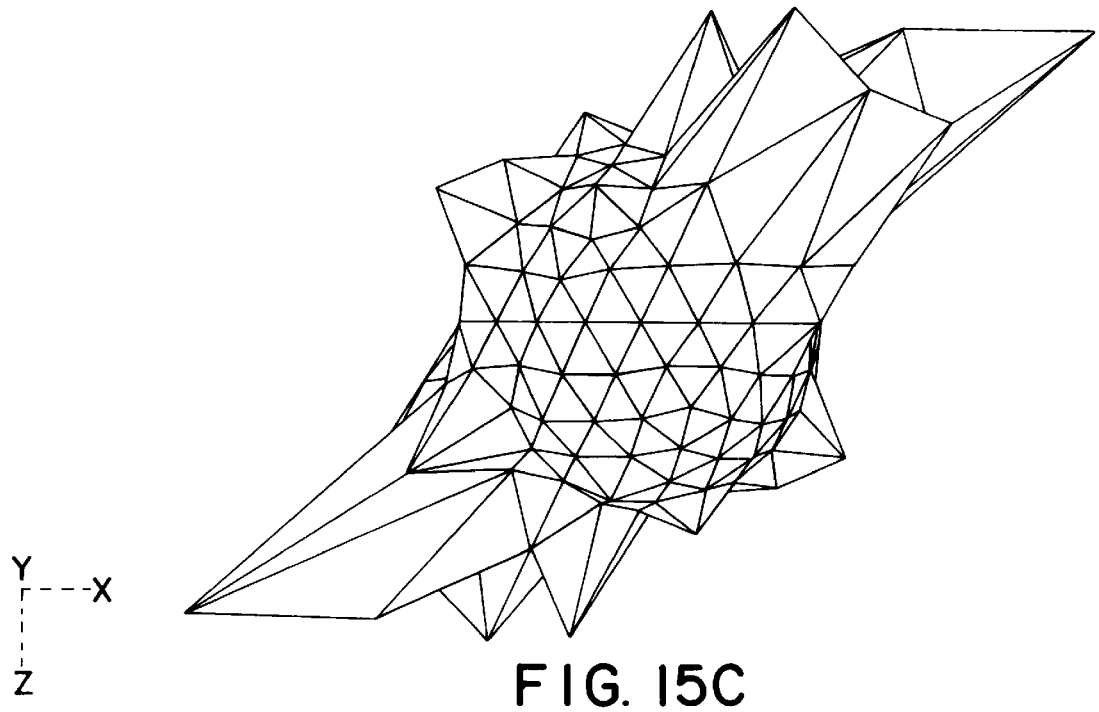
Figure 15D:
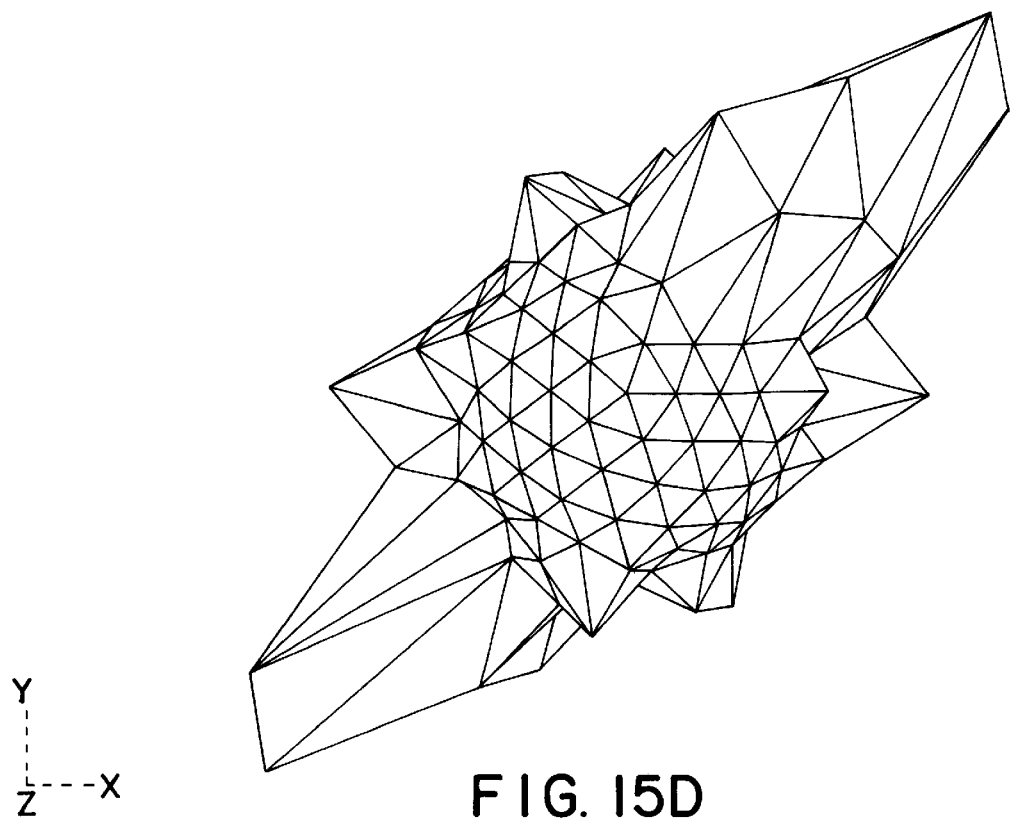
Figure 16A:
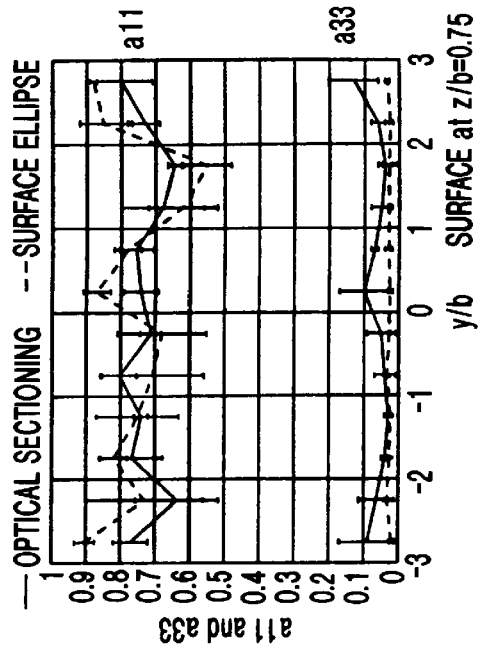
FIGS. 16A to 16D show comparisons of tensor components $a_{11}$ and $a_{33}$ from sample A in Example 5 acquired by the optical sectioning method and the surface ellipse method.
Figure 16B:
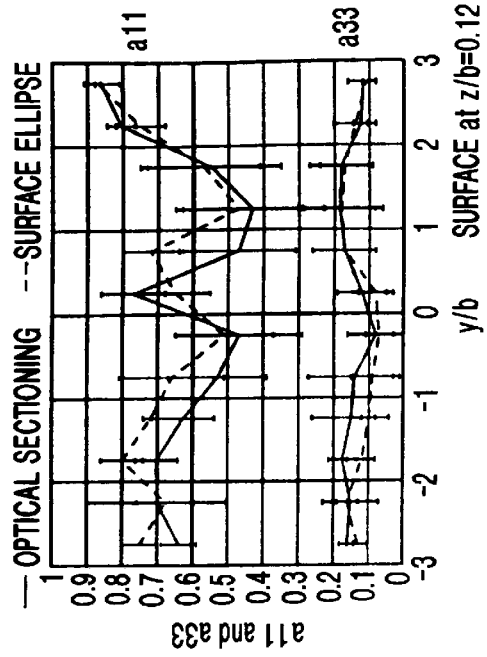
Figure 16C:
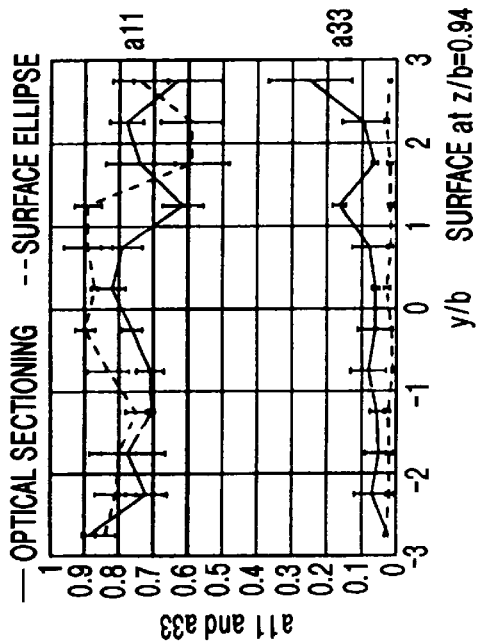
Figure 16D:
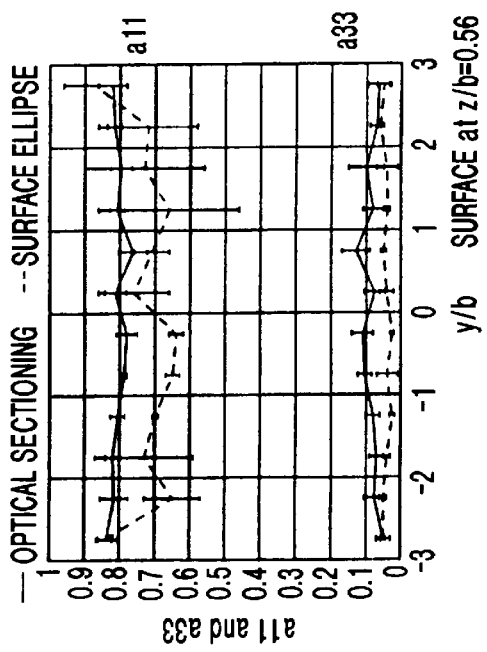
Figure 17A:
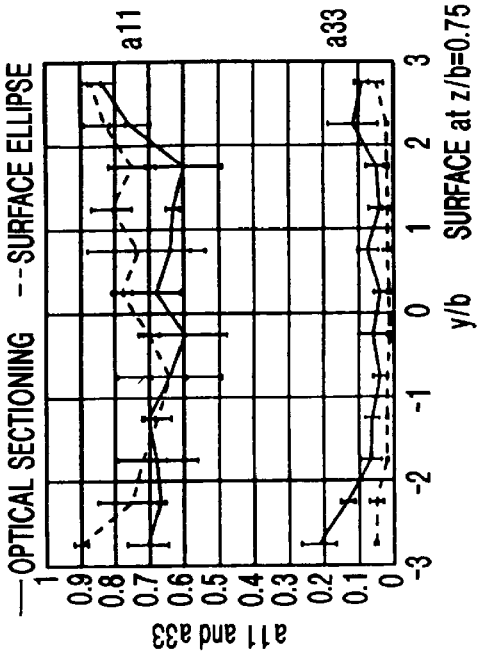
FIGS. 17A to 17D show comparisons of tensor components $a_{11}$ and $a_{33}$ from sample B in Example 5 acquired by the optical section method and the surface ellipse method.
Figure 17B:
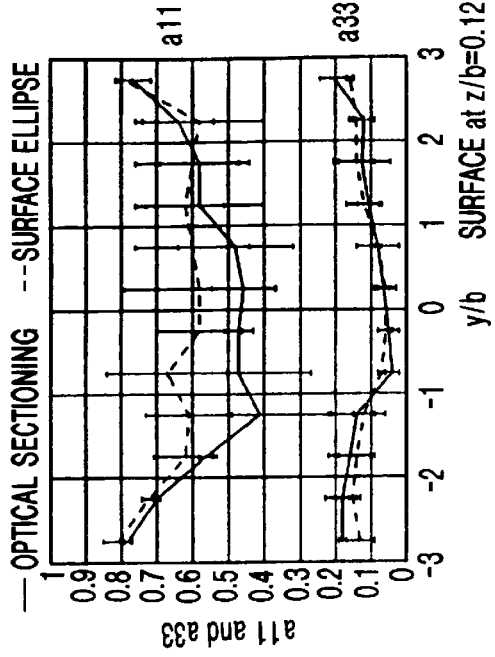
Figure 17C:
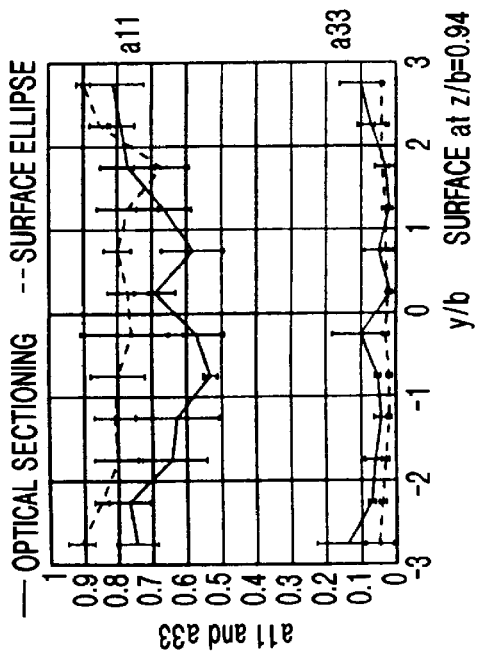
Figure 17D:
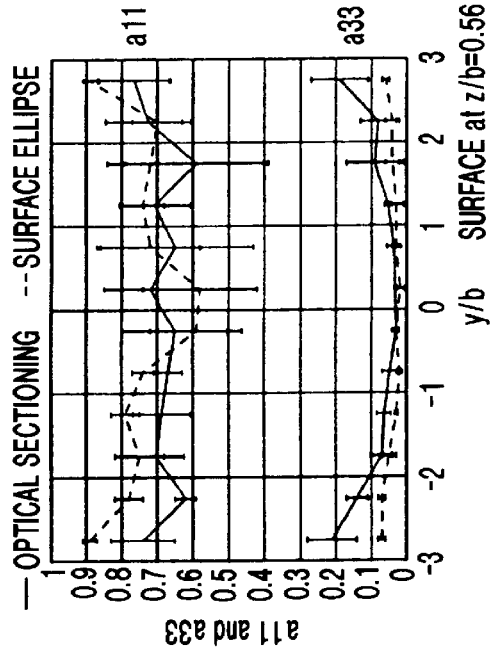
Figure 18A:
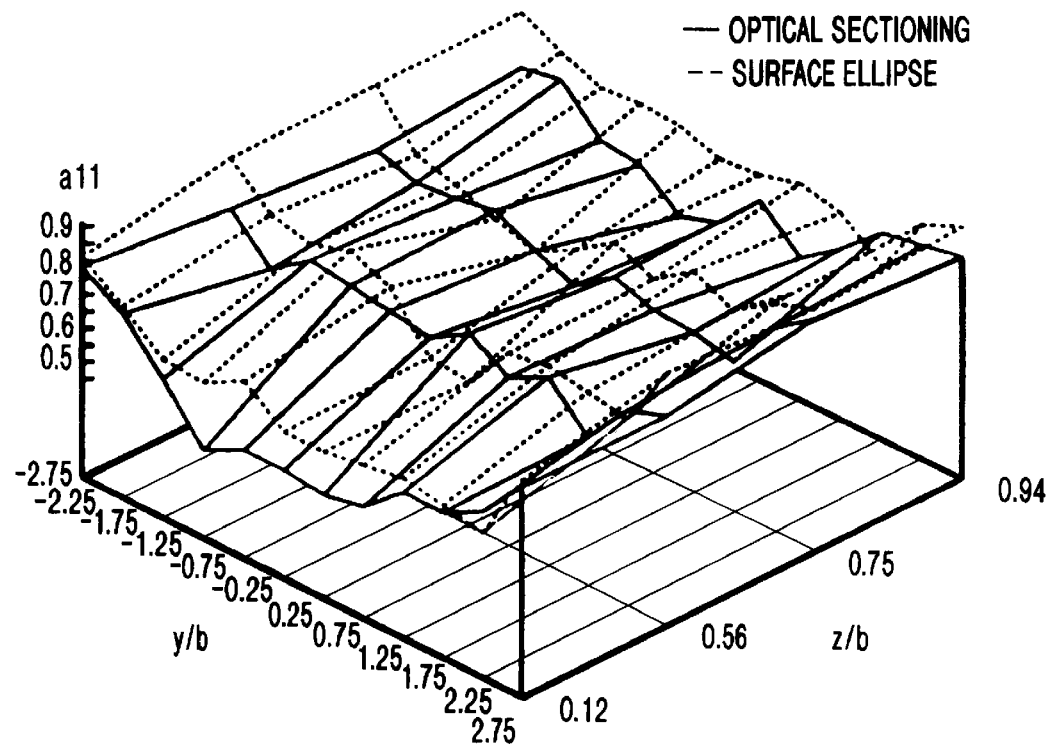
FIGS. 18A and 18B are 3D views of the $a_{11}$ and $a_{33}$ tensor components from sample A of Example 5.
Figure 18B:
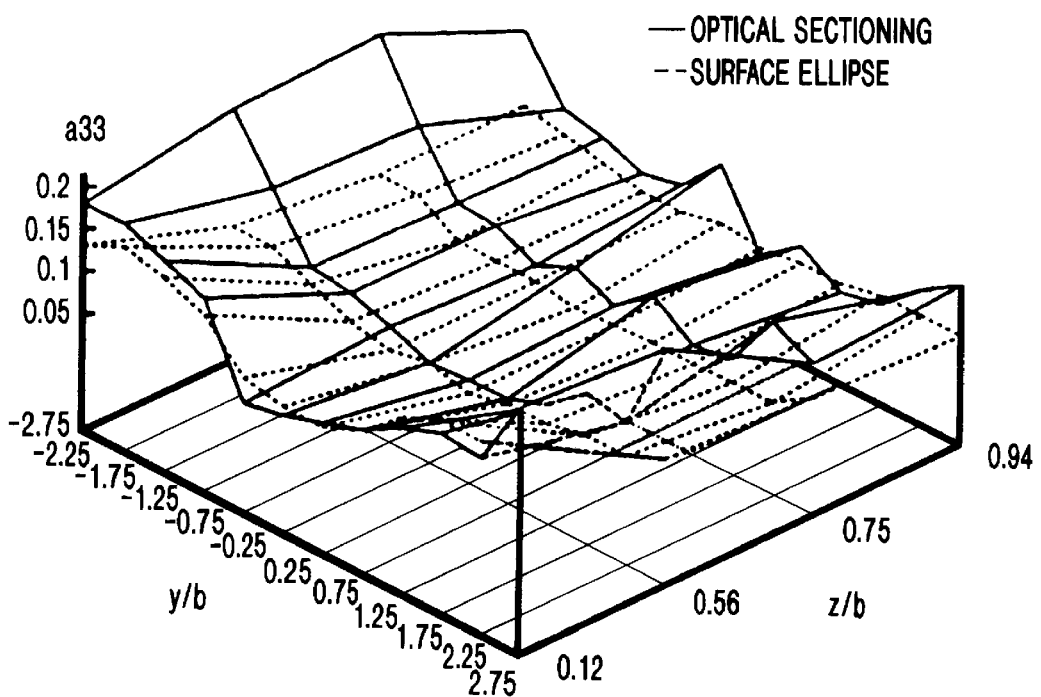
Figure 19A:
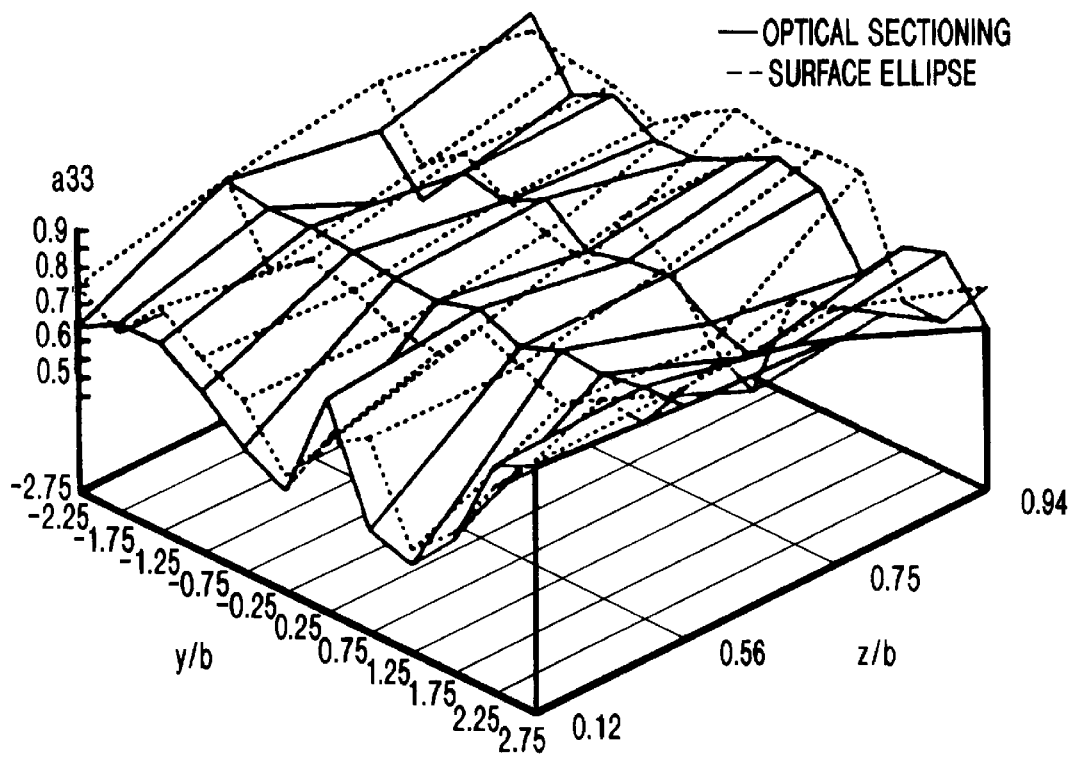
FIGS. 19A and 19B are 3D views of the $a_{11}$ and $a_{33}$ tensor components from sample B of Example 5.
Figure 19B:
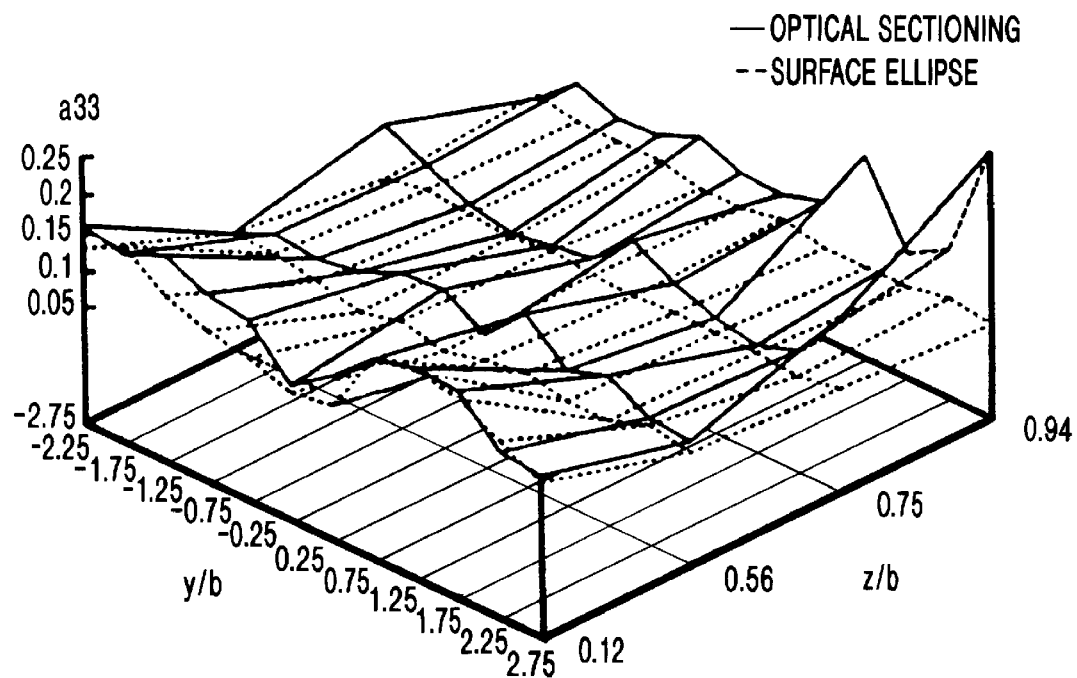
Figure 20A:
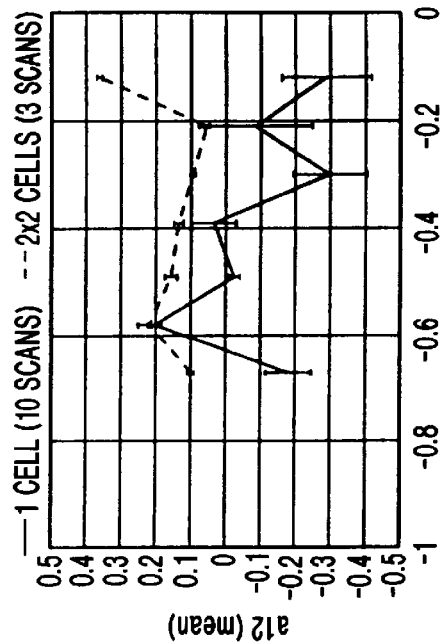
FIGS. 20A to 20F show the results of Example 6 with the six orientation tensor components plotted as functions of dimensionless penetration depth.
Figure 20B:
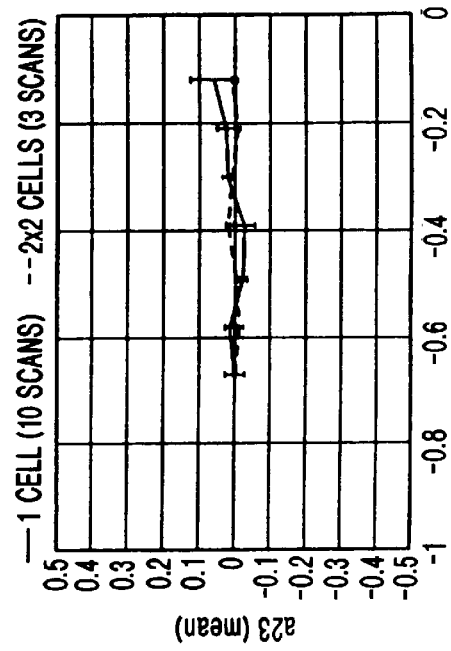
Figure 20C:
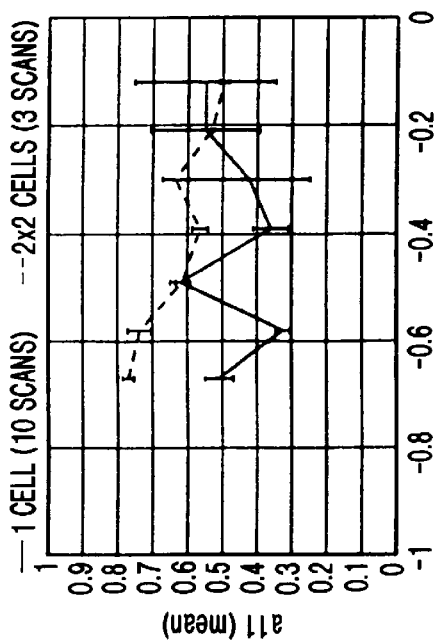
Figure 20D:
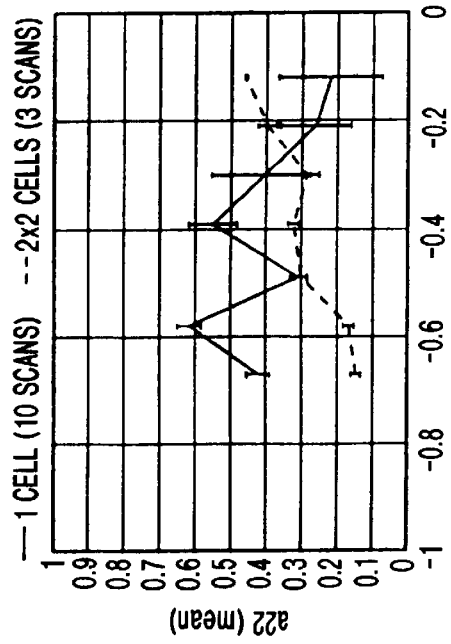
Figure 20F:
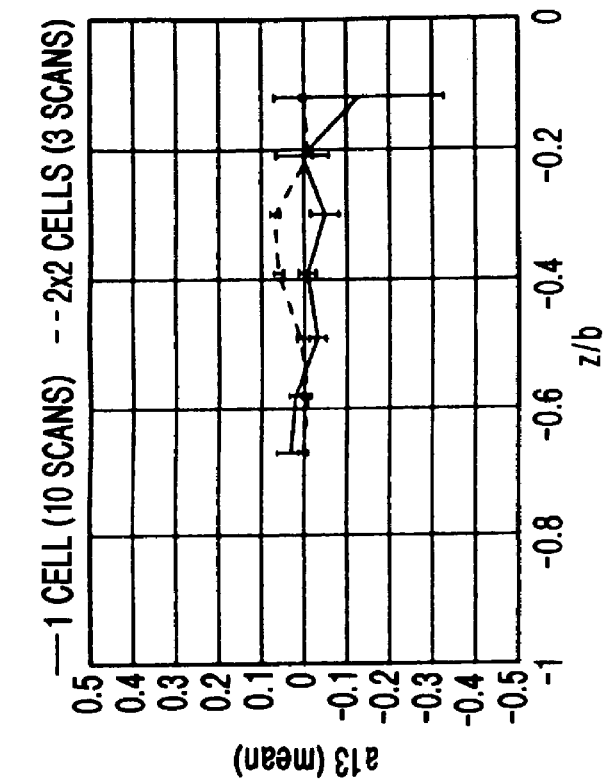
Figure 20E:
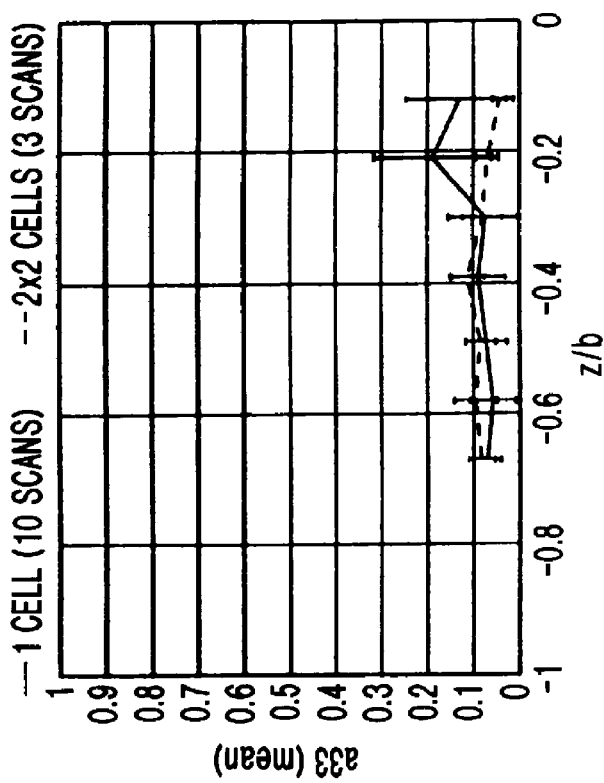

The DiffFOD program combines and compares FODs. In particular, the program displays the orientation and lengths of the principal axes of the fiber orientation tensor. The orientation information is displayed in a readily interpreted form: the rotation angle, $\phi$, of the major axis in the x-y plane, the elevation angle, $\theta'$, of the major axis from the x-y plane, and the rotation angle, 3, of the intermediate axis about the major axis (FIG. 12).

The program will compare any FOD with a reference distribution and will display the differences between the two orientation tensor statistics. The program is capable of displaying three types of information, the reference FOD data, the comparison FOD data, and the difference between them. In each case, the average value for each column of data is also displayed. In the difference display, an additional column is displayed which gives the tensor deviation, which is a scalar measure of the difference between two tensors. The DiffFOD program takes the square root of the sum of squares of the differences between corresponding elements of the tensor array. The difference, or deviation between FOD tensors $a_{ij}$ and $b_{ij}$ is defined as follows:

$$Dev = 1/2 \sum_{i=1}^{3} \sum_{j=1}^{3} (a_{ij} - b_{ij})^2$$

The factor of ½ normalizes the difference so that it ranges from 0 to 1.

The DiffFOD program is also able to combine several FODs together. This is useful for combining results from a series of similar samples 12 or from a neighborhood of a single sample 12 to provide a greater number of tracer fibers 12A in the sample population.

The user interface for the DiffFOD program, preferably consists of a scrollable main display area where the FOD names and data are displayed. There are controls for loading and saving reference and sample FODs, and for saving the comparison and raw data. A cycle control cycles the display between reference, sample, and difference displays. Three controls which are labeled X, Y, and Z allow the user to select which axes will be combined. A final control, labeled "Master" creates a master FOD field by combining the FODs from two or more similar samples 12 cell by cell to create a representative sample FOD. The program's icon is used to set the default directory, combination flags and display mode.

The Fibor program provides a graphic representation of the FOD field of a sample 12. The program allows the human observer to visualize global trends in the fiber orientation. The orientation field is preferably able to be viewed from any of the three coordinate planes and at any layer within the sample 12. The Fibor program reads the FOD files created by the 3D-FODAS program and calculates the projection of the orientation tensor ellipsoid by solving the eigenvalue problem for the appropriate four-component 2D tensor taken from the nine-component 3D FOD tensor.

$$a_{ij} = \begin{vmatrix} a_{11} & a_{12} & a_{13} \\ a_{21} & a_{22} & a_{23} \\ a_{31} & a_{32} & a_{33} \end{vmatrix}$$

$$a_{xy} = \begin{pmatrix} a_{11} & a_{12} \\ a_{21} & a_{22} \end{pmatrix},$$

$$a_{yz} = \begin{pmatrix} a_{22} & a_{23} \\ a_{32} & a_{33} \end{pmatrix},$$

$$a_{xz} = \begin{pmatrix} a_{11} & a_{13} \\ a_{31} & a_{33} \end{pmatrix}.$$

The projected ellipses have major and minor axes whose lengths and orientations are the eigenvalues and eigenvectors of the four-component tensor. The eigenvalues are:

$$\lambda_e = \frac{a_{ii} + a_{jj}}{2} \pm \sqrt{\frac{(a_{ii} + a_{jj})^2}{4} - a_{ii}a_{jj} + a_{ij}^2}.$$

In this equation and the one below repeated indexes do not imply summation. The eigenvectors are:

$$v_e = \begin{pmatrix} -a_{ij} \\ a_{ii} - \lambda_e \end{pmatrix}$$

The Fibor program loads the selected FOD files and calculates the projection of the FOD tensor ellipsoids on the selected plane. The user can magnify and scroll the display using the cursor keys to allow close inspection of selected regions, or reduce the display size for an overall view of the FOD field.

The user interface for the Fibor program preferably consists of a window with controls for selecting a group of FOD files and the projection plane. Output is alternately directed to the screen, the printer or a disk file. There is also an on-line help facility. The program's icon is used to set the default directory, voxel dimension and index of refraction.

IN USE

To form the sample 12, the sample material containing the matrix material and the fibers 12A is produced. Before the fibers 12A are introduced into the preferably powdered matrix material, the fibers 12A are precut by the chopper to lengths similar to that expected to result from breakage in an industrial-type injector (not shown). The glass fibers and the carbon trace fibers 12A are preferably both chopped to the same length. The fibers 12A are then mixed together with the matrix material. In order to achieve a uniform distribution of fibers 12A, the powdered matrix material and fibers 12A are mixed in a beaker with a high speed whip.

Next, the mold 16 of the injection molding apparatus 14 is cleaned and coated with a silicon-based mold release compound and assembled. The mold 16 is inserted into the base of the fixture 50 and the injector nozzle 48 is clamped down onto the injection port 22 of the mold 16. A charge of sample material is introduced into the injection barrel 44 either as powdered plastic mixed with fibers 12A, or as a solid preformed cylinder preferably 0.5 inches (1.27 cm) in diameter produced with a standard injection molding machine (not shown).

The injector piston 46 is then inserted into the barrel 44 and electrical power is supplied to the mold 16 and injector heaters 24. Once the desired temperatures have been reached, the hydraulic power unit 36 is activated and the injection piston 46 forces the plastic/fiber melt into the mold 16 at the rate and pressure determined by the settings of the hydraulic unit 36. The pressure is held until the material has solidified. Next, the mold 16 is removed and disassembled and the sample 12 is removed. The monitoring of the formation of the sample 12 using the injection molding apparatus 14 is conducted by the user through the Acquire program.

Next, the sample 12 is optically sectioned to produce the imaging data. To optically section the sample 12, the sample 12 is placed on an indexing table mounted on the microscope stage 60A. The sample 12 is then scanned by the microscope 60 in the field of view of the microscope 60 along the line of the optical axis of the microscope 60. In the one embodiment, the optical axis (depth of view) is z and the horizontal field of view location is x-y. In this embodiment, the field of view is preferably 0.797 mm×1.077 mm and the depth of view is 17 µm.

The sample 12 can be moved on the microscope stage 60A in order to change the location of the field of view of the microscope 60 in the sample 12. This allows the sample 12 to be optically sectioned at various sites. In addition, the sample 12 can be rotated such that the field of view of the microscope 60 is no longer along the same axes of the sample 12. This allows a comparison of results from different orientations in order to increase the confidence level of the FOD results for the sample 12.

The acquired images are then converted to binary format by thresholding the pixels at a value of 128 using the MCFG program as described above. Due to anomalous behavior of the frame grabber 66, the left most two columns of pixels contain erroneous data and are discarded. The resulting binary images are thinned using the Thin3D program. In the one embodiment, the following parameters were used: fill=20 (cavities with volumes less than or equal to 20 voxels were filled), crush=7 (the fast thinning mode was begun on pass number 7) and prune=5 (voxel chains having one free end and consisting of 5 voxels or less were pruned from the final images).

The images are then analyzed by the 3D-FODAS program. In the one embodiment, the following settings were used: tessellation=3 (the unit icosahedron was subdivided 3 times for a maximum quantization error of 5.38°), discard=15 (chains less than 15 voxels long were discarded), neighbors=0, and threshold=0. Note that 15 voxels is 50.5 µm in the x direction, 29.9 µm in the y direction, and 223.5 µm in the z direction. In this embodiment, no Hough transform manipulation of the data was performed and less than 5% of the tracer fibers 12A were less than 223.5 micron long with very few of that group oriented in the z direction.

Finally, a qualitative representation of the data is obtained by viewing the FOD fields with the Fibor program.

EXAMPLE 1

The first experiment was used to evaluate and calibrate the capabilities of the system with real fiber data with regard to the optical sectioning ability of the method. The experiment acquired 3D images of individual, single fibers of known orientations and evaluated the measured data produced by the optical sectioning process.

To evaluate the accuracy of the measurement of the in-plane component of the fiber orientation, a sparse population of short tracer fibers 12A was molded into a PMMA sample 12 and placed on a rotary indexing table mounted on the microscope stage 60A. Two neighboring fibers 12A were selected and positioned at the center of the field of view of the microscope 60. The fibers 12A were scanned in their original position, the table was indexed by 10° in the horizontal plane, and the scanning was repeated. This was done for a total of 90° of rotation.

To evaluate the accuracy of out-of-plane measurements, a thin epoxy sample having an embedded long, straight carbon fiber was mounted on a rotary indexer oriented perpendicular to the optical axis of the microscope 60. The indexer was adjusted so that the fiber was initially in the horizontal plane oriented in the direction of the x axis. The fiber was scanned in its original position and in 10° degree increments to ±40 degrees in the x-z plane. Further rotation was impossible due to contact with the objective lens of the microscope 60. This same procedure was repeated for the y-z plane.

The largest error in the orientation angle measurements for the two fibers was less than 3°. The magnitude of these errors was in the range of the quantization error for the binning. The calculated angles prior to binning are expected to be more accurate than these results demonstrate, which means that the angle error would be reduced by binning on an icosahedron which has been further subdivided. The maximum error in the length measurement was approximately three percent (3%). The images for these calibrations were obtained under ideal circumstances. No overlapping of fibers was present and the images were very clean.

EXAMPLE 2

In the second experiment, the sample consisted of a single carbon fiber in Norland Optical Adhesive 61, manufactured by Norland Products, Inc., of New Brunswick, N.J. The fiber was first oriented parallel to the imaging plane and then rotated out of the imaging plane in 10° increments. Table 4 presents the results. The left half of the table shows rotations in the x-z plane, the right half shows rotations in the y-z plane. The sample from which the images were obtained contained several additional fibers, some of which overlapped the fiber under investigation. The error in the measurement of these out-of-plane angles was less than 2°. The measured length of the fiber is not presented because the fiber was longer than the field of view and thus, appeared to become longer with increasing angles of rotation. The range of rotation angles was limited to ±40° due to physical interference between the sample and the objective lens of the microscope.

TABLE 4 z Calibration - Single fiber in epoxy.

| | x–z Plane | | y–z Plane | |
|---|---|---|---|---|
| True Angle (°) | Measured Angle (°) | Error Angle (°) | Measured Angle (°) | Error Angle (°) |
| −40° | −38.5 | 1.5 | −38.4 | 1.6 |
| −30° | −30.5 | −0.5 | −30.4 | −0.4 |
| −20° | −20.1 | −0.1 | −19.1 | 0.9 |
| −10° | −10.2 | −0.2 | −10.8 | −0.8 |
| 0° | 0.0 | 0.0 | 0.0 | 0.0 |
| 10° | 8.1 | −1.9 | 10.8 | 0.8 |
| 20° | 20.1 | 0.1 | 19.1 | 0.9 |
| 30° | 31.7 | 1.7 | 31.0 | 1.0 |
| 40° | 39.4 | −0.6 | 38.4 | 1.6 |

EXAMPLE 3

To investigate steeper inclination angles including those in the direction of the optical axis, a y-shaped fiber holder was constructed of very fine copper wire. A single fiber was stretched between the arms of the holder and positioned in front of the objective lens. In this case, rotations for optically sectioning the sample were made in the x-z plane in 10° increments for a total rotation of 90°. The maximum error in the measured angles was 3.4°. Similar results were found for the y-z plane (Table 5) shows the results for the x-z plane.

TABLE 5 x–z Calibration with a single fiber in air

| True Angle (°) | Measured Angle (°) | Error Angle (°) |
|---|---|---|
| 0 | 0.0 | 0.0 |
| 10 | 10.2 | 0.2 |
| 20 | 20.1 | 0.1 |

TABLE 5-continued x–z Calibration with a single fiber in air

| True Angle (°) | Measured Angle (°) | Error Angle (°) |
|---|---|---|
| 30 | 26.6 | −3.4 |
| 40 | 38.5 | −1.5 |
| 50 | 50.4 | 0.4 |
| 60 | 58.3 | 1.7 |
| 70 | 70.2 | 0.2 |
| 80 | 78.1 | −1.9 |
| 90 | 90.0 | 0.0 |

EXAMPLE 4

In order to evaluate the ability of the method to deal with higher fiber concentrations, a 82.5×10.3×3.2 mm (3.25× 0.460×0.125 in) sample was produced with 30 wt % BK-10 glass fibers and 0.1 wt % carbon tracer fibers. A slender piece with a 1.5 mm square cross-section by 10 mm length was cut out of the middle of the sample. The 10 mm length was orientated orthogonal to the flow direction during injection molding representing the width of the sample. The coordinate system for this slender sample is defined as follows: the long axis is defined as the x axis with the two shorter axes arbitrarily defined as the y and z axes (consistent with a right-handed coordinate system). The relationship between the local coordinate system of this sample and the coordinate system of the original coupon from which it was taken was lost in the cutting and polishing process. However, this does not present a problem since this sample is treated as an unknown distribution and no attempt is made to relate the observed distribution with processing conditions. The cross-section of the sample was small enough so that the same volume could be imaged from four orthogonal directions. Since there is a significant difference in the resolving power of the microscope in the image plane versus the optical axis, an axis-dependent systematic error in the analysis would be revealed by comparing the results of these four scans.

Each side of the sample was scanned beginning 350 $\mu$m from the surface at 14.9 $\mu$m intervals for 53 steps. The imaging area of the video camera was 797×1077 $\mu$m. Thus, the scanned volume was 797×797×1077 $\mu$m. This process was repeated at two locations 1 mm apart.

The result shows that although the details of the FOD are not identical in each view, the basic shapes and orientations are similar. This result is significant because it was obtained from a sample with a high tracer fiber content and a complex FOD. Two sets of scans were performed at two different locations. The results presented here are from the worst case (FIGS. 13A to 13D, 14A to 14D and 15A to 15D). Each set of four Figures show the same FOD viewed from the same reference direction. Each Figure within a set was obtained from a different scan direction and then the results were transformed mathematically to a common reference orientation.

The sample was rotated about its x axis. Thus the x components of the orientation tensors are expected to be similar, a result that is confirmed by a comparison of the upper left elements of the tensors.

Tensors from first set of orthogonal scans:

$$-Z = \begin{vmatrix} 0.4730 & -0.1402 & 0.2800 \\ & 0.1985 & -0.1662 \\ sym & & 0.3284 \end{vmatrix}, -Y = \begin{vmatrix} 0.4370 & -0.3062 & -0.0787 \\ & 0.4116 & 0.1321 \\ sym & & 0.1514 \end{vmatrix}$$

$$+Z = \begin{vmatrix} 0.4243 & 0.1423 & -0.2697 \\ & 0.2210 & -0.1705 \\ sym & & 0.3547 \end{vmatrix}, +Y = \begin{vmatrix} 0.4096 & 0.2536 & 0.1222 \\ & 0.4137 & 0.1794 \\ sym & & 0.1767 \end{vmatrix}$$

Tensors from second set of orthogonal scans:

$$-Z = \begin{vmatrix} 0.4467 & 0.1369 & -0.2546 \\ & 0.2425 & -0.1932 \\ sym & & 0.3107 \end{vmatrix}, -Y = \begin{vmatrix} .3996 & 0.1419 & -0.2370 \\ & 0.2382 & -0.1872 \\ sym & & 0.3622 \end{vmatrix}$$

$$+Z = \begin{vmatrix} 0.4530 & 0.1275 & -0.2761 \\ & 0.2063 & -0.1846 \\ sym & & 0.3407 \end{vmatrix}, +Y = \begin{vmatrix} 0.3854 & 0.1095 & -0.2708 \\ & 0.1953 & -0.1714 \\ sym & & 0.4193 \end{vmatrix}$$

If the imaging were free of any bias, the remaining tensor elements would also be very similar. However, examination of the remaining elements, especially the diagonal elements, shows a greater similarity between the tensors obtained from scans on opposite sides of the sample than between scans on adjacent sides. This result suggests that there is some inherent bias in the imaging. Such a result is not surprising given that the resolution along the optical (z) axis is 7.5 times less than that in the y direction, and rotation of the sample essentially reversed the y and z axes.

TABLE 6

Comparison of FOD tensors from the first set of orthogonal scans.

| Scan Dir | Rot ($\phi$) | Elev ($\theta'$) | Twist ($\beta$) | Maj | Int | Min |
|---|---|---|---|---|---|---|
| −Z | −25.79 | 30.02 | −11.44 | 0.769 | 0.158 | 0.072 |
| −Y | −18.79 | 34.97 | −7.60 | 0.767 | 0.156 | 0.077 |
| +Z | −29.35 | 33.03 | −6.57 | 0.752 | 0.156 | 0.092 |
| +Y | −28.78 | 36.87 | −9.97 | 0.746 | 0.175 | 0.079 |
| Combined | −25.70 | 33.64 | −9.71 | 0.755 | 0.160 | 0.085 |

TABLE 7

Comparison of FOD tensors from the second set of orthogonal scans.

| Scan Dir | Rot ($\phi$) | Elev ($\theta'$) | Twist ($\beta$) | Maj | Int | Min |
|---|---|---|---|---|---|---|
| −Z | 30.93 | 31.06 | −20.75 | 0.746 | 0.192 | 0.062 |
| −Y | 33.70 | 34.94 | −28.02 | 0.728 | 0.174 | 0.098 |
| +Z | 27.54 | 31.95 | −25.78 | 0.763 | 0.177 | 0.060 |
| +Y | 28.59 | 38.21 | −27.68 | 0.747 | 0.162 | 0.091 |
| Combined | 30.19 | 34.04 | −25.56 | 0.746 | 0.176 | 0.078 |

The first column gives the in-plane rotation angle $\phi$ of the major axis with respect to the x axis. The second column gives the out-of-plane elevation angle $\theta'=\pi/2-\theta$ of the major axis with respect to the x-y plane. The third column gives the rotation, or twist of the intermediate axis about the major axis. The remaining three columns give the lengths of the major, intermediate and minor axes, respectively.

A further comparison of the tensors was made by combining the FODs from the four scan directions to obtain a composite result which was compared with the individual tensors (Tables 8 and 9).

TABLE 8

Differences between combined and individual tensors from first orthogonal scans.

| Scan Dir | Rot ($\phi$) | Elev ($\theta'$) | Twist ($\beta$) | Maj | Int | Min | Diff |
|---|---|---|---|---|---|---|---|
| −Z | −0.09 | −3.62 | −1.73 | 0.015 | −0.002 | −0.012 | 0.002 |
| −Y | 6.91 | 1.33 | 2.10 | 0.012 | −0.004 | −0.008 | 0.005 |
| +Z | −3.65 | −0.61 | 3.13 | −0.002 | −0.004 | 0.007 | 0.001 |
| +Y | −3.08 | 3.23 | −0.27 | −0.009 | 0.015 | −0.006 | 0.002 |
| Average | 3.43 | 2.20 | 1.81 | 0.010 | 0.006 | −0.008 | 0.003 |

TABLE 9

Differences between combined and individual tensors from second orthogonal scans.

| Scan Dir | Rot ($\phi$) | Elev ($\theta'$) | Twist ($\beta$) | Maj | Int | Min | Diff |
|---|---|---|---|---|---|---|---|
| −Z | 0.67 | −2.87 | 4.17 | 0.002 | 0.016 | −0.018 | 0.002 |
| −Y | 3.43 | 1.01 | −3.10 | −0.015 | −0.003 | 0.018 | 0.001 |
| +Z | −2.73 | −1.98 | −0.86 | 0.020 | 0.000 | −0.020 | 0.001 |
| +Y | −1.68 | 4.28 | −2.77 | 0.003 | −0.014 | 0.011 | 0.004 |
| Average | 2.13 | 2.54 | 2.73 | 0.010 | 0.008 | 0.017 | 0.002 |

To evaluate the magnitude of the bias it was useful to examine a more easily interpreted description of the orientation tensor, such as the orientation of the major axis of the tensor ellipsoid and the lengths of the major axes calculated by DiffFOD. The descriptive tensor characteristics are given in Tables 6 and 7 (See FIG. 12 for the angle definitions).

The angles and lengths in the Tables are the differences between the composite and individual tensors, rather than absolute measurements. There is also an additional column containing the tensor deviation, which is the square root of the sum of the squares of the differences between the individual tensor components, divided by two. The maximum possible deviation between two tensors is 1. The maximum difference in the angle measurements is less than 7° (average 3.43°) and the maximum major axis length difference is 0.020, which is 2% of the worst possible case. This indicates that observed bias does not have a strong influence on the orientation measurements, at least for the range of fiber orientations present in the calibration sample. An error of less than 7° in the FOD is probably adequate for most applications.

As a final test between the orthogonal samples, the total measured fiber length from each scan was summed. The maximum length difference was 6.5% for the first scan and 7.2% for the second scan which suggests that the fibers had approximately equal visibility from all directions.

Analysis of the orthogonal sample with high tracer fiber content gave evidence of the ability of both the imaging system and software to extract accurate 3D FODs from complex, high fiber density images. Since only two experiments were conducted with a complex orientation distribution and the true orientation distribution was not known, it is not possible to make a conclusive statement regarding the accuracy of the results. However, the good agreement between the FODs obtained from orthogonal scans provides strong evidence that the method performs well with high fiber concentrations.

EXAMPLE 5

In order to allow a direct comparison between the optical sectioning method and the surface ellipse method two PMMA samples (A and B) containing 20 wt % 13 µm diameter BK-10 glass fibers and 0.1 wt % carbon fibers were physically sectioned at non-dimensional depths of z/b=0.94, 0.75, 0.56 and 0.10 where b is half the thickness of the sample and z is the distance from the midplane along the optical axis. At each surface, the exposed fiber ellipses were measured and the samples were optically sectioned at 14.9 µm intervals for 20 steps. The scans were done in three adjacent rows of 12 cells, spanning the width of the sample with the edge of the first scan located 20 mm from the gate.

The surface images were captured with the frame grabber of the MCFG program and the major and minor axes of the fiber ellipses were identified manually. A data file containing the coordinates of ellipse features was generated. A polished surface of a sample containing 30 wt % glass, 0.1 wt % tracer fibers was used in the surface ellipse analysis.

Comparisons of tensor components $a_{11}$ and $a_{33}$ acquired by the optical sectioning method and the surface ellipse method from samples A and B as functions of depth (z component) were plotted (FIGS. 16A to 16D and 17A to 17D). The tensor component $a_{11}$ is a measure of the degree of orientation in the flow direction, and $a_{33}$ is a measure of the degree of orientation in the transverse (thickness) direction. A value of one (1) represents perfect alignment in the specified direction, while a value of zero (0) represents no alignment in that direction.

The horizontal axis represents the lateral y/b scan location. The vertical axis represents the magnitude of the tensor components. Each set of four plots as shown in FIGS. 16A to 16D and 17A to 17D is presented in order of increasing depth into the sample. The original (unpolished) surface of the sample corresponds to z/b=1 and the midplane of the sample corresponds to z/b=0. Portions of the curves show statistically significant differences in the measurements, but there do not appear to be any strong trends in the differences between the measurements. The optical sectioning method gave somewhat lower values for $a_{11}$ and higher values for $a_{33}$ but the opposite case is observed in some of the curves. The optical sectioning method also tended to predict higher $a_{33}$ values near the edges of the sample. Although there are some differences on the whole, these results suggest that the measurements made by optical sectioning are consistent with the results obtained from surface measurements. This is the expected result given that the FODs did not contain strong z components, which is the best condition for accurate measurements by surface analysis. The present results of the previous plots were also combined into surface contours for a global comparison of variations of the tensor components with respect to depth (FIGS. 18A and 18B and 19A and 19B).

The good correlation observed between the surface ellipse and optical sectioning methods at small out-of-plane orientation angles is evidence not only that the optical sectioning method gives reasonable results, but that the tracer FOD is similar to that of the bulk FOD. The tracer fibers were analyzed in the optical sectioning experiments while in the surface ellipse method the glass fibers were analyzed.

EXAMPLE 6

To evaluate the repeatability of the imaging system, a sample was repeatedly scanned at the same location, but with independent operators setting up the lighting conditions and camera settings. Two different scan patterns were used. On one pattern, the sample was scanned 10 times at a single x-y location from the surface to a depth of 700 µm at 14.9 µm intervals. In the second scan pattern, four adjacent x-y locations, sharing a common corner centered at the original scan location, were scanned three times each over the same z range. The results from each type of scan pattern were combined and the components of the resulting fiber orientation ellipsoid were plotted as functions of penetration depth (FIGS. 20A to 20F).

Direct comparisons between the single cell results and the 2×2 cell results have limited validity since the 2×2 cells cover an area four times as large as the single scans. However, since the scans were made in the same vicinity, the results are expected to be similar under the assumption of continuously varying orientation fields. The quantity of greatest interest is the standard deviation of the various measurements which result from variations in lighting conditions. These variations are quantified by the error bars. It is apparent from the data that averaging the results of four adjacent scans reduces the variability considerably. The erratic behavior of the mean values of the single cell scans is probably an indication of insufficient tracer fiber density which can be overcome by averaging adjacent scans. There were an estimated thirty-five (35) fibers per cubic micron in the sample images. The cost of averaging is the reduced spatial resolution of the FOD field. However, the benefits of averaging are realized without a loss of spatial resolution if the orientation field is assumed to be locally invariant with respect to one axis. In that case, a series of adjacent scans are made in the direction of invariance and combined to give an average result. This type of averaging was used with the gate obstacle sample analysis (described below) to provide a larger sample population of tracer fibers and thereby, reduce the variability of the data.

EXAMPLE 7

In this experiment, a series of rectangular, transparent samples were injection molded with and without a cylindrical obstacle in the gate to determine the influence of the obstacle on the fiber orientation. A total of eighteen (18) samples were prepared with PMMA, 13 µm diameter BK-10 glass fibers and 10 µm diameter carbon tracer fibers. Both types of fibers were cut to be 0.916 mm long. The mold cavity was 82.5×10.3×3.2 mm with a diverging film gate.

Of the eighteen (18) samples, nine (9) were molded with a 3.125 mm (0.125 inch) diameter cylindrical obstacle in the gate, and nine (9) without. Within each of these two (2) batches, three (3) samples were molded with twenty percent (20%) glass, three (3) with twenty-five percent (25%) glass, and three (3) with thirty percent (30%) glass. The molded samples usually had a textured surface finish. Therefore it was necessary to polish the samples to obtain a sufficiently smooth surface for imaging. All of the samples had a thickness (H) of 3.2 mm thick before polishing.

In order to measure the influence of the gate obstacle, the samples were each imaged in a series of scans across their width. The size of the CCD camera's field of view for a 10× objective lens was 1.077×0.797 mm, requiring twelve (12) scans to cover the entire sample width. The coordinate system used with the samples was defined as: the x or 1 coordinate being the distance from the gate in the flow direction, the y or 2 coordinate being the distance from the vertical longitudinal midplane, and the z or 3 coordinate being the distance from the horizontal midplane (optical axis). A series of three (3) adjacent rows of scans were made, beginning at a distance of 5 mm from the gate to allow a statistical comparison of the orientation tensor components. Twenty (20) images were captured at 14.9 μm intervals along the optical axis (z) at each x-y field of view location, beginning at a depth of 447 μm from the unpolished surface.

A similar set of scans were made at the midsection (in the gage length) of the sample to allow correlation with tensile testing results. The scans were made at 37, 41 and 45 mm from the gate. At each position, forty (40) images in two groups of twenty (20) were captured along the optical axis (z) beginning at the polished surface.

The imaging described above was restricted to a fairly small penetration depth to minimize the scan time and volume of data generated. To illustrate the ability of the method to measure the z-component of the fiber orientation and probe deep into the material, a series of scans were made along the vertical midplane of the sample over a range of z/b=0.72 to 0.1 and from z/b=0.72 to –0.1 (b=H/z or ½ the thickness of the samples or about 1.6 mm). The longitudinal positions of the scans were chosen to match data reported in the literature.

The eighteen (18) gate obstacle samples were tested in an Instron tensile tester (not shown). Reflective tape was attached to mark the limits of the 19 mm (0.75 in) gage length. The samples were gripped with cleated grips without end tabs. An ASTM-D-30391991 laser extensometer (not shown) was used to monitor the strain, and a 1000 lb load call (not shown) was used to monitor the load. The crosshead rate was 0.2 in/min. The samples were tested in the elastic range to a maximum strain of about 0.5 percent, which resulted in the fracture of one of the samples.

Figure 21A:
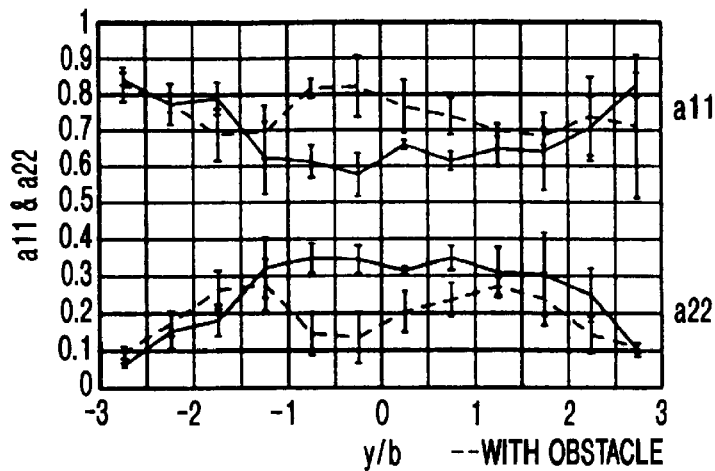
FIGS. 21A to 21C show the plots of the x and y related orientation tensor components ($a_{11}$ and $a_{22}$) across the width of the samples in Example 7 near the gate end (x/b=5.7).
Figure 21B:
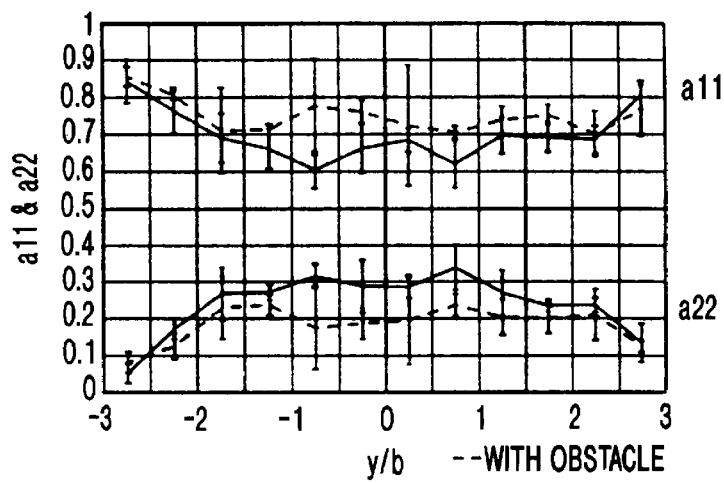
Figure 21C:
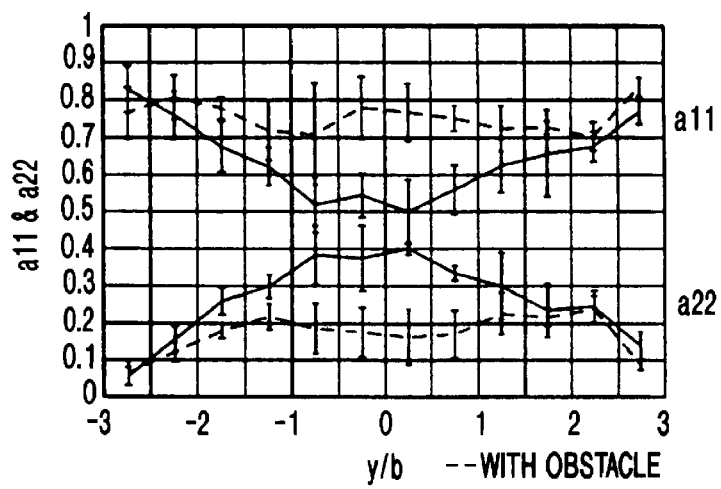
Figure 22A:
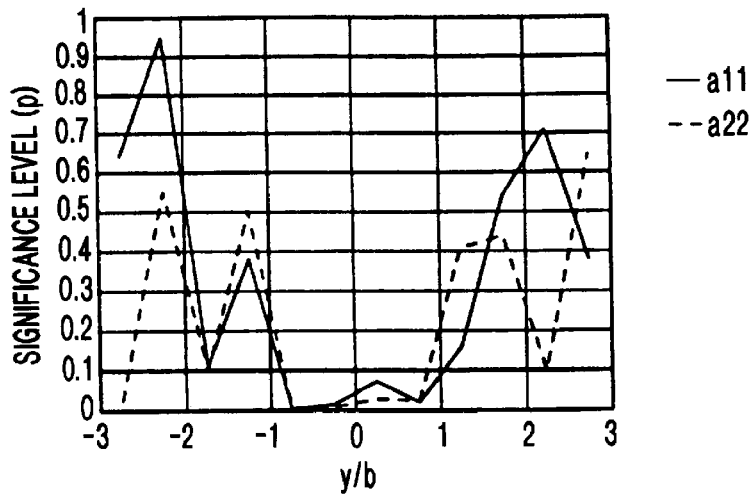
FIGS. 22A to 22C show the plots of the level of significance (p value) of the difference between the obstacle and no obstacle results for the samples in Example 7.
Figure 22B:
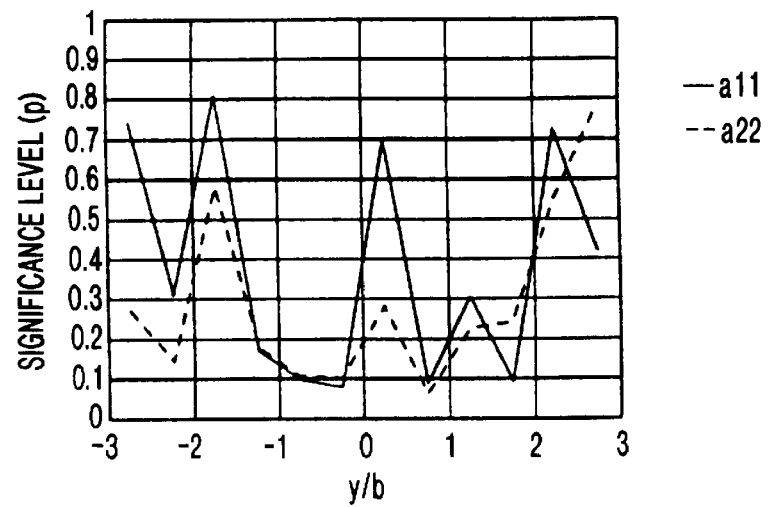
Figure 22C:
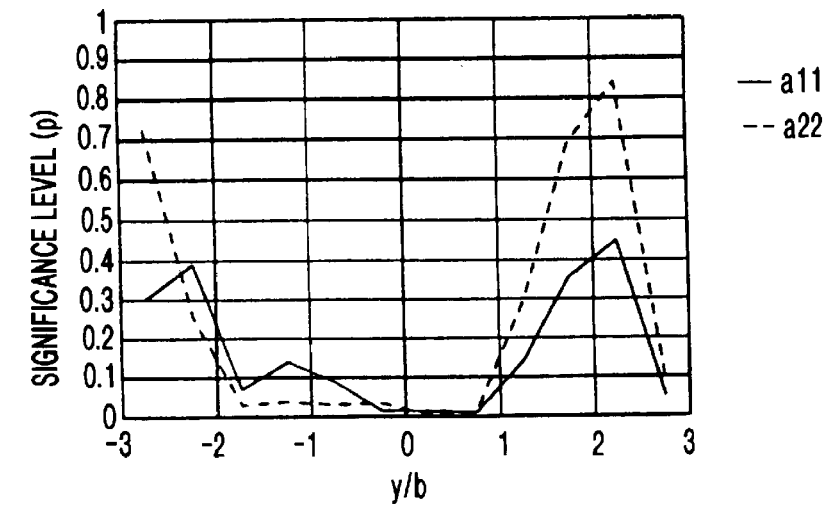

The x and y related orientation tensor components ($a_{11}$ and $a_{22}$) across the width of the samples near the gate end (x/b=5.7) were plotted (FIGS. 21A to 21C). The level of statistical significant (p value) of the difference between the obstacle and no obstacle results were also plotted (FIGS. 22A to 22C). This statistic represents the probability of observing a difference in means equal to or greater than the observed difference if the example was performed many times under the assumption that the means of the two sample populations are equal. Portions of the curve which were less than 0.10 (p<0.10) indicated a statistically significant difference at an α level of 0.10. Each curve was constructed from the combined data from three (3) samples. Each sample was scanned across its width in three adjacent rows and the data were combined into one representative row. Thus, each curve contains data from nine (9) sets of scans.

Each plot shows that the fibers tend toward a unidirectional orientation in the flow direction near the edges of the samples. Perfect alignment in the flow direction corresponds to $a_{11}$=1. Toward the middle of the samples (y/b=0) the orientation becomes less aligned in the flow direction and tends toward a random orientation. The results show that the presence of an obstacle in the gate induces a greater degree of alignment in the flow direction in the core region and that this alignment persists far downstream of the gate. The presence of the gate obstacle increased the alignment of the fibers near the middle of the sample presumably by increasing the shear forces in the gate. If the flow were fully developed, there would be no difference between the samples with and without the obstacle. It appears that the orientation that is induced at the gate is convected downstream with little modification, which is consistent with a plug flow condition.

The results of the tensile tests show that the modulus increased with increasing fiber content and that samples produced with the gate obstacle were generally stiffer than those without. The differences between the modulus values for the samples with 25 and 30 wt % fibers were statistically significant at an α level of 0.05. These results are consistent with the observed difference in fiber orientation. Samples with greater alignment in the longitudinal direction were stiffer in uniaxial tension than those with less alignment.

Blumentritt et al, The Mechanical Properties of Oriented Discontinuous Fiber-Reinforced Thermoplastics I. Unidirectional Fiber Orientation, "Polymer Engineering Science", (1974) 14(9), pp. 633–640 show results for unidirectional short fiber composites which provide a useful comparison of fiber efficiency. The results reported by Blumentritt et al are for PMMA composites with 10 μm diameter, 6.35 mm long glass fibers. These fibers are approximately seven (7) times longer than the fibers used here. The Young's modulus for 20 wt % fibers was reported to be 10.5 GPa, compared with 6.3 GPa observed here for samples with and without the gate obstacle. The Young's modulus for 30 wt % fibers was reported to be 15.0 GPa, compared with 8.07 GPa for samples without the obstacle and 9.45 GPa for samples with the obstacle. The lower modulii reported here are due to non-unidirectional fiber orientation and shorter fiber lengths.

The experiment demonstrated that the conditions present at the gate of the mold have a far-reaching influence on the fiber orientation of a part. The obstacle induced a greater degree of alignment in the flow direction, which was observed to persist at least to the middle of the sample.

EXAMPLE 8

This example was used to visualize the fiber orientation field resulting from flow around an obstacle, an additional sample was made with an obstacle in the middle of the cavity using the same injection protocol as that used for the gate obstacle samples described above. The obstacle was a 3.125 mm (0.125 inch) diameter cylinder located on the midline of the sample at a distance of 30 mm (2.17 inch) from the gate end (x/b=17.2, y/b=0.0).

The sample was imaged on a 12×30 grid of 1.077×0.797 mm rectangular areas surrounding the obstacle. At each location, fifty (50) images were captured along the optical axis beginning at the polished surface and progressing at 14.9 μm intervals.

Figure 23:
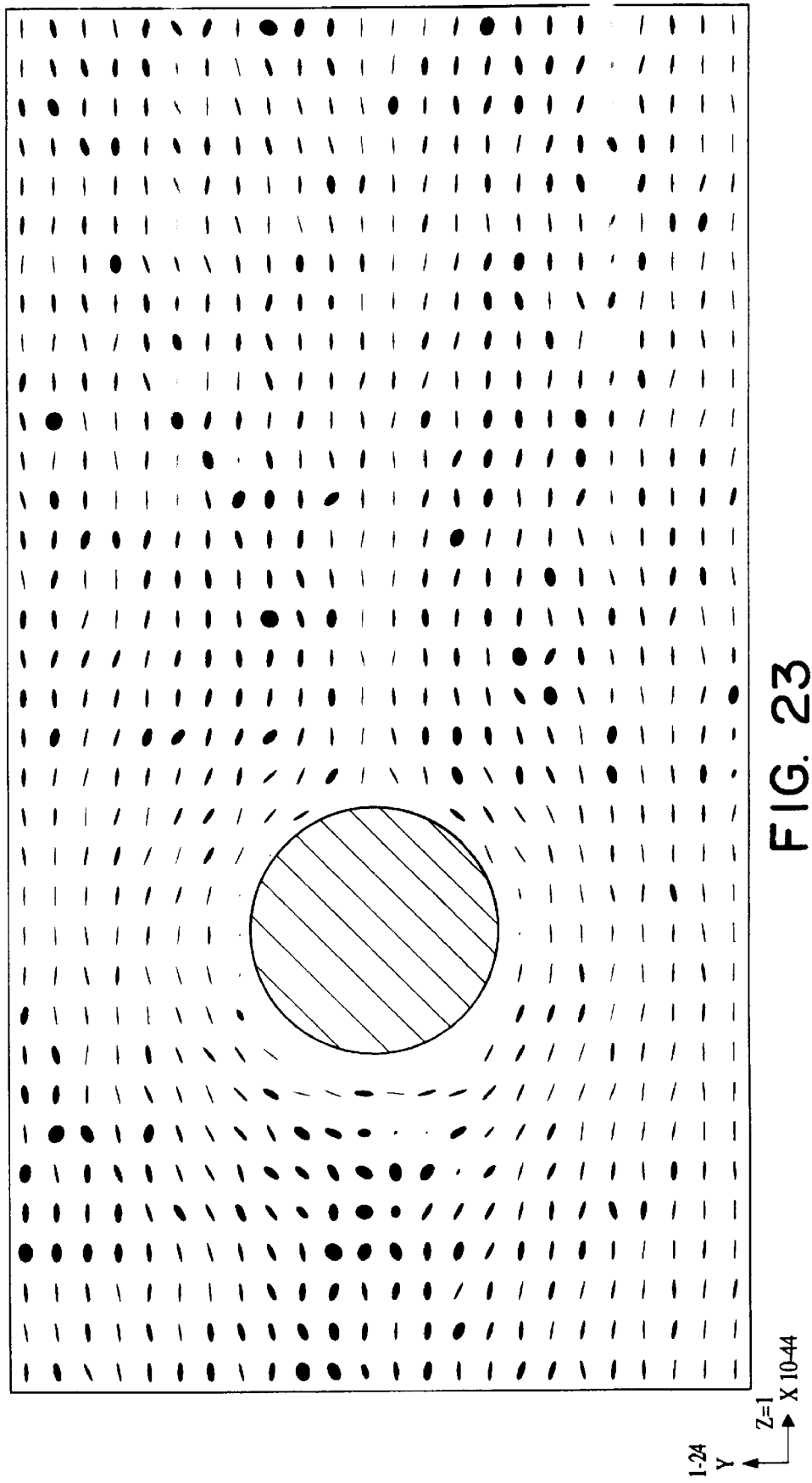
FIG. 23 is a projection of the measured orientation ellipsoids onto the x-y plane obtained from the sample in Example 8 as generated by the Fibor program.

The knit line was visible as a line of very thin ellipses oriented along the centerline indicating a highly aligned fiber orientation (FIG. 23). There was also a high degree of fiber alignment present between the obstacle and the walls of the sample.

Errors of the method and apparatus of fiber orientation measurement of the present invention may originate from two possible sources: imaging and thinning. The apparent lengths of fibers, especially those with large z orientation components, vary with the intensity of the illumination. Dirt, shadows and similar contamination of the images will also contribute to erroneous data. During thinning, some shortening of fibers is inevitable and since voxels have non-equal dimensions in x, y, and z, the removal of a voxel has non-equal influence in different directions. An accurate characterization of this bias could be used to minimize this effect and increase the accuracy of the technique.

Some limitations are imposed on the technique by the optical physics involved, especially when dealing with real (non-ideal) materials. The limitations of a specific application of the technique depend on the sample material and the characteristics of the imaging device. Possible limitations include: diffraction due to refractive index mismatches and imperfect interfaces between fiber and matrix, obscuring of the optical path by intervening fibers, fuzziness and loss of contrast caused by out-of-focus information, limited resolution along the optical axis, local variations in transmissivity of the material, the presence of impurities and the finite working distance of the objective lens. However, these limitations are minimized by careful preparation of materials and controlled lighting conditions. Another limitation is that the tracer fiber density must be relatively sparse to allow optical access into the sample. This limits the size of the fiber sample population. The obscuring of the optical path places an upper limit on the tracer fiber density. Experience with a light microscope set-up has shown that 0.3 vol % is an approximate upper limit for fibers of 10 $\mu$m diameter in a sample 3 mm thick. For tracer fibers 450 $\mu$m long this gives approximately 34 fibers/mm$^3$. Greater tracer content can be used if the sample thickness is reduced or by using imaging devices which are better at eliminating out-of-plane information. In addition, several compatible fiber/matrix combinations have been identified which may be suitable for producing transparent composites and non-dimensional analysis methods and offer the potential to generalize the results from transparent systems to opaque systems. It is difficult to quantify the relationship between tracer density and penetration depth because the relationship is dependent on characteristics of the composite material, the characteristics of the imaging system and the illumination as well as fiber length and diameter. However, it appears that doubling the tracer fiber density decreases the penetration depth by more than fifty percent (50%) with the system used here. The technique of optical sectioning relies on the narrow depth of field of an optical microscope. Objects or portions of objects that lie within the depth of field are visible, while those outside are not. An imaging system with a narrower depth of field and enhanced ability to eliminate out-of-plane information would be better able to image samples with high tracer fiber densities.

Another phenomenon that is exhibited in optical sectioning is a loss of contrast with increasing penetration depth, even though the image may remain sharp. This is likely due to out-of-plane information arriving at the microscope objective and imperfect transmissivity of the material. The depth of field for an optical microscope is the approximate range over which objects appear to be in focus to the human eye. This depth $\delta$ is usually about 5.96 $\mu$m. For the purposes of optical sectioning, however, the critical factor is whether an object is visible, rather than whether it is in sharp focus. Therefore, the depth of field is approximately three (3) times as large as normally considered for an optical microscope, or about 17 $\mu$m. An absolute limit is placed on the penetration depth by the working distance of the objective lens. Once the objective lens meets the surface of the material, no further penetration is possible. Objective lens working distances up to 9 mm are used for the relatively small magnifications such as used here and other factors usually intervene before this limit is reached. One final complication may occur with optical sectioning, if the surface of the material is polished and fibers intersect the surface. Because of the difference in wear resistance of the two materials, the surface may not remain flat during polishing and therefore, may cause localized dislocations or distortions of the image.

It is intended that the foregoing description be illustrative of the present invention and that this invention be limited only by the scope of the hereinafter appended claims.

We claim:

1. A method for detecting a three-dimensional fiber orientation in an injection molded sample which comprises:
    (a) providing a transparent molded sample of a continuous phase of a polymeric material with impregnated reinforcing fibers having a refractive index similar to the refractive index of the polymeric material and at least one tracer fiber which is optically distinguishable from the polymeric material and the reinforcing fibers in the sample;
    (b) mounting the sample under an optical microscope which is provided with a computer means for recording images of the tracer fiber at layers within the sample in a field of view of the microscope along a line of sight of the microscope through the sample; and
    (c) analyzing the recorded images using the computer means to reduce the amount of data and reveal parameters in the recorded images by removing voxels from a group of voxels to create at least one chain of single voxels to provide a thinned image; and
    (d) analyzing the thinned image using the computer means to determine the orientation of at least one tracer fiber in the sample which includes the steps of:
        (i) searching the thinned image to locate a set voxel;
        (ii) moving along at least one chain of voxels contiguous with the set voxel until an endpoint or junction is reached, to determine a location of each voxel in the chain of voxels;
        (iii) storing the locations of each voxel in at least one chain of voxels;
        (iv) calculating an inertia tensor about a center of mass of a rigid body by using the locations of the voxels in at least one chain of voxels as point masses belonging to the rigid body; and
        (v) determining a smallest principle moment of inertia for the rigid body to determine an axis of the tracer fiber to determine the orientation of fibers in the sample.

2. The method of claim 1 wherein the reinforcing fibers are glass fibers and trace fibers are carbon fibers.

3. The method of claim 2 wherein the sample is constructed of polymethylmethacrylate, glass fibers and carbon fibers.

4. The method of claim 1 wherein the voxels are uniformly removed from the group of voxels by considering a single layer of voxels in the image at a time on various surfaces of the group.

5. A method for detecting a three-dimensional fiber in an injection molded sample which comprises:

(a) providing a transparent molded sample of a continuous phase of a polymeric material with impregnated reinforcing fibers having a refractive index similar to the refractive index of the polymeric material and at least one tracer fiber which is optically distinguishable from the polymeric material and the reinforcing fibers in the sample; and (b) mounting the sample under an optical microscope which is provided with a computer means for recording images of the tracer fiber at layers within the sample along a line of sight of the microscope through the sample at various lateral (x-y) positions in the sample;

(c) analyzing the recorded images using the computer means to reduce the amount of data and reveal parameters in the recorded images by removing voxels from a group of voxels to create at least one chain of single voxels to provide a thinned image; and (d) analyzing the thinned image using the computer means to determine the orientation of at least one tracer fiber in the sample which includes the steps of:

(i) searching the thinned image to locate a set voxel;

(ii) moving alone at least one chain of voxels contiguous with the set voxel until an endpoint or function is reached, to determine a location of each voxel in the at least one chain of voxels;

(iii) storing the locations of each voxel in the at least one chain of voxels;

(iv) calculating an inertia tensor about a center of mass of a rigid body by using the locations of the voxels in the at least one chain of voxels as point masses belonging to the rigid body and;

(v) determining a smallest principle moment of inertia for the rigid body to determine an axis of the tracer fiber to determine the orientation of the fibers in the sample.

6. The method of claim 5 wherein the sample is moved under the microscope to provide a variety of recorded images.

7. The method of claim 6 wherein the recorded images are three-dimensional.

8. The method of claim 7 wherein the line of sight of the microscope is along a z-axis and the images are recorded at different positions along the z-axis within the sample at various x-y locations.

9. The method of claim 7 wherein the thinned image, the size of the voxels and a refractive index of the sample are used to determine the orientation of the fibers in the sample.

10. The method of claim 9 wherein a length of the fibers is determined by using the orientation of the fibers, the size of the voxels and the number of voxels in the single chain.

11. The method of claim 5 wherein the voxels are uniformly removed from the group of voxels by considering a single layer of voxels in the image at a time on various surfaces of the group.

12. The method of claim 11 wherein the single chain of voxels are analyzed by the computer means to determine intersections and endpoints of the fibers.

13. The method of claim 5 wherein the reinforcing fibers are glass fibers and trace fibers are carbon fibers.

14. The method of claim 13 wherein the carbon trace fibers are analyzed to determine the orientation of the glass fibers in the sample.

15. The method of claim 5 wherein the images are analyzed to determine a length of the fibers in the sample.

16. An apparatus for detecting a three-dimensional fiber orientation in an injection molded sample, which comprises:

(a) a light microscope which is provided with means for supporting a molded sample of a continuous phase of a polymeric material with embedded reinforcing fibers having a refractive index similar to the refractive index of the polymeric material and at least one tracer fiber which is optically distinguishable from the polymeric material and the reinforcing fibers in the sample; and (b) a computer means with a program for recording images of the tracer fiber from the sample in a field of view of the microscope along a line of sight of the microscope and at layers within the sample to reduce the amount of data and reveal parameters in the recorded images by removing voxels from a group of voxels to create at least one chain of single voxels to provide a thinned image and to analyze the thinned images by searching the thinned image to locate a set voxel; moving along at least one chain of voxels contiguous with the set voxel until an endpoint or junction is reached, to determine a location of each voxel in the chain of voxels; storing the locations of each voxel in the at least one chain of voxels; calculating an inertia tensor about a center of mass of a rigid body by using the locations of the voxels in the at least one chain of voxels as point masses belonging to the rigid body; and determining a smallest principle moment of inertia for the rigid body to determine an axis of the tracer fiber to determine the orientation of the fibers in the sample.

17. The apparatus of claim 16 wherein the program includes a motion control frame grabber (MCFG) program for controlling imaging equipment and for capturing images.

18. The apparatus of claim 17 wherein the MCFG program controls at least two axes of motion of the microscope.

19. The apparatus of claim 18 wherein the program includes a step program as supplementary means for controlling a third axis of motion of the microscope.

20. The apparatus of claim 19 wherein the step program controls a fourth axis of motion of the microscope.

21. The apparatus of claim 16 wherein the program includes a Pseudo program for generating simulated recorded images.

22. The apparatus of claim 16 wherein the program includes a DiffFOD program for combining the recorded images from several different samples for analysis.

23. The apparatus of claim 16 wherein the computer means includes a Fibor program to provide graphic representation of the results of the analysis of the recorded images.

24. The apparatus of claim 16 wherein the computer means includes an Acquire program for monitoring an injection molding process.

25. The apparatus of claim 16 wherein the trace fibers are constructed of carbon fibers and the reinforcing fibers are constructed of glass fibers.

26. The apparatus of claim 25 wherein the sample is constructed of polymethylmethacrylate, glass fibers and carbon fibers.

27. The apparatus of claim 25 wherein the glass fibers and the carbon fibers have the same length.

* * * * *

UNITED STATES PATENT AND TRADEMARK OFFICE
CERTIFICATE OF CORRECTION

PATENT NO. : 5,841,892

DATED : November 24, 1998

INVENTOR(S) : John J. McGrath and Jeffrey M. Wille

It is certified that error appears in the above-identified patent and that said Letters Patent is hereby corrected as shown below:

Column 5, line 57, "voxels $n_{[0,-1,1]}$" should be --voxels $n_{[0,-1,0]}$--.

Column 16, line 56; at column 3 row 8 of Table 1 "$n_{[0,0,1]}$" should be --$n_{[0,1,1]}$--.

Columns 17 and 18 (Table 2); column 13 header, "$n_{[-1,-1,-1]}$" should be --$n_{[-1,-1,1]}$--.

Column 19 (Table 2):

at row 9, "$n_{[-1,0,-1]}$" should be --$n_{[-1,-1,-1]}$--.

at row 10, "$n_{[-1,1,-1]}$" should be --$n_{[-1,0,-1]}$--.

at row 13, "$n_{[1,0,-1]}$" should be --$n_{[1,1,-1]}$--.

UNITED STATES PATENT AND TRADEMARK OFFICE
CERTIFICATE OF CORRECTION

PATENT NO. : 5,841,892
DATED : November 24, 1998
INVENTOR(S) : John J. McGrath and Jeffrey M. Wille It is certified that error appears in the above-identified patent and that said Letters Patent is hereby corrected as shown below:

Column 30, line 9 (Table 5); 3rd column, 7th row, "1.7" should be -- -1.7--.

Column 30, line 19, "0.460x" should be --0.406x--.

Column 39, line 25 (Claim 5), "moving alone" should be --moving along--.

Column 39, line 26 (Claim 5), "function" should be --junction--.

Signed and Sealed this

Eleventh Day of May, 1999

Attest:

Q. TODD DICKINSON

*Attesting Officer*      *Acting Commissioner of Patents and Trademarks*